US008506401B2

(12) United States Patent
Emori et al.

(10) Patent No.: US 8,506,401 B2
(45) Date of Patent: Aug. 13, 2013

(54) GAMING TABLE DEVICE HAVING A GAME TABLE ON WHICH THE GAME MEDIUM IS DISPOSED

(75) Inventors: Kazuki Emori, Koto-ku (JP); Toru Sugawara, Koto-ku (JP); Kouichi Matsumoto, Koto-ku (JP); Shinsuke Yamaguchi, Koto-ku (JP)

(73) Assignees: Universal Entertainment Corporation, Tokyo (JP); Aruze Gaming America, Inc., Las Vegas, NV (US)

( * ) Notice: Subject to any disclaimer, the term of this patent is extended or adjusted under 35 U.S.C. 154(b) by 16 days.

(21) Appl. No.: 13/238,100

(22) Filed: Sep. 21, 2011

(65) Prior Publication Data

US 2012/0080845 A1 Apr. 5, 2012

(30) Foreign Application Priority Data

Oct. 5, 2010 (JP) ................................. 2010-225694

(51) Int. Cl.
*A63F 13/06* (2006.01)

(52) U.S. Cl.
USPC .................... 463/39; 463/40; 463/42; 463/46

(58) Field of Classification Search
USPC ......................................... 463/25, 39, 42, 46
See application file for complete search history.

(56) References Cited

U.S. PATENT DOCUMENTS

2007/0184898 A1 8/2007 Miller et al.
2009/0170595 A1 7/2009 Walker

*Primary Examiner* — Omkar Deodhar
(74) *Attorney, Agent, or Firm* — Lexyoume IP Meister, PLLC.

(57) ABSTRACT

A gaming table device which can determine frauds precisely and human errors is provided.
A plurality of antennas for reading medium identification information of the game medium disposed on a game table through a wireless communication are disposed at locations spaced away from each other, and when a first antenna of the plurality of antennas is selected, a second antenna spaced at a predetermined distance from the first antenna of the plurality of antennas is selected.

14 Claims, 26 Drawing Sheets

FIG. 9

| | Player1 | Player2 | Player3 | Player4 | Player5 | Player6 |
|---|---|---|---|---|---|---|
| Player | PC-5011<br>PC-5051 | | | PC-0730 | | |
| Banker | | | PC-2051 | | PC-3289<br>PC-9181 | PC-1964<br>PC-7241 |
| Tie | | | | | | |
| BP | | | | | | |
| PP | | | | | | |

GAMING TABLE DEVICE HAVING A GAME TABLE ON WHICH THE GAME MEDIUM IS DISPOSED

CROSS-REFERENCE TO RELATED APPLICATIONS

This application is based upon and claims a priority from the prior Japanese patent Application 2010-225694 filed on Oct. 5, 2010, the entire contents of which are incorporated herein by reference.

BACKGROUND OF THE INVENTION

1. Field of the Invention

The present invention relates to a table which is placed in a gaming establishment such as a casino and on which various games are played, and a system for managing the progress of a game played on the table and information regarding the game such as players and dealers.

2. Related Art

Games played in a gaming establishment such as a casino are carried out by betting gaming chips such as so-called casino chips. Gaming chips are medium having negotiable values, which function as coins used in the gaming establishment.

Therefore, various frauds can happen involving the gaming chips in the gaming establishment.

From such a perspective, a game table which uses a chip with an RF tag embedded therein as a gaming chip, detects the location of the chip on a game table such as a casino table by an antenna, analyzes the gaming chip placed on the game table and indicates the results of analysis on a display has been suggested (for example, refer to United States Patent Publication No. 2009/0170595).

Moreover, a chip tray for collectively managing gaming chips handled by a dealer and a system using the chip tray has been also suggested (for example, refer to United States Patent Publication No. 2007/0184898). This chip tray is provided with a plurality of sensors corresponding to each of a plurality of locations on which can be placed gaming chips. This plurality of sensors can detect whether or not the gaming chips are placed on each of the plurality of locations.

Table games such as poker, Baccarat, and roulette are played on a table for game play such as a casino table. These table games require players and dealers. Human beings like players and dealers mediate the progress of the game. Therefore, to ensure the validity of the game, it is indispensable that both the players and dealers make no fraud or human error when they handle cards such as playing cards and gaming chips.

A fraud by of a player needs to be found since it causes other player disadvantages. However, if a player who has not committed any fraud should be erroneously determined as having done so, the player rightfully enjoying the game play is brought under suspicion of a fraud, which is not only unpleasant for the player, but is also adversely affecting other players nearby. Moreover, erroneous judgment of a fraud may reduce the reliability of the gaming establishment. For such reasons, game tables and game table systems which can precisely determine frauds are desired.

Table games such as poker, Baccarat, and roulette require a dealer. The possibility that the dealer commits a fraud for his/her acquaintances is also quite anticipated. Moreover, when the dealer does not have enough experience and knowledge as a dealer or is unskilled, it is anticipated that he/she makes a human error although it is not a fraud. In gaming establishments, although new dealers receive training, sufficient time and costs cannot be spent training of the dealers on in some cases. For such reasons, when some dealers are not able to proceed a game play smoothly, or they make mistakes frequently, that may irritate or upset players. Moreover, it may arouse suspicion among players if the gaming establishment has the dealer commit frauds, which may reduce the reliability of the gaming establishment. For such reasons, a game table and a game table system which can prevent human errors by the dealer who is human are desired.

As the game table mentioned above, in gaming establishments such as casinos, various devices and systems are sometimes introduced for finding and preventing frauds in recent years. However, even if such devices and systems are introduced, it is unknown when and where in the gaming establishment frauds and human errors occur. For such reasons, the entire gaming establishment needs to be always monitored and controlled, and a great amount of management data such as signals transmitted from sensors and collected data must be processed. However, if such processes cannot be executed in real time, it is difficult to quickly find frauds on the spot.

Furthermore, extra time required for processing management data which interrupts or delays the progress of the game may lead to irritation of players. In the case where such events occur consecutively in the gaming establishment, the reliability of the gaming establishment may be lowered. Therefore, processing of various signals transmitted from sensors and the like processing of collected data need to be quickly executed.

In the entire gaming establishment, a great amount of administrative data must be processed, but in each of the game table, the progress of game itself is often lower than the processing rates of various devices and systems, and there is often spare time for such processing at each game table. By using such spare time, providing various functions convenient for players as a service is also possible.

SUMMARY OF THE INVENTION

The present invention has been made in light of the point stated above, and an object thereof is to provide a gaming table device which can determine frauds precisely and prevent human errors.

In an embodiment of the present invention, the gaming table device including:

a game table on which a game medium storing medium identification information is disposed, a plurality of antennas for reading the medium identification information of the game medium disposed on the game table through a wireless communication, the plurality of antennas being disposed in locations spaced away from each other, and a reading device which, when a first antenna of the plurality of antennas is selected, selects a second antenna which is at a predetermined distance from the first antenna of the plurality of antennas.

Moreover, in the gaming table device of an embodiment of the present invention, the reading device has a first reading control device, and a second reading control device which is different from the first reading control device, the plurality of antennas having a first antenna group consisting of at least two antennas, a second antenna group which is different from the first antenna group and consists of at least two antennas, each of the first antenna and the second antenna being consisting of an antenna, the first reading control device having a first control unit which transmits a first selection signal indicating the first antenna, a first selection device which receives the first selection signal and selects the first antenna indicated by the first selection signal from the first antenna group, the second reading control device having a second control unit which transmits a second selection signal indicating the second antenna, and a second selection device which receives the second selection signal and selects the second antenna indicated by the second selection signal from the second antenna group, the first reading control device reading the medium identification information by the first antenna selected by the first selection device through a wireless communication, and the second reading control device having, reading the medium identification information by the second antenna selected by the second selection device through a wireless communication preferred.

Furthermore, in an embodiment of the present invention, a preferable gaming table device further includes:

selection inhibiting information for defining a combination of antennas which are not simultaneously selected by the reading device among the plurality of antennas a memory device storing, and the reading device refers to the selection inhibiting information, and determines at least two antennas to be simultaneously selected.

Furthermore, in an embodiment of the present invention, a preferable gaming table device further includes:

a memory device storing selection inhibiting information which indicates the combination of antennas inhibited to be selected simultaneously of the plurality of antennas, when the combination of a first selection candidate antenna determined as a selection candidate by the first reading control device of the antennas in the first antenna group and a second selection candidate antenna determined as a selection candidate by the second reading control device of the antennas in the second antenna group is not a combination inhibited by the selection inhibiting information, the first reading control device selecting the first selection candidate antenna as the first antenna, and the second reading control device selecting the second selection candidate antenna as the second antenna.

In a preferable gaming table device of an embodiment of the present invention, the reading device refers to the selection inhibiting information, determines whether or not one antenna can be selected in accordance with a predetermined antenna selection order, and when the one antenna can be selected, selects the one antenna, while when the one antenna cannot be selected, determines whether or not another antenna next to the one antenna can be selected in accordance with the predetermined antenna selection order, and changes the order of selection of the one antenna.

Moreover, in an embodiment of the present invention, a preferable gaming table device further includes:

a game control device which executes a predetermined error process when it is determined that a piece of medium identification information by at least two antennas of the plurality of antennas is read.

Furthermore, in an embodiment of the present invention, a preferable gaming table device further includes:

a game control device which, when an antenna reads medium identification information, accesses a management information database storing medium control information for controlling a game medium, and reads the medium control information from the management information database.

Furthermore, in an embodiment of the present invention, a preferable gaming table device further includes:

a game medium accommodating body which accommodates the game medium, and is disposed at a predetermined location of the game table, the game medium accommodating body having:

an accommodating base which serves as a basis of the game medium accommodating base, an accommodating cover body covering the accommodating base, a game medium disposition body which accommodates the game medium and allows the same to be inserted into and removed from in a predetermined mode, and is detachably mounted on the accommodating cover body.

The present invention can determine frauds precisely and prevent human errors.

BRIEF DESCRIPTION OF THE DRAWINGS

FIG. 9 is a drawing which shows the constitution of a chip ID table.

DESCRIPTION OF THE PREFERRED EMBODIMENTS

<<Outline of Embodiment>>

<<Collision Process>>

Figure 1A:
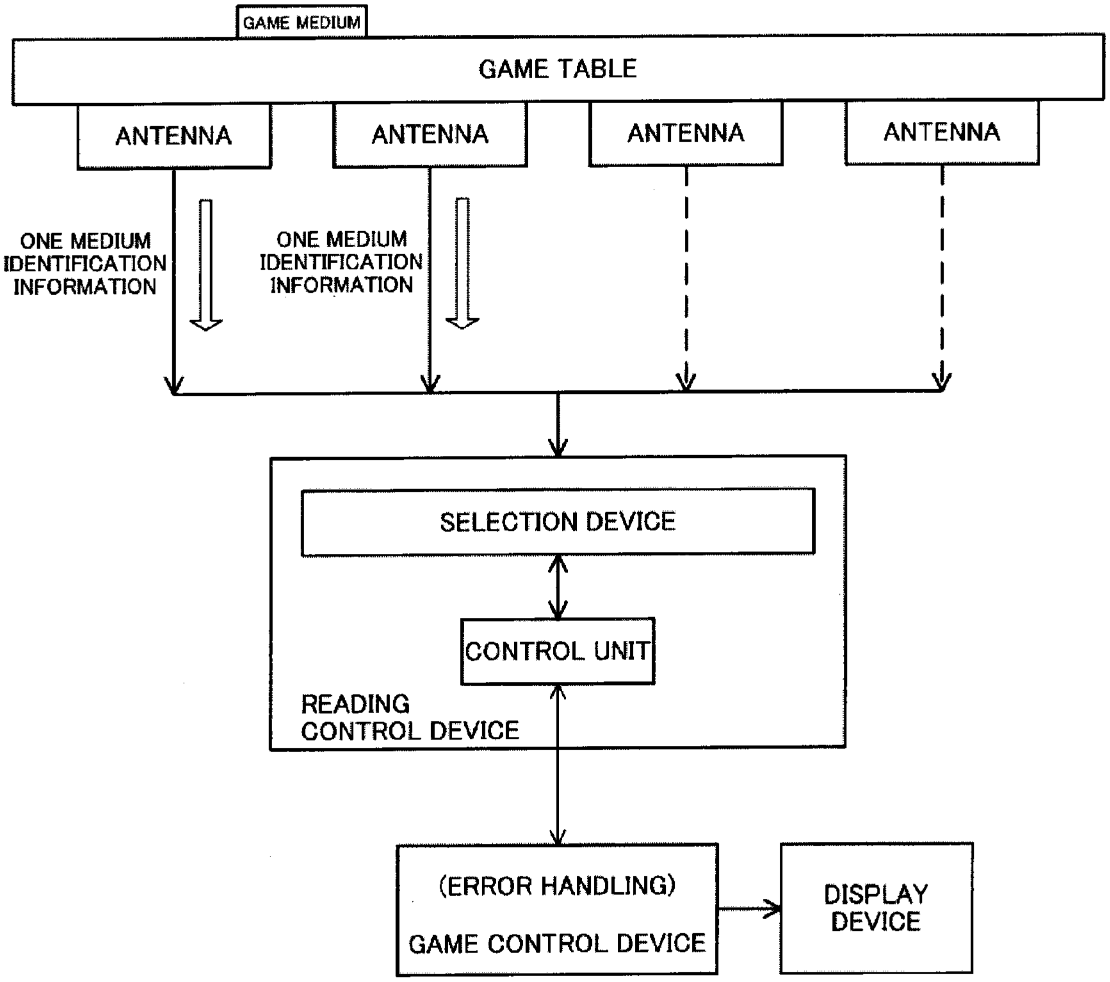
FIG. 1A is a block diagram which shows the outline of the first embodiment.

When the chip ID which identifies a gaming chip used for a game is read by a plurality of antennas, it is determined that the location of the gaming chip placed on a game table by a player is inappropriate and an error handling is executed.

By so configuring, determination that a bet which is different from a bet which a player originally wish to make is made can be prevented. Moreover, the determination that a bet of a player is of another player can be prevented.

<<Selection Antenna >>

When a plurality of antennas is controlled by two RF readers: the first RF reader and the second RF reader, the antenna which is read by the first RF reader selected is an antenna which is farther than an antenna which is read by the second RF reader.

The distance between the antenna which is read by the first RF reader and the antenna which is read by the second RF reader can be made longer than a predetermined distance, and chip-stored information such as the chip ID stored in the gaming chips can be prevented from being erroneously read.

<<Antenna Dynamic Selection>>

Time for reading chip-stored information such as the chip ID stored on gaming chips differs depending on the number of gaming chips placed on the game table by the player. Therefore, the order reading of the antennas is dynamically changed so that the above-mentioned conditions are met and reading can be completed as fast as possible.

The read time can be thus shortened and processing can be performed at a high speed.

<<Chip Database Access>>

The process of reading chip-stored information such as the chip ID stored on gaming chips by antennas, requires 10.x milliseconds per gaming chip. By demanding information in the chip database through the use of this read time, access to the chip database is completed nearly simultaneously with the completion of reading of the antennas.

By using the read time to gaming chips as access to the chip database, the time of the overall process relating to the gaming chips can be shortened.

<<Card Identification>>

Cards such as playing card disposed on the game table are identified by using a camera and a scanner.

The scanner is provided on a card shoe. When the dealer removes a card from the card shoe to deal cards to a player, the image of the card is read by the scanner. The image of the card read by the scanner obtains and stores the contents of the card marks and symbols indicating the number and suite of the card by executing a process such as image processing. By so configuring, when the game is initiated, the contents of the card dealt to the player can be stored and controlled.

The camera is installed above the game table to photograph the top surface of the game table. The photograph data taken by the camera identifies the details of the card such as marks and symbols indicating the number and suite of the card disposed on the game table by executing a process such as image processing. Especially, when the game is over, the cards used in the game and disposed on the game table are placed face up. The cards placed face up can be photographed by the camera, and the contents of the cards which show the results of the game can be obtained from the camera, stored and controlled.

The details of the cards when the game is started can be controlled by the scanner, and the details of the cards when the game is over can be controlled by the camera. By so configuring, frauds such as replacement of cards in the course of the game can be found, and the fairness and rightfulness of the game can be maintained. When the details of the cards obtained by the scanner and those of the cards obtained by the camera match, the obtained contents of the cards are validated as the results of the game.

<<Chip Reference Antenna>>

An antenna for indicating chip control information (validation, invalidation, lock information, the number of chips, etc.) for management of the gaming chips on a display for the dealer is provided in front of the dealer. The chip control information is information stored in a management server. By providing the chip reference antenna, when the gaming chips are registered and deleted, the dealer can confirm whether the chip control information is updated to the latest one.

For example, when gaming chips are given to the player, all of the gaming chips given to the player need to be validated. Validation of the gaming chips is carried out by a registration antenna. Before the gaming chips are given to the player, the dealer can confirm by the chip reference antenna whether or not all of the gaming chips are validated.

Moreover, when the gaming chips are collected from the player, all the collected gaming chips need to be invalidated. The invalidation of the gaming chips is carried out by a deleting antenna. Before the gaming chips are accommodated on a chip tray, the dealer can confirm whether or not all the gaming chips are invalidated by the chip reference antenna.

<<Change Payment>>

When the player provides the dealer with a fraction of the gaming chips, the dealer receives the fraction of the gaming chips, and pays a round number amount of chips depending on to the player.

For example, when the payout for the player at the end of the game is chips worth 98 dollars, adding two one dollar chips makes 100 dollar chips. In such a case, separate from the progress and results of the game, the dealer receives two one-dollar chips from the player, and gives one hundred dollar chip to the player as a payout. By so configuring, the player may only receive one hundred dollar chip as a payout, leading to easier handling of the gaming chips.

When the dealer gives a payout to the player, information regarding a payout is indicated on the display for the dealer. For example, the original amount of payout given to the player, a round number amount which is higher than that original payout, the difference between the original amount of payout and the round number amount and other information are indicated as information regarding a payout. A plurality of candidates of the round number amount may be indicated. The differences from each of that plurality of candidates are also indicated. By indicating such information regarding the payout on the display, it becomes easier for the dealer to ask the player how he/she would like the payout, and to confirm if the amount of the gaming chips received from the player is right or not. It should be noted that the term "round number amount" means, for example, an amount with the numbers in the one's digit and the ten's digit are 0 and 5.

Moreover, when the dealer receives the gaming chips equivalent to the difference from the player, the information which indicates that the gaming chips were received as the difference is transmitted to the management server with the chip ID. By so configuring, the information that the gaming chips are not those moved by a fraud can be controlled by the management server.

By allowing the player to receive the round number amount of the gaming chips, the player does not have to own many small amount gaming chips, and the number of the gaming chips he/she owns can be reduced. This provides convenience for players when they move in the gaming establishment or between the gaming establishments.

<<Direction to the Dealer>>

When the game is over, the location of the gaming chips to be collected from the player and the location of the chips given to the player as a payout are indicated on the display for the dealer and a sound is output to a headphone for the dealer. Furthermore, in the process of the game, depending on the situation of the progress of the game, the number and location of the cards dealt and other information may be indicated on the display for the dealer, or may be output to a headphone for the dealer.

Human errors by the dealer can be prevented. Regardless of the experience and skillfulness of the dealer, a constant level of service can be provided.

<<Levitation Process>>

Figure 22A:
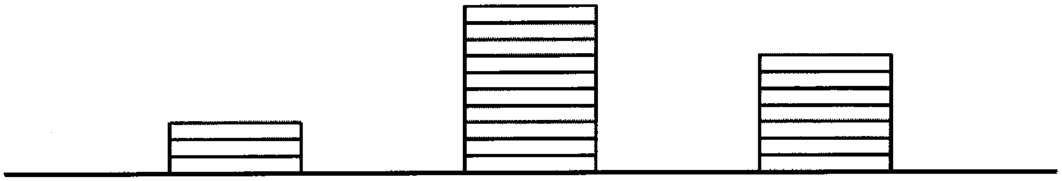
FIG. 22A is a drawing which shows the state that gaming chips are placed in betting areas in a plurality of portions.
Figure 22B:
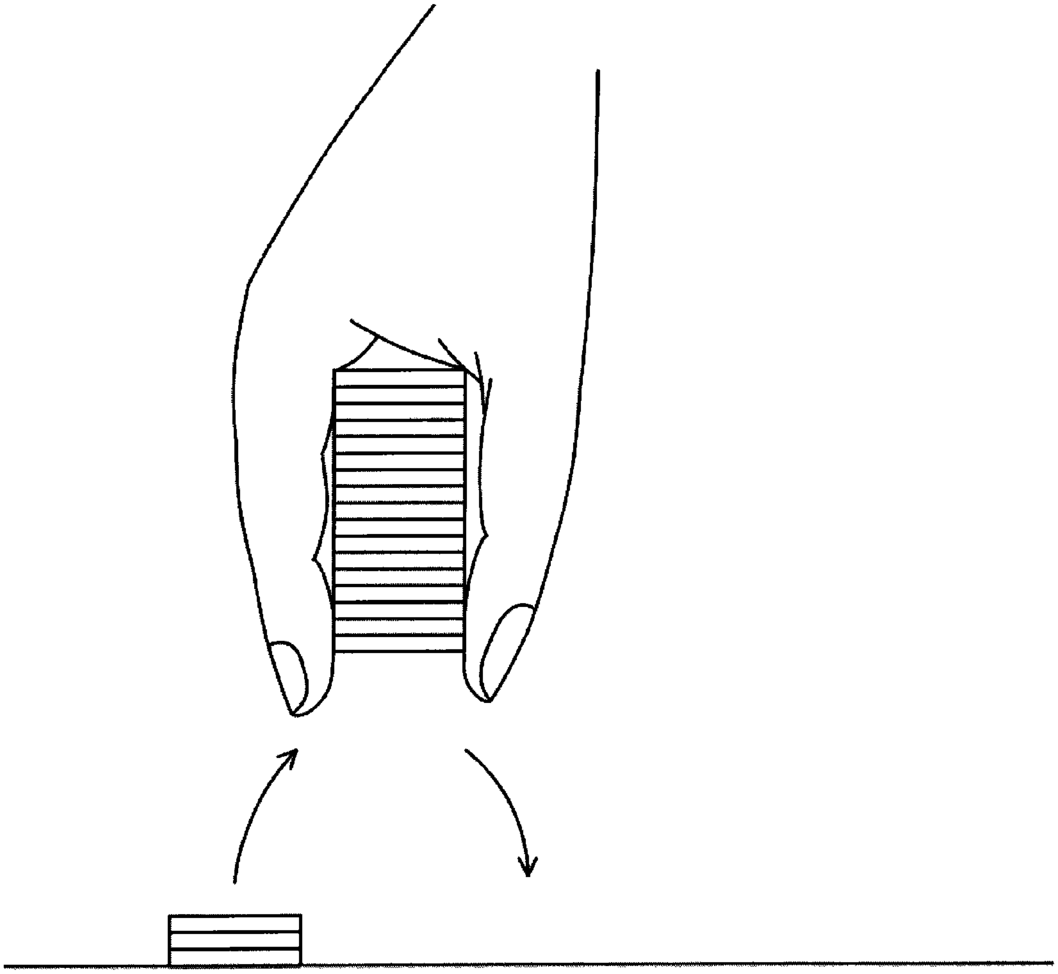
FIG. 22B is a drawing which shows the state that the dealer sequentially places the gaming chips in a plurality of betting areas.

The dealer gives (at the time of payout) gaming chips worth the payout to the player. The dealer may sometimes place gaming chips in a plurality of betting areas of the player (FIG. 22A). For example, the dealer holds twenty gaming chips stacked in the thickness direction, places three gaming chips in a first betting area, places ten gaming chips in a second betting area, and places seven gaming chips in a third betting area. In such a case, it is typical that the dealer first holds all the number of gaming chips to be given to the player, and then, the number of gaming chips depending on the betting area are sequentially placed in each of the plurality of betting areas (FIG. 22B). When such a manner of placing the gaming chips is employed, when the dealer places three gaming chips in a betting area, seventeen gaming chips are still present in the dealer's hand. At this time, when gaming chips are read by the antenna corresponding to the first betting area, not only the three gaming chips placed in the first betting area, but also the seventeen gaming chips held by the dealer may be simultaneously read. Such a phenomenon that the gaming chips which are not placed in the betting areas but are present in the air are read is referred to as levitation.

When such levitation occurs, gaming chips which should be originally placed in a betting area are read by the antenna corresponding to another betting area different from the betting area. Accordingly, gaming chips different from the original ones are read and processed in both the betting area and the other betting area. However, when such processing is performed, it has been difficult to determine if it is caused by a fraud or by levitation. Any fraud which may be committed must be found since it causes disadvantages or unfairness for other players. However, in case where it is determined that a fraud is committed although there is none committed, not only the player may experience unpleasantness, but also the reliability of the gaming establishment may be lowered.

When the player places gaming chips to make a bet on the game table, the player is holding the gaming chips, and therefore the location of the gaming chips is not settled. Moreover, the player often wonders where to place a bet, and until the game can be initiated, the location of the gaming chips is sometimes not settled. For such reasons, when gaming chips are read by the plurality of antennas, the location of the gaming chips may change over time. Thereafter, so-called chattering is removed. More specifically, gaming chips are read several times by the antennas at every predetermined period of time. When the number of times that the location of the gaming chips remains unchanged reaches a predetermined number, as the location of the final bet, this location of the gaming chips and the number of the gaming chips are validated.

By so configuring, unstableness of the details of the bet can be avoided when the game is started, and frauds can be thus found and prevented precisely.

<<Large Amount Gaming Chips>>

Gaming chips handled in gaming establishments such as casinos correspond to various amounts ranging from small to large amounts. Gaming chips of a predetermined amount or larger, so-called large amount gaming chips have high values and are therefore highly sought by players. Accordingly, large amount gaming chips are often the targets of frauds. For example, frauds involving obtaining small amount gaming chips and using the chips by modifying and copying them in imitation of large amount gaming chips are quite anticipated. By preventing and finding such frauds, rightful benefit of the player can be protected.

A gaming chip of a predetermined amount or larger is provided with a security area, in which basic memory information such as the chip ID is stored. The security area is encrypted. When the security area is read by an antenna, the security area is accessed to read and decode the basic memory information.

Since a gaming chip of a predetermined amount or larger is provided with a security area, a large amount gaming chips with no security area present thereon can be determined as being an invalid gaming chip involving fraudulent behavior such as modification. Moreover, even in case where large amount gaming chips should be fraudulently obtained and analyzed, the security area is encrypted and protected. Therefore, analysis of the security area is difficult, and frauds such as modification and counterfeit can be prevented.

<Chip-Stored Information>

In the present specification, the chip-stored information is information stored in a gaming chip, and includes various information characterizing the gaming chip, such as the administrator of the gaming chip, the chip ID and amount information.

<Chip Control Information>

In the present specification, the chip control information is information stored in a management server which is placed in a gaming establishment such as a casino, including various information regarding the game. It is not only the chip-stored information which is the information of the information gaming chips themselves, but also the information necessary for the gaming establishment to manage chips. Moreover, information such as player ID for specifying the player currently possessing the gaming chips may be contained. For example, validation and invalidation information, lock information, player information, face value information and various other information are included.

It should be noted that when the gaming chip has a readable and writable non-volatile memory, the chip control information may be adapted to be stored on the non-volatile memory of the gaming chip. The chip control information can be stored not only on the management server but also on the gaming chip. By so configuring, the chip control information on both can be compared so that any occurrence of fraud can be more easily found.

<<Chip Tray Structure>>

The chip tray structure has a three-layer structure comprising a chip tray, a board cover and a base. Furthermore, the chip tray structure has a lid body for covering the chip tray. The lid body can be locked to the chip tray to prevent frauds. The chip tray is a tray for accommodating chips given to the player and collected from the player. The chip tray is sectioned into a plurality of sections to cope with a predetermined number of players, for example, six sections for six players. A plurality of sections of the chip tray can accommodate chips used by each of the players.

The base is provided with an antenna. The antenna is disposed on the base to be approximately vertical to chips, and is capable of accessing a number of chips. The identification information of the chips accommodated in the chip tray can be read by the antenna.

The chip tray can be detachably provided on the board cover. Detachably providing the chip tray allows coping with two operational forms: the operational form such that the chip tray is fixed to the table, and the operational form such that the chip tray can be moved within the establishment. Moreover, providing the board cover detachably on the chip tray does away with the necessity to remove wirings and allows simple operation when the chip tray is removed from the substrate cover.

An antenna is provided on the base, which can read a gaming chip with a built-in RFID chip. When the dealer is changed and on other occasions, the antenna can read gaming chips on the chip tray to record and confirm integrity.

Furthermore, a display for the dealer and a touch panel device are also provided on the base. Since the display is tilted to face the dealer, the eye level of the dealer to the display and the eye level of the dealer to the player can be close, whereby the operability for the dealer can be improved.

<<Outline of First Embodiment>>

FIG. 1A is a block diagram which shows an outline of the first embodiment.

The player sometimes places gaming chips at an inappropriate location of the game table, for example, between betting areas, unintentionally or purposely. When a game is started in that situation, it is impossible to distinguish clearly on which the player has placed a bet, and therefore it may be interpreted as the bet which is more convenient for of the player, and the dealer may have to give the gaming chips to the player wastefully. Moreover, as for the betting areas, a dispute may occur between the player and the gaming establishment. For such reasons, a gaming table device which can determine that a gaming chip is placed at an inappropriate location of the game table, and provide the opportunity to place the gaming chip again in an appropriate location has been desired.

The gaming table device according to the first embodiment comprises:

a game table (for example, gaming table 100) on which a game medium (for example, gaming chip 500) storing the medium identification information (for example, the chip ID) is disposed, a plurality of antennas for reading the medium identification information of the game medium disposed on the game table through a wireless communication (for example, antenna for PLAYER bet 340, antenna for BANKER bet 342, antenna for TIE bet 344, antenna for PLAYER PAIR bet 346, antenna for BANKER PAIR bet 348, etc.), and a game control device (for example, main control device 210, etc.) which executes a predetermined error process (for example, steps S1015, S1017 and S1019 in FIG. 10, etc.) when it is determined that medium identification information is read by at least two antennas of the plurality of antennas.

When the medium identification information is read by at least two antennas, the game medium may not be placed in an appropriate location of game table, and it is therefore adapted to execute an error process. Determined as a bet which is different from a bet desired by the player can be prevented. Moreover, the accident that a bet of one player is determined to be of another player can be prevented. In such a manner, it can be so configured not to start the game when the game medium is not placed in an appropriate location, and therefore the unclear and inappropriate state when the game is started can be avoided. Confusion and trouble in the gaming establishment can be avoided, and frauds and human errors can be prevented and found.

Moreover, as the predetermined error handling, the game control device preferably outputs a determination signal indicating that the medium identification information is read by said at least two antennas of the plurality of antennas.

Furthermore, it is preferable that the gaming table device according to the first embodiment further includes a display device (dealer display 150) which shows the information indicating that medium identification information is read by said at least two antennas (for example, step S1015 in FIG. 10) by the determination signal which is output from the game control device.

Moreover, a preferable gaming table device according to the first embodiment includes:

a reading control device (for example, first RF reader 350, second RF reader 360) which selects one of the plurality of antennas, the reading control device having:

a control unit (for example, control unit 352) transmitting a selection signal indicating said one antenna, and a selection device (antenna switching portion 358) which receives the selection signal and selects said one antenna indicated by the selection signal from the plurality of antennas.

By the reading control device, each of the plurality of antennas can be selected sequentially, and the medium identification information transmitted from each of the plurality of antennas can be read by the game control device.

Moreover, it is preferable to determine whether at least two antennas which read the medium identification information are consistent antennas. When said at least two antennas are not consistent, it is possible that the game medium is moved. In such a case, it is highly likely that the medium identification information is read by at least two antennas, it is difficult to determine that gaming chips are placed in an inappropriate location of the game table. Therefore, first, it is preferable to determine whether or not said at least two antennas which have read the medium identification information are consistent, and confirm that the game medium in which medium identification information is stored is placed in a consistent location of the game table and is in a static state.

Furthermore, it is preferable to determine whether or not said at least two antennas are consistent at a predetermined period of time for predetermined times. By determining that said at least two antennas are consistent at this predetermined period of time for predetermined times, the state that the game medium is static can be more precisely determined.

Moreover, it is preferable to determine whether or not the medium identification information read by at least two antennas are consistent medium identification information at a predetermined period of time for predetermined times. It can be determined that the state that gaming chips are placed in an inappropriate location of the game table is maintained.

Furthermore, whether or not the number of the game media storing the medium identification information read by said at least two antennas is constant may be determined. By determining the number of game media, whether or not the state that gaming chips are placed in an inappropriate location of the game table is maintained can be precisely determined.

It is preferable that the information indicating that the medium identification information is read by at least two antennas is not only displayed on the display device, but this information is also transmitted to the management server when the gaming table device is connected to the management server. The information that the medium identification information is read by at least two antennas can be left in the management server as a history, and whether or not any fraud has been committed in the past and whether there is any possibility that any fraud has been committed can be determined.

Furthermore, when the location in which the gaming chip is placed is between betting areas of the player on the game table, it is preferable to display the information indicating that the medium identification information is read by at least two antennas on the display for the player of the player. By so configuring, the information that a gaming chip has been placed in an inappropriate location of the game table can be recognized by the player.

<<Outline of Second Embodiment>>

Figure 1B:
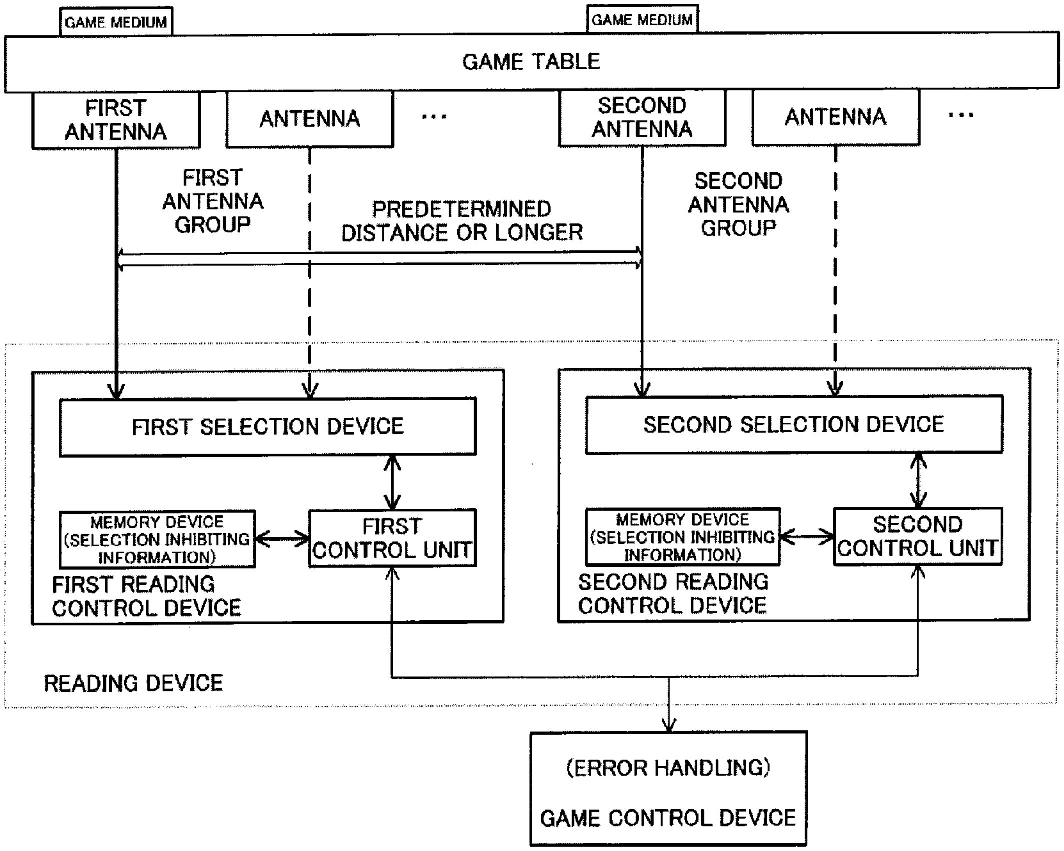
FIG. 1B is a block diagram which shows the outline of the second embodiment.

FIG. 1B is a block diagram which shows an outline of the second embodiment.

The game table is provided with a plurality of betting areas for placing gaming chips. A gaming chip is placed in a betting area desired by the player. Where to place a gaming chip in the plurality of betting areas is decided by the intention of the player. Therefore, it is necessary to read gaming chips placed on all the plurality of betting areas. Time for reading all the plurality of betting area is necessary. For such reasons, reading is preferably carried out by using the plurality of antennas concurrently and simultaneously. However, when a plurality of antennas which are closely disposed are used, trouble such as interference are likely to occur. A gaming table device which can reduce read time by using a plurality of antennas simultaneously and reading chips without such trouble is desired.

The gaming table device according to the second embodiment comprises:

a game table (for example, gaming table 100) on which a game medium (for example, gaming chip 500) storing the medium identification information (for example, the chip ID) is disposed, a plurality of antennas for reading the medium identification information of the game medium disposed on the game table through a wireless communication, the plurality of antennas being disposed in locations spaced away from each other (for example, antenna for PLAYER bet 340, antenna for BANKER bet 342, antenna for TIE bet 344, antenna for PLAYER PAIR bet 346, antenna for BANKER PAIR bet 348, etc.), and a reading device which, when a first antenna of the plurality of antennas is selected, selects a second antenna which is at a predetermined distance from the first antenna of the plurality of antennas (for example, first RF reader 350, second RF reader 360 and main control device 210).

The plurality of antennas are disposed in locations spaced away from each other, and are capable of reading the medium identification information of a game medium in each of the locations. However, when the distance between the selected two antennas is shorter than a predetermined distance, interference may occur in a wireless communication, which may cause difficulty in reading the medium identification information. Therefore, by selecting the second antenna which is at a predetermined distance from the first antenna, the medium identification information can be precisely read.

Moreover, it is preferable that the gaming table device according to the second embodiment further comprises:

a memory device (for example, first RF reader 350, second RF reader 360, RAM and hard disk device of the main control device 210, etc.) storing selection inhibiting information for defining a combination of antennas which are not simultaneously selected by the reading device among the plurality of antennas (for example, simultaneous access inhibition list, etc.), and the reading device referring to the selection inhibiting information and determining at least two antennas selected simultaneously.

Moreover, in the gaming table device according to the second embodiment, the reading device preferably has a first reading control device (for example, first RF reader 350), and a second reading control device (for example, second RF reader 360) different from the first reading control device, the plurality of antennas having a first antenna group comprising at least two antennas (antennas for PLAYER bet 340*a* to 340*c*, antennas for BANKER bet 342*a* to 342*c*, antennas for TIE bet 344*a* to 344*c*, antennas for PLAYER PAIR bet 346*a* to 346*c* and antennas for BANKER PAIR bet 348*a* to 348*c*, etc.), a second antenna group different from the first antenna group and comprising at least two antennas (for example, antennas for PLAYER bet 340*d* to 340*f*, antennas for BANKER bet 342*d* to 342*f*, antennas for TIE bet 344*d* to 344*f*, antennas for PLAYER PAIR bet 346*d* to 346*f* and antennas for BANKER PAIR bet 348*d* to 348*f*, etc.), each of the first antenna and the second antenna having of an antenna, the first reading control device having a first control unit (for example, control unit 352 of the first RF reader 350) transmitting a first selection signal indicating the first antenna, and a first selection device which receives the first selection signal, and selects the first antenna indicated by the first selection signal from the first antenna group (for example, antenna switching portion 358 of the first RF reader 350), the second reading control device having a second control unit transmitting a second selection signal indicating the second antenna (for example, control unit 352 of the second RF reader 360), and a second selection device which receives the second selection signal and selects the second antenna indicated by the second selection signal from the second antenna group (for example, antenna switching portion 358 of the second RF reader 360), the first reading control device reading the medium identification information by the first antenna selected by the first selection device through a wireless communication, and the second reading control device reading the medium identification information by the second antenna selected by the second selection device through a wireless communication.

The first antenna group is controlled by the first reading control device, while the second antenna group is controlled by the second reading control device, so that occurrence of interference between the antennas of the first antenna group and the antennas of the second antenna group is prevented, and the medium identification information can be precisely read.

<<Outline of Third Embodiment>>

Figure 1C:
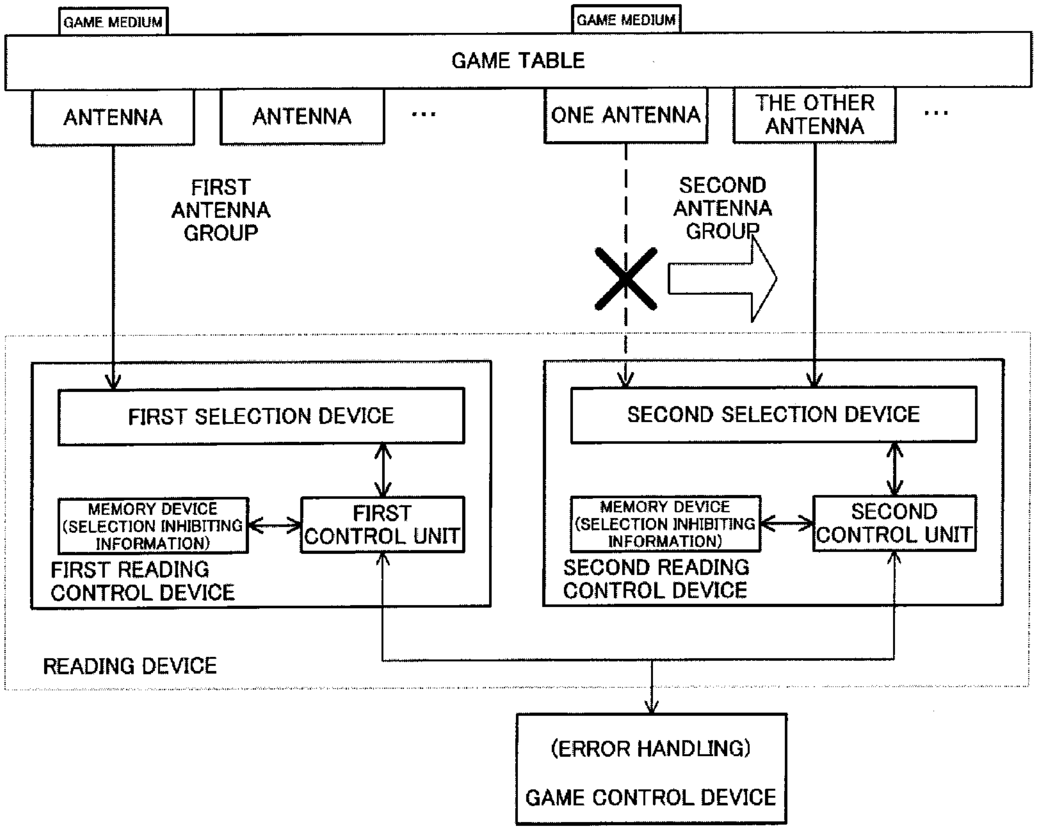
FIG. 1C is a block diagram which shows the outline of the third embodiment.

FIG. 1C is a block diagram which shows an outline of the third embodiment.

As described in the outline of the second embodiment, it is preferable to read all the plurality of betting areas concurrently and simultaneously by using the plurality of antennas. However, when a plurality of antennas closely disposed is used, trouble such as interference is very likely to occur. A gaming table device which can reduce read time by using a plurality of antennas simultaneously and reading chips without such trouble is desired.

The gaming table device according to the third embodiment comprises:

a game table (for example, gaming table 100) on which a game medium (for example, gaming chips 500) storing the medium identification information (for example, the chip ID) is disposed, a plurality of antennas for reading the medium identification information of the game medium disposed on the game table through a wireless communication (for example, antenna for PLAYER bet 340, antenna for BANKER bet 342, antenna for TIE bet 344, antenna for PLAYER PAIR bet 346, and antenna for BANKER PAIR bet 348, etc.), a memory device storing selection inhibiting information for defining a combination of antennas which are not simultaneously selected among the plurality of antennas (for example, simultaneous access inhibition list, etc.) (for example, first RF reader 350, second RF reader 360, RAM and hard disk device of the main control device 210, etc.), and a read device which selects the plurality of antennas in a predetermined order, reads and obtains the medium identification information by the selected antenna, refers to the selection inhibiting information and determines whether an antenna can be selected, determines, when said one antenna cannot be selected, whether another antenna can be selected next to said one antenna in accordance with the predetermined order, and, changes the order of selection of said one antenna (for example, step S1145 in FIG. 11, etc.) (for example, first RF reader 350, second RF reader 360 and main control device 210).

When an antenna cannot be selected, whether the next different other antenna can be selected is determined, and the order of selection of an antenna is changed. Accordingly, the read order can be dynamically changed, and reading operation is sequentially proceeded with no waiting, and the read time can be reduced, leading to higher processing rate.

Moreover, when the first antenna of the plurality of antennas is selected, the reading device preferably refers to the selection inhibiting information to determine whether the first antenna and said one antenna can be simultaneously selected. When the first antenna and said one antenna cannot be simultaneously selected, the reading device preferably determines whether the different antenna can be selected in accordance with the predetermined order, and finally changes the order of selection of said one antenna (for example, step S1145 in FIG. 11, etc.).

Furthermore, a preferable gaming table device according to the third embodiment further includes:

a memory device storing selection inhibiting information (for example, simultaneous access inhibition list) which indicates the combination of antennas inhibited to be selected simultaneously of the plurality of antennas (for example, first RF reader 350, second RF reader 360, RAM and hard disk device of the main control device 210, etc.), when the combination of a first selection candidate antenna determined as a selection candidate by the first reading control device of the antennas in the first antenna group and a second selection candidate antenna determined as a selection candidate by the second reading control device of the antennas in the second antenna group is not a combination inhibited by the selection inhibiting information, the first reading control device selecting the first selection candidate antenna as the first antenna, and the second reading control device selecting the second selection candidate antenna as the second antenna.

Antennas which can be simultaneously selected can be determined by the selection inhibiting information, whereby occurrence of interference between an antenna in the first antenna group and an antenna in the second antenna group is prevented so that the medium identification information can be precisely read.

Furthermore, in the gaming table device according to the third embodiment, it is preferable that, when the first reading control device performs a reading operation by selecting the first antenna, the information indicating that the first reading control device is in a reading operation by the first antenna is stored in a mutual inspection storage area (for example, mutual inspection area described later), the second reading control device referring, when the second selection candidate antenna is selected, to the mutual inspection storage area, and selecting, when a reading operation is performed by the first antenna, if the second selection candidate antenna and the first antenna are not a combination inhibited by the selection inhibiting information, the second selection candidate antenna as the second antenna.

By providing and referring to the mutual inspection storage area in such a manner, the first reading control device and the second reading control device can obtain each other's operation states, and can refer to the selection inhibiting information responsive to the operation states of the first and second reading control devices, so that the antenna which can be caused to carry out the reading operation can be precisely and quickly selected.

Moreover, in the gaming table device according to the third embodiment, the mutual inspection storage area is preferably formed in the memory device mentioned above, for example, first RF reader 350, second RF reader 360, RAM and hard disk device of the main control device 210, etc.).

<<Outline of Fourth Embodiment>>

Figure 1D:
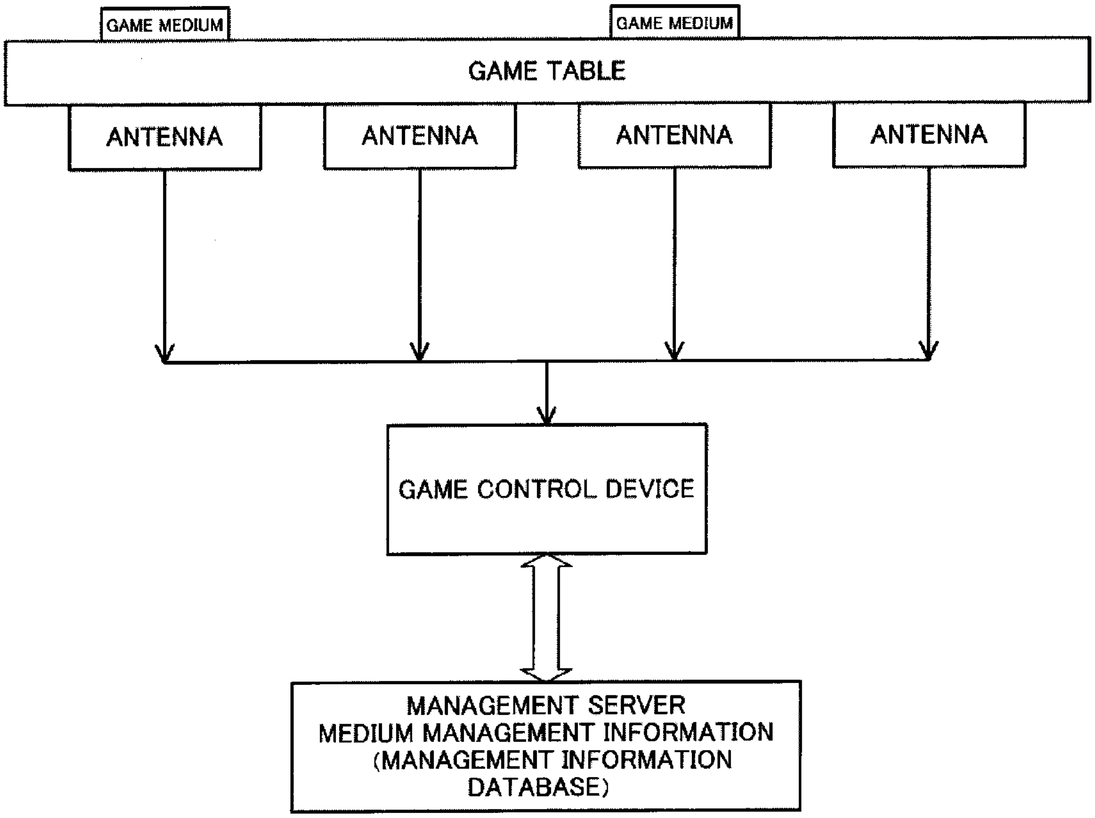
FIG. 1D is a block diagram which shows the outline of the fourth embodiment.

FIG. 1D is a block diagram which shows an outline of the fourth embodiment.

The game table is provided with a plurality of betting areas for placing a gaming chips. Where to place a gaming chip in the plurality of betting areas is decided by the intention of the player. For such reasons, it is necessary to read gaming chips placed on all the plurality of betting areas. It requires a certain period of time to read the medium identification information (for example, the chip ID). Moreover, not only reading the medium identification information, but also obtaining various management information of the read gaming chips and determining whether are appropriate the gaming chips used for betting are necessary. For such reasons, a gaming table device in which the time required to process a bet can be a short period of time by utilizing the read time of the medium identification information has been desired.

The gaming table device according to the mode of the fourth embodiment comprises:

a game table (for example, gaming table 100) on which a game medium (for example, gaming chip 500) storing the medium identification information (for example, the chip ID) is disposed, a plurality of antennas for reading the medium identification information of the game medium disposed on the game table through a wireless communication (for example, antenna for PLAYER bet 340, antenna for BANKER bet 342, antenna for TIE bet 344, antenna for PLAYER PAIR bet 346, antenna for BANKER PAIR bet 348, etc.), and a game control device which, when an antenna reads medium identification information, accesses a management information database (for example, gaming chip server 410) storing medium control information for controlling game media (for example, step S1213 in FIG. 12), and reads the medium control information from the management information database (for example, step S1215 in FIG. 12) (for example, main control device 210).

When an antenna reads medium identification information, since the medium control information is read from the management information database, the medium control information can be received during the time required to read the next medium identification information from the management information database, and the access to the management information database can be also completed nearly simultaneously with the reading of all the plurality of antennas.

Moreover, the game control device preferably selects sequentially one antenna from the plurality of antennas, and each time the selected one antenna reads the medium identification information, reads the medium control information from the management information database.

Furthermore, the management information database is preferably stored on the management server, and is connected in communication with the management server (for example, gaming chips server 410).

Furthermore, the management information database preferably initiates access to the management information database after the medium identification information of at least one game medium is read. Since the medium identification information of at least one game medium is read, the management information database can be accessed, and the read time of the medium identification information can be effectively utilized. Moreover, access to the management information database may be started after the medium identification information of the plurality of game media is read. Depending on the read time of the medium identification information, access can be started after certain pieces of medium identification information are accumulated. In either case, by enabling parallel execution of the operation of reading the medium identification information of the game medium and the access to the management information database, the timing of the initiation of the access to the management information database can be after the medium identification information of at least one game medium is read.

<<Outline of Fifth Embodiment>>

On the game table, the scanner which reads cards such as playing cards can obtain the details of cards only when the dealer deals and places cards. However, once cards are placed on the game table, or dealt to the player, and in the course of the game, even if cards are moved, cards could not be tracked until the cards are collected. For such reasons, even if there is any fraud such as replacement of cards in the course of the game, who has committed the fraud and at what timing could not be often completely sought. Therefore, a gaming table device which can track all of the cards used in the game in all steps of the game from the time when cards are placed on the game table or dealt to the player to the time when the cards are collected has been desired.

Figure 13:
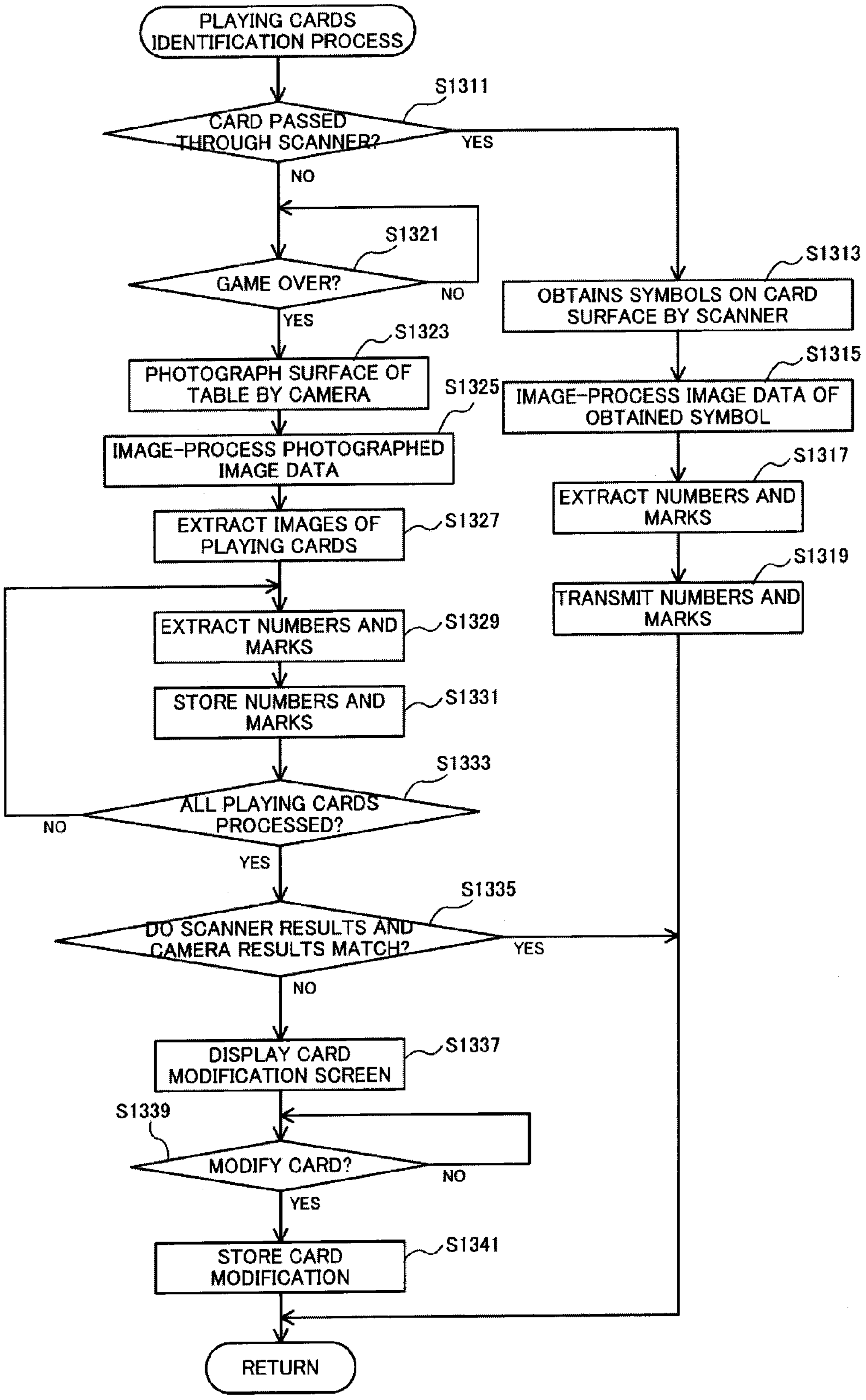
FIG. 13 is a flowchart which shows a subroutine of the process for identifying playing cards.

The gaming table device according to the fifth embodiment comprises:

a game table (for example, gaming table 100) on which cards are disposed for playing a card game, a camera (for example, card recognition camera 110) for photographing the game table, a card data capturing device (for example, scanner of shoe for identifying cards 120) for converting symbols on the surfaces of the cards into image data and capturing the image data, and a game control device (for example, main control device 210) which, when the cards are dealt to the player, obtains the details of the cards dealt to the player from the image data captured by the card data capturing device, obtains the details of the cards from the photographic data photographed by the camera the cards disposed on the game table when the game is over, and compares to determine whether or not the details of the cards from the image data match the details of the cards from the photographic data (for example, step S1335 in FIG. 13).

Moreover, the gaming table device according to the fifth embodiment is preferably such a gaming table that, extracts a card candidate area where the cards are photographed based on a difference in brightness of photographic data photographed by the camera, and when the ratio of the length of the side along the direction of the card candidate area to the length along another direction different from the direction is a predetermined ratio, determines the card candidate area as a card area in which the cards are present.

By so configuring, when a plurality of cards are placed on the game table, they are disposed in such a manner that the distance between each of the plurality of cards and the camera is different. When the distances to the camera are different, the photographed cards the cards photographed may have different sizes and shapes. For example, a card which is originally a rectangle may be photographed to have a distorted shape such as a trapezoid. However, since an object is determined whether or not it is a card by the ratio of its length and width, it can be determined that it is a card placed on the game table even when in the photograph are somewhat different in the size and shape of the card.

<<Outline of Sixth Embodiment>>

When the dealer gives gaming chips to the player, the gaming chips needs to be validated and unlocked so that the gaming chips can be used in the game. When gaming chips are validated and unlocked, the registration antenna is used. In contrast, when the dealer collects gaming chips from the player, the gaming chips need to be invalidated and locked so that the gaming chips cannot be used in the game. When the gaming chips are invalidated and locked, the deleting antenna is used.

When the registration antenna is used, the gaming chips are basically validated and unlocked. Moreover, when the deleting antenna is used, the gaming chips are basically invalidated and locked. The dealer sometimes wishes to confirm the state of the gaming chips. For this reason, by switching the operation of the registration antenna and deleting antenna from the original operation to the operation for confirmation, the registration antenna and deleting antenna can be substituted. However, the dealer needs to perform an operation for switching the operation, and which inevitably complicates the operation of the dealer.

Furthermore, when the operation of switching is carried out on a plurality of gaming chips of a plurality of players, the possibility that human errors are generated by the dealer is increased, which may result in lowered reliability of the gaming establishment.

Thus, a gaming table device which provides simple operation for the dealer, and prevents occurrence of human errors by the dealer has been desired.

Figure 14:
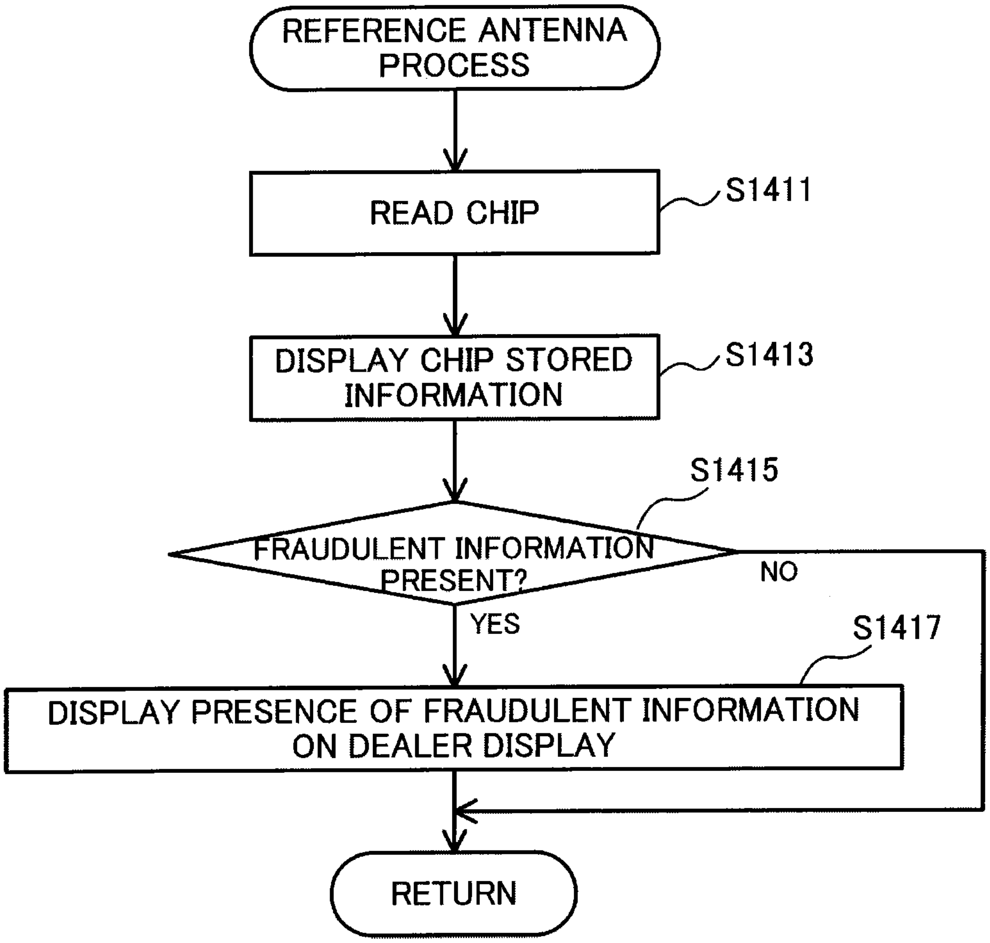
FIG. 14 is a flowchart which shows a subroutine of processing of a reference antenna 330.

The gaming table device according to the sixth embodiment comprises:

a game table (for example, gaming table 100) on which a game medium (for example, gaming chip 500) storing the medium-stored information containing the medium identification information (for example, the chip ID) is disposed, an antenna (for example, reference antenna 330, etc.) which reads the medium-stored information of the game medium through a wireless communication, and a game medium given to the player or a game control device (for example, main control device 210) which determines whether or not the medium-stored information generated by reading the game medium by the antenna when collected from the player is appropriate (for example, step S1415 in FIG. 14).

Moreover, the gaming table device according to the sixth embodiment further comprises:

a display device (for example, dealer display 150) which indicates information depending on the results of the determination by the game control device, the game control device preferably determines whether or not the game medium is valid when given to the player, and whether the game medium is invalid when collected from the player, and indicates the results the determination on a display device (for example, step S1417 in FIG. 14).

<<Outline of Seventh Embodiment>>

When the player is playing a game in a gaming establishment such as a casino, the number gaming chips corresponding to different amounts is often increased gradually. In particular, the number of gaming chips corresponding to small amounts tends to be increased. In such a case, such small amount gaming chips can be changed to those corresponding to large amounts at the cashier and the like of the gaming establishment. However, going to the cashier or the like between game plays is extremely troublesome. Therefore, most players move within the gaming establishment while carrying different gaming chips corresponding to different amounts although it is inconvenient.

For such reasons, a system and a gaming table device in which the dealer can function as the cashier based on the results of the game has been desired.

The gaming table device according to the seventh embodiment comprises:

a game table (for example, gaming table 100) on which a game medium (for example, gaming chip 500) storing the medium-stored information containing the medium identification information (for example, the chip ID) is disposed, an antenna (for example, reference antenna 330, etc.) which reads the medium-stored information through a wireless communication of the game medium, and a game control device (for example, main control device 210) which generates (for example, step S1515 in FIG. 15) round up information indicating the numerical value obtained by rounding up a fraction of the numerical value which shows the negotiable value of a game medium for payout given to the player as a payout.

Figure 15:
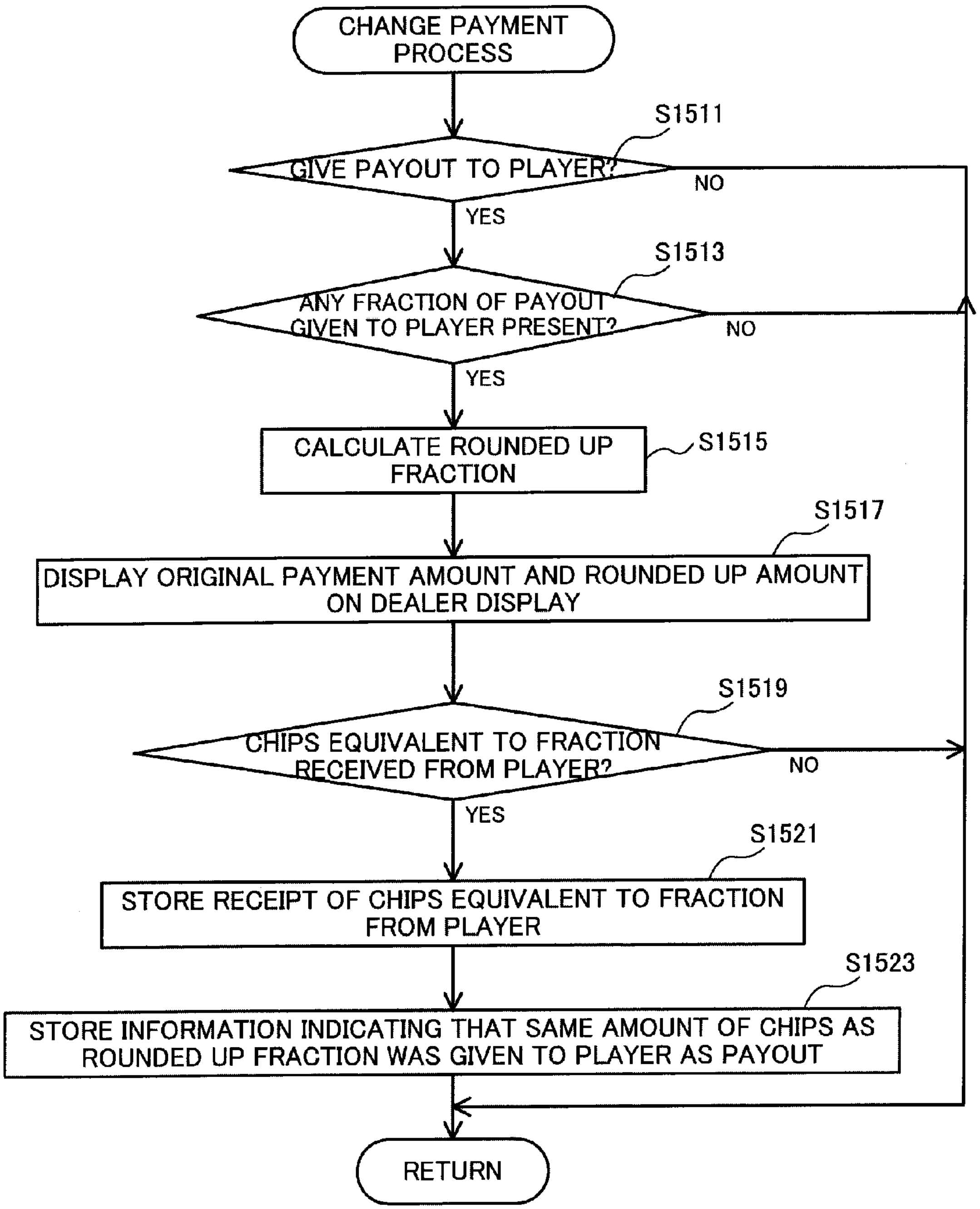
FIG. 15 is a flowchart which shows a subroutine of a change payment process.

Moreover, a preferable gaming table device according to the seventh embodiment further comprises:

a display device (for example, dealer display 150) which indicates the round up information, and a memory device (for example, RAM and hard disk device of main control device 210) which stores various information, the game control device storing information which indicates that the dealer has received a game medium worth the fraction from the player, and information that the dealer gives a game medium of the numerical value obtained by rounding up the fraction to the player as a payout in the memory device (for example, step S1521 and S1523 in FIG. 15).

Furthermore, in a preferable gaming table device, the numbers on the digits which are lower than a predetermined digit of the numerical value indicating the negotiable value of the game medium are the fractions. Furthermore, in a preferable gaming table device, the fraction and the round up information are indicated on the display device (for example, step S1517 in FIG. 15).

<<Outline of Eighth Embodiment>>

In gaming establishments such as casinos, various information instruments have been introduced for automation of processing and for other reasons in order to find and prevent frauds. However, the dealer, who is a human being, has to intervene in the progress of the game. For such reasons, the dealer may not be able to smoothly proceed the game depending on his/her experience, knowledge and other conditions. Moreover, even a skilled dealer can make a human error such as misunderstanding as long as he/she is human.

From such a perspective, a system and gaming table device in which the game can be smoothly proceeded, regardless of the experience, knowledge and other conditions of the dealer, or with reduced human errors, are desired.

The gaming table device according to the eighth embodiment comprises:

a game table (for example, game table 100) on which a game medium (for example, gaming chips 500) storing the medium identification information (for example, the chip ID) is disposed, a plurality of antennas (for example, antenna for PLAYER bet 340, antenna for BANKER bet 342, antenna for TIE bet 344, antenna for PLAYER PAIR bet 346, antenna for BANKER PAIR bet 348, deleting antenna 310, registration antenna 320, reference antenna 330, etc.) which reads the medium identification information of the game medium disposed on the game table through a wireless communication, an operation information storage means (for example, RAM and hard disk device of main control device 210) storing correspondence operation information indicating the operation of the dealer depending on the progress of the game, a game control device (for example, main control device 210, etc.) which refers to the correspondence operation information stored on the operation information storage means, and outputs a directional information for direction the operation of the dealer responsive to the progress of the game (for example, step S1619, S1621, S1623 in FIG. 16, etc.), and a recognition device (dealer display 150) which transmits the output directional information so that the dealer can recognize the directional information.

<<Outline of Ninth Embodiment>>

When the dealer gives gaming chips to the player, in order to quickly proceed the process, first, in general, the dealer holds the total number of gaming chips to be given to the player, and then sequentially places gaming chips the number corresponding to the betting area in each of a plurality of betting areas generally (FIG. 22B).

Therefore, while the dealer is in the process of giving the gaming chips to the player, the gaming chips which are already placed on the game table and the gaming chips held by the dealer may be both read by the antenna (levitation). For this reason, information different from the number and amount of the gaming chips which are actually placed on the game table are collected, and it has been difficult to determine whether the difference results from a fraud or occurrence of levitation.

From such a perspective, a gaming table device which can determine that levitation has occurred and obtain the number and amount of the gaming chips which are actually placed on the game table is desired.

Figure 17:
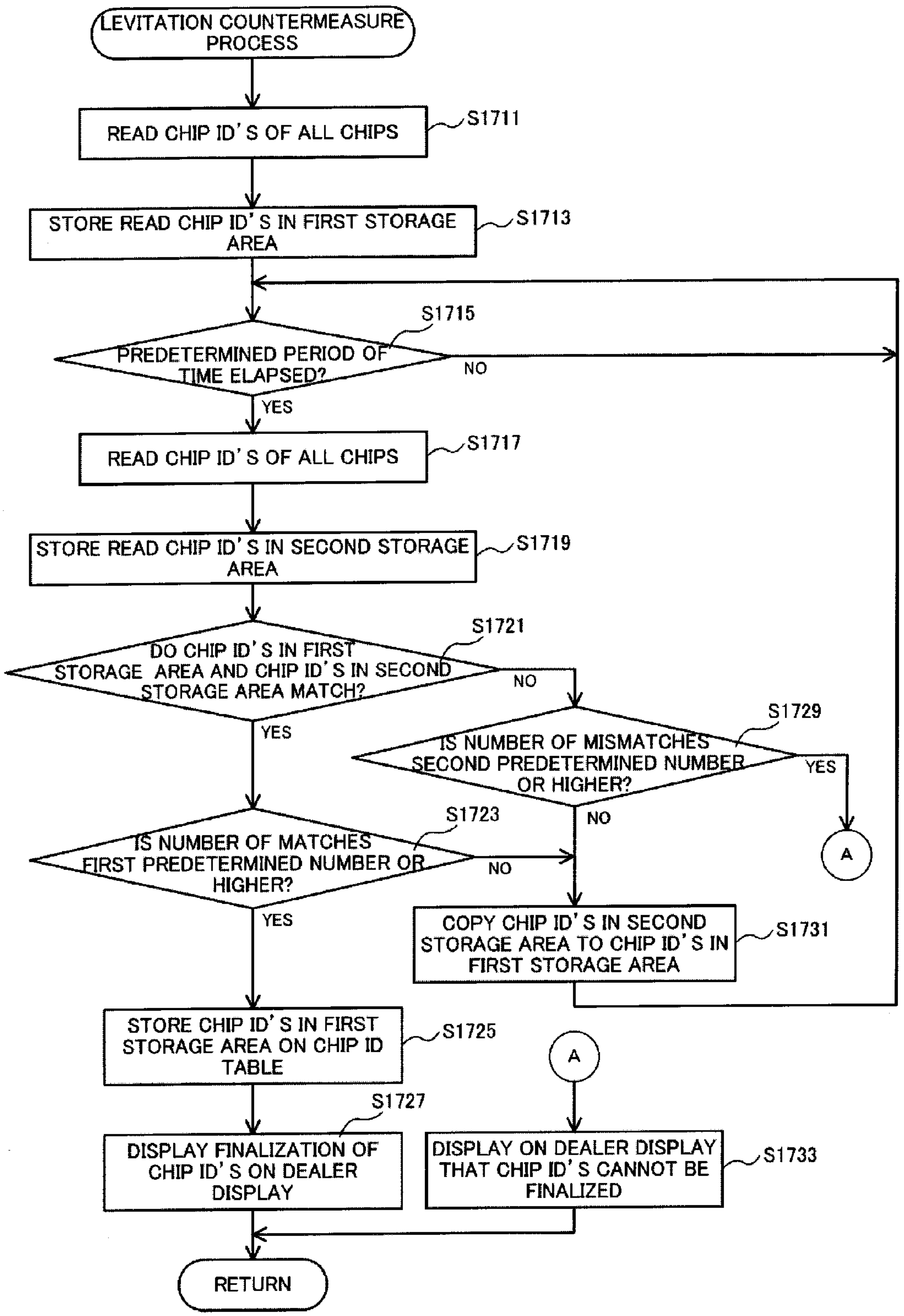
FIG. 17 is a flowchart which shows a subroutine of a levitation countermeasure process.

The gaming table device according to the ninth embodiment comprises:

a game table (for example, game table 100) on which a game medium (for example, gaming chips 500) storing the medium identification information (for example, the chip ID) is disposed, an antenna which reads the medium identification information of the game medium disposed on the game table through a wireless communication (for example, antenna for PLAYER bet 340, antenna for BANKER bet 342, antenna for TIE bet 344, antenna for PLAYER PAIR bet 346, antenna for BANKER PAIR bet 348, deleting antenna 310, registration antenna 320, reference antenna 330, etc., and a game control device (for example, main control device 210, etc.) which performs the reading operation of the antenna for predetermined period, and when the medium identification information could be read for a certain period in the predetermined period, validates the presence of said one medium identification information (for example, step S1725 in FIG. 17, etc.).

The game medium can be detect and read precisely even if the game medium is moved by the player. The certain period may be a part or all of the period in the predetermined period. The certain period is desirably a certain continuous period. The certain period may be the total of a plurality of discontinuous periods.

Moreover, in the gaming table device according to the ninth embodiment, it is preferable that the game control device performs the reading operation of the antenna for a plurality of times, and when the medium identification information could be read over a predetermined times of the plurality of times, and validates the presence of said one medium identification information.

Furthermore, in the gaming table device according to the ninth embodiment, it is preferable that the game control device performs the reading operation of the antenna at each predetermined period of time in the predetermined period, and when the medium identification information could be read for predetermined times, validates the presence of said one medium identification information.

<<Outline of Tenth Embodiment>>

Gaming chips handled in gaming establishments such as casinos cope with various amounts ranging from small to large amounts. Among these, in particular, large amount gaming chips are likely to be the target of frauds. For this reason, gaming chips which are difficult to modify or copy are desired.

The game medium according to the tenth embodiment comprises:

medium identification information (for example, the chip ID, etc.) for identification, value information (for example, denomination data and amount data, etc.) indicative of having a predetermined negotiable value, and a storage area storing information for confirmation (for example, security area and security code, etc.) indicating that the negotiable value is a predetermined value or higher.

By examining the presence or absence the information and the details of the same for confirmation, it can be confirmed and guaranteed that it is not a modified game medium or a copied game medium, but an authentic game medium.

Moreover, the information for confirmation is preferably converted into coded data stored and in the storage area.

The reliability of this game medium can be increased.

<<Outline of Eleventh Embodiment>>

In a gaming establishment such as a casino, a chip tray for containing gaming chips for use in a game are used. Since a plurality of gaming chips can be contained on a chip tray, management such as possession and storage need to be carried out sufficiently.

In gaming establishments, there are two operational forms: one in which the chip tray is fixed to the table, and the other in which the chip tray can be moved in the establishment. In particular, when the chip tray is moved in the establishment, locking and other management are necessary. Moreover, it is preferable that when the chip tray is moved in the establishment, handling by employees including the dealer, as well as management, is simplified.

The game medium accommodating body (for example, chip tray structure 600, etc.) according to the eleventh embodiment, an accommodating base (for example, base 630, etc.) which serves as the basis, an accommodating cover body (for example, board cover 620, etc.) covering the accommodating base, and a game medium disposition body (for example, chip tray 610, etc.) which accommodates the game medium and allows the same to be inserted into and removed from in a predetermined mode and is detachably mounted on the accommodating cover body.

Moreover, in the game medium accommodating body (for example, chip tray structure 600, etc.) according to the eleventh embodiment, the game medium accommodating body (for example, chip tray structure 600, etc.) comprises a game medium disposition body which accommodates a game medium storing the medium identification information so as to allow the gaming medium to go in and out of the game medium disposition body (for example, chip tray 610, etc.), an accommodating cover body (for example, board cover 620, etc.) which detachably accommodates the game medium disposition body, an accommodating base which accommodates the accommodating cover body, and an accommodating base (for example, base 630, etc.) comprising a plurality of antennas which are provided so as to read the medium identification information of the game medium accommodated by the game medium disposition body through a wireless communication.

Moreover, in the game medium accommodating body (for example, chip tray structure 600, etc.) according to the eleventh embodiment, it is preferable that the game medium disposition body further has an opening portion formed to allow a game medium (for example, gaming chips 500, etc.) go in and out of the game medium disposition body, and detachably mounted on the game medium disposition body and a lid body (for example, lid body 660, etc.) covering the opening portion.

Furthermore, in the game medium accommodating body (for example, chip tray structure 600, etc.) according to the eleventh embodiment, it is preferable that the accommodating cover body has a latch (for example, projections 628*a*, 628*b*, 628*c* and 628*d*, etc.) which latches at a predetermined location in the accommodated game medium disposition body, and the game medium disposition body has a latched portion (for example, through-holes 618*a*, 618*b*, 618*c* and 618*d*, etc.) latched by the latch.

<Embodiment According to the Present Invention>>

Embodiments according to the present invention will be described below based on the drawings.

<Outline of Game Table 100>>

Figure 2:
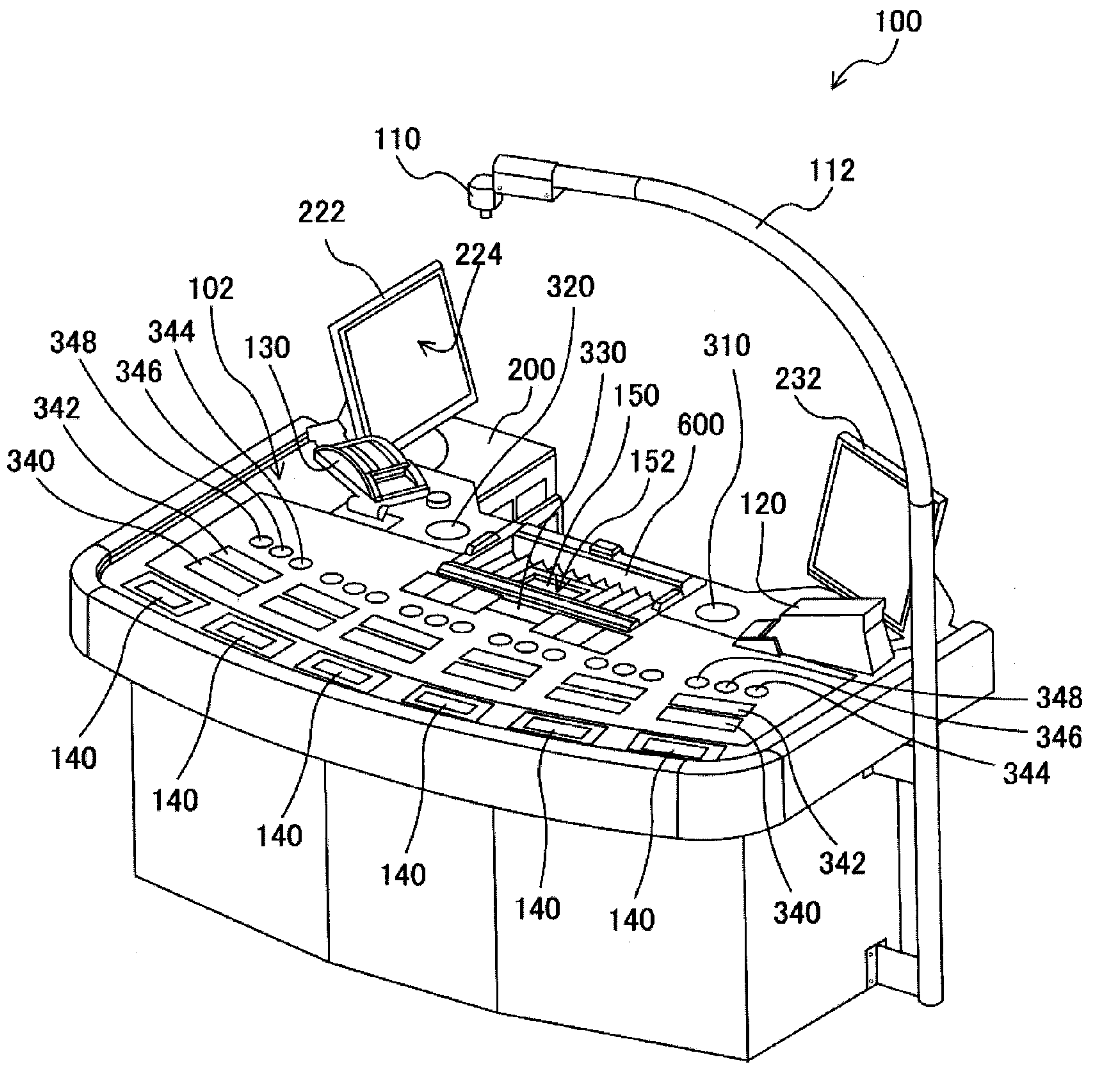
FIG. 2 is a perspective view which shows the constitution of a game table 100.
Figure 3:
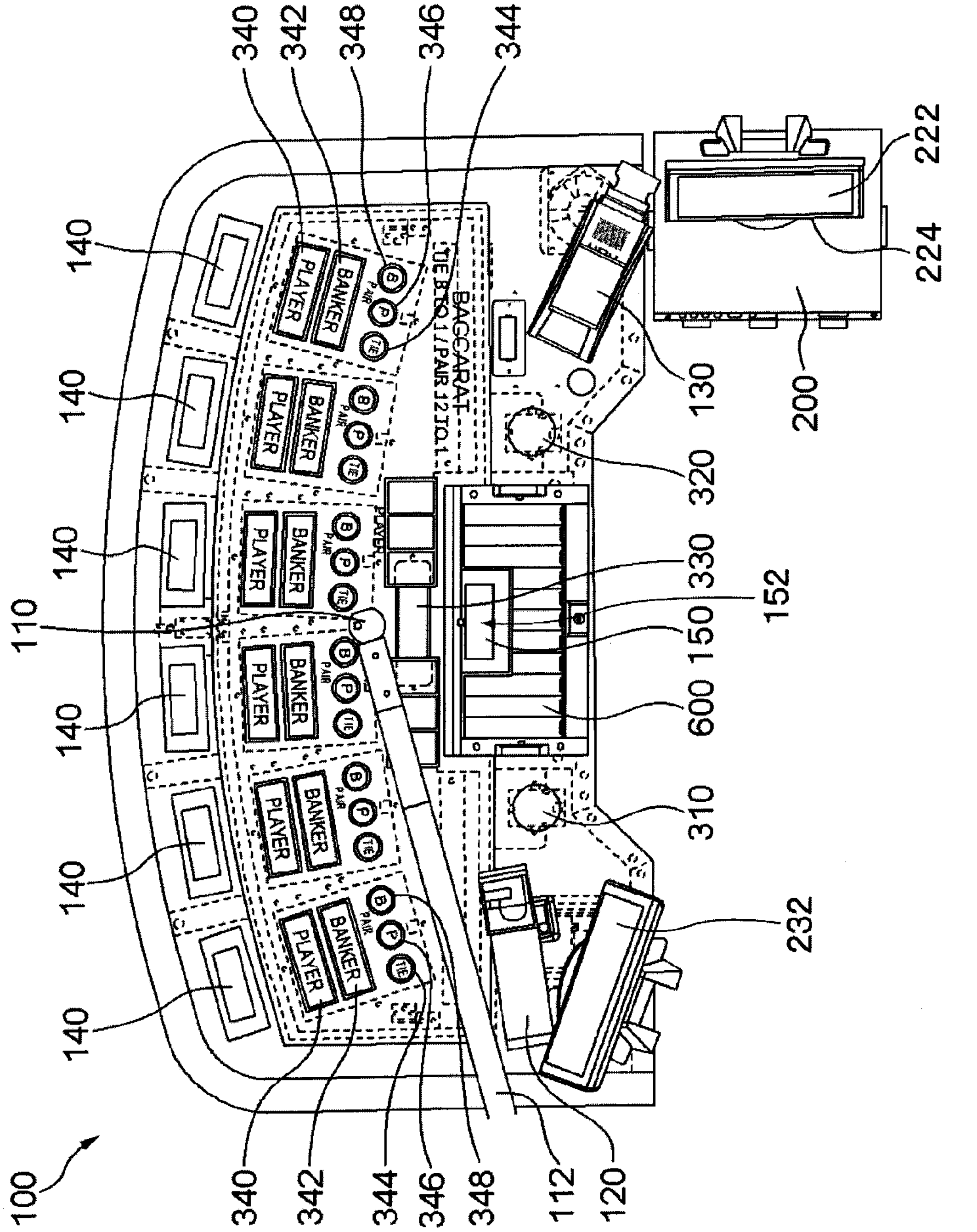
FIG. 3 is a plan view which shows the constitution of the game table 100.
Figure 4:
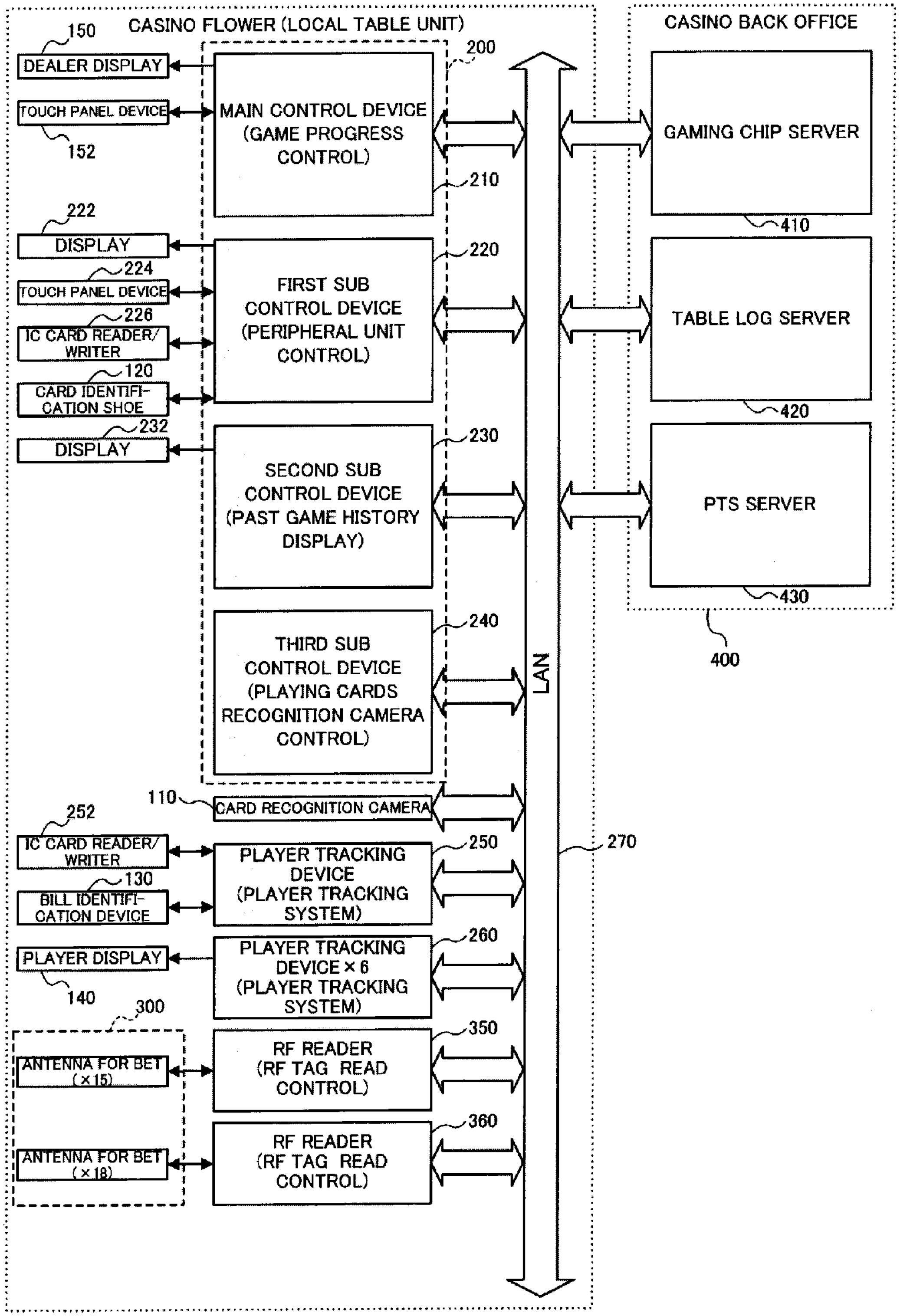
FIG. 4 is a block diagram which shows the constitution of a game table system including the game table 100.

FIG. 2 is a perspective view which shows the constitution of a game table 100. FIG. 3 is a plan view which shows the constitution of the game table 100. FIG. 4 is a block diagram which shows the constitution of a game table system including the game table 100.

A game table 100 is a table for playing a table game (Baccarat and blackjack, etc.) proceeded by the dealer by using a gaming chip 500 having an RF tag embedded therein. The gaming chips 500 can be categorized into two categories: validated gaming chips 500 which can be used in the game and invalidated gaming chips 500 which cannot be used in the game. Both the validated gaming chips 500 and the invalidated gaming chips 500 are controlled by the gaming chips server 410. The gaming chips 500 will be described later.

When the player places the gaming chips 500 on the game table 100 to make a bet, the chip reading antenna group 300 disposed below the game table 100 reads the gaming chips 500, the main control device 210 of the control device 200 described later, inquires the gaming chips server 410 about the gaming chips 500. The contents of the inquiry to the gaming chips server 410 is whether the gaming chip 500 is validated or invalidated, or information of the amount of the gaming chip 500 and the like.

When the game is started, the bet amount and area of each of the player are determined.

When the results of the game are determined, the gaming chips 500 wagered by the player who lost the game are invalidated and collected by the dealer. The process of invalidating of the gaming chips 500 is carried out by causing the gaming chips 500 to read by the deleting antenna 310. The chip ID of the gaming chips 500 read by the deleting antenna 310 is transmitted to the gaming chips server 410. The gaming chips server 410, receives the transmitted chip ID, registers that the gaming chips 500 of the chip ID's are invalid.

Meanwhile, the gaming chip 500 is given from the dealer to the player who won the game as a payout. The gaming chip 500 given from the dealer is validated. The process of validating the gaming chip 500 is carried out by causing the gaming chips 500 to be read by the registration antenna 320. The chip ID of the gaming chips 500 read by the registration antenna 320 is transmitted to the gaming chips server 410. The gaming chips server 410 receives the transmitted chip ID, and registers that the gaming chips 500 of the chip ID is valid.

Collecting and dealing of cards such as playing card and the gaming chips 500 used in the game are all done by the dealer. However, as will be described later, these operations of the dealer are all direction from the control device to the dealer. The dealer can perform various operations necessary for the progress of the game by following the directions.

Since the game table 100 is provided with such a configuration, if the player fraudulently brings away the gaming chips 500 when the player lost the game, they cannot be used for a game or cashed out since they are invalidated in the gaming chips server 410, and frauds of the player can be prevented. Moreover, fraudulently more gaming chips 500 cannot be paid to a particular player from the dealer, and therefore frauds of the dealer and human errors can be prevented.

<<Constitution of Game Table 100>>

As shown in FIGS. 2, 3 and 4, the game table 100 mainly has a card recognition camera 110, a shoe for identifying cards 120, a control device 200, a bill validator (bill identification device) 130, a player display 140, a dealer display 150, and a chip reading antenna group 300. The chip reading antenna group 300 has a deleting antenna 310, a registration antenna 320, a reference antenna 330, an antenna for PLAYER bet 340, an antenna for BANKER bet 342, an antenna for TIE bet 344, an antenna for PLAYER PAIR bet 346, and an antenna for BANKER PAIR bet 348 (refer to FIG. 6).

<<Control Device 200>>

The control device 200 as shown in FIG. 4 described later comprises a main control device 210, a first sub control device 220, a second sub control device 230, a third sub control device 240, a player tracking device 250, and a player tracking device 260. These main control device 210, first sub control device 220, second sub control device 230, third sub control device 240, player tracking device 250, and player tracking device 260 are connected in communication with each other by a LAN 270.

The main control device 210, first sub control device 220, second sub control device 230, third sub control device 240, player tracking device 250, player tracking device 260 are, for example, devices realized by an information processing device such as a computer and a workstation. This information processing device has external memory devices such as a central processing unit (CPU) (not shown), a main memory (RAM) (not shown), a read-only memory (ROM) (not shown), an input/output device (I/O) (not shown), and, if necessary, a hard disk device (not shown).

<Main Control Device 210>

The main control device 210 mainly controls the progress of the game. The main control device 210 executes various subroutines described later. A program for executing these subroutines is stored in ROM and hard disk devices of the main control device 210. The CPU of the main control device 210 can read programs to execute various processes.

For example, the main control device 210 determines the state of the progress of the game based on the state of movement and other information of the gaming chip 500. Furthermore, the main control device 210 produces direction information which is information for directing the dealer what actions to make based on the results of determination, and indicates the direction information on the dealer display 150.

The dealer display 150 and the touch panel device 152 are connected to the main control device 210.

<Dealer Display 150>

Figure 19:
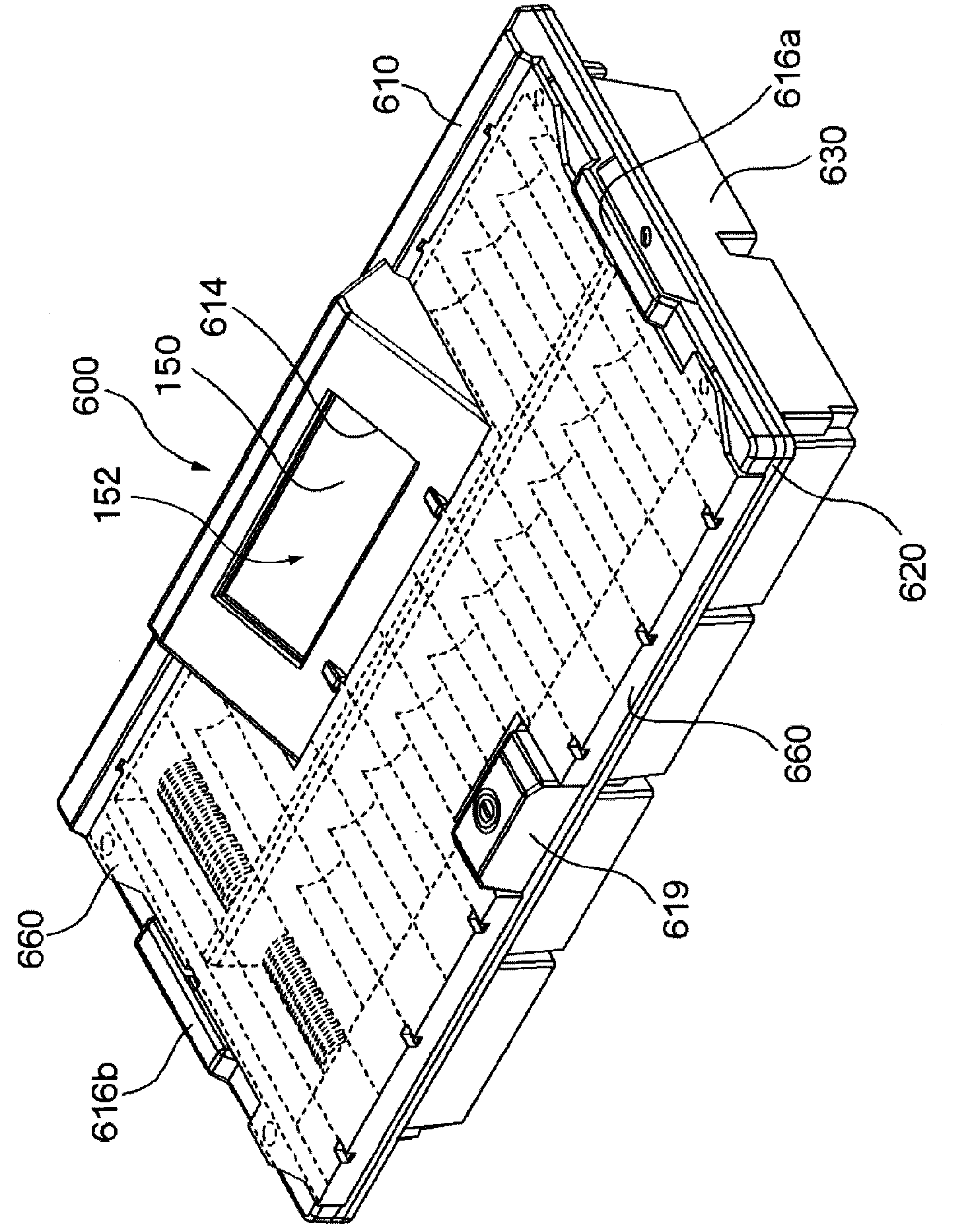
FIG. 19 is a perspective view which shows a state that a lid body 660 is placed in an upper part of a chip tray structure 600.
Figure 20:
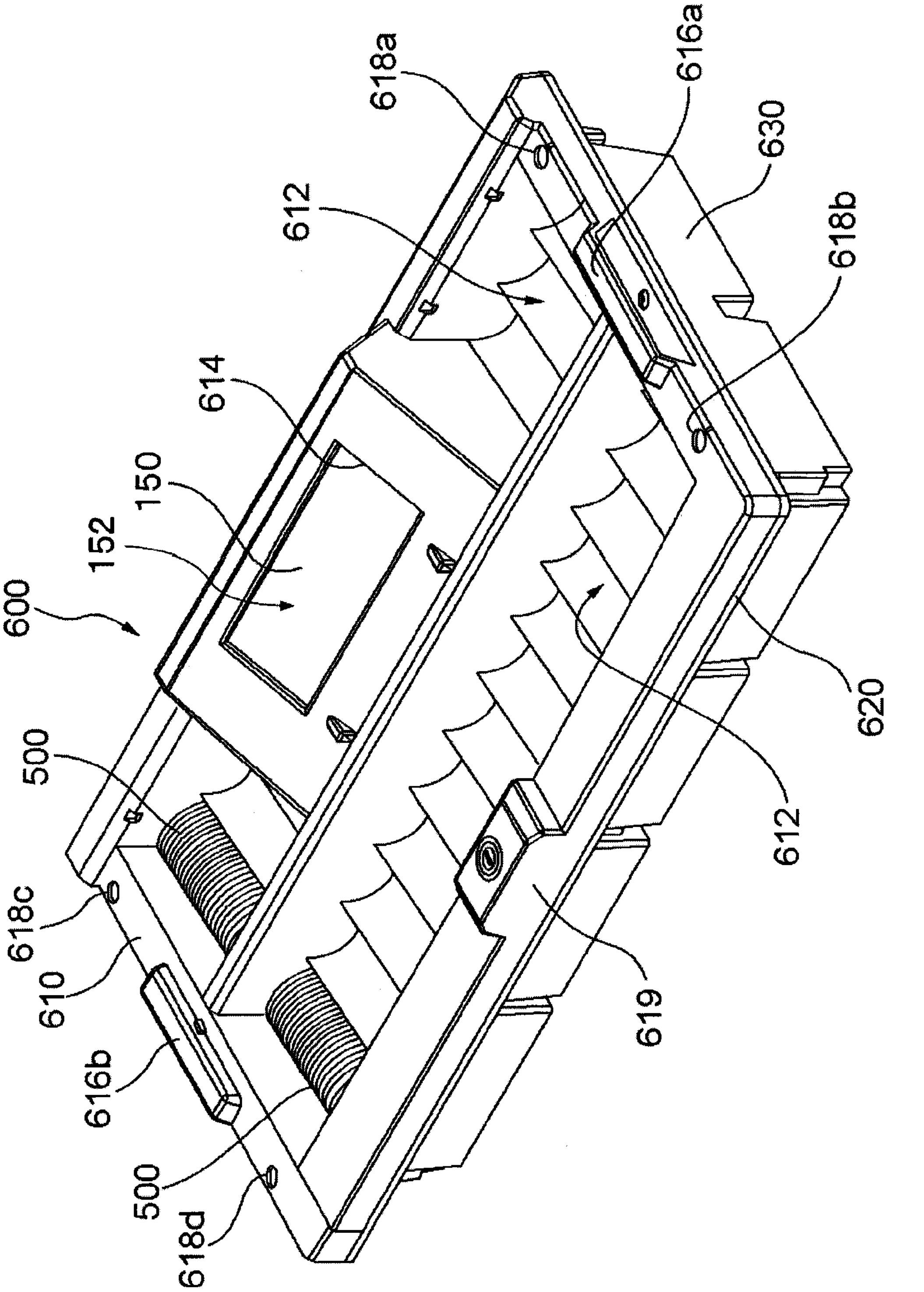
FIG. 20 is a perspective view which shows the entire chip tray structure 600.
Figure 21:
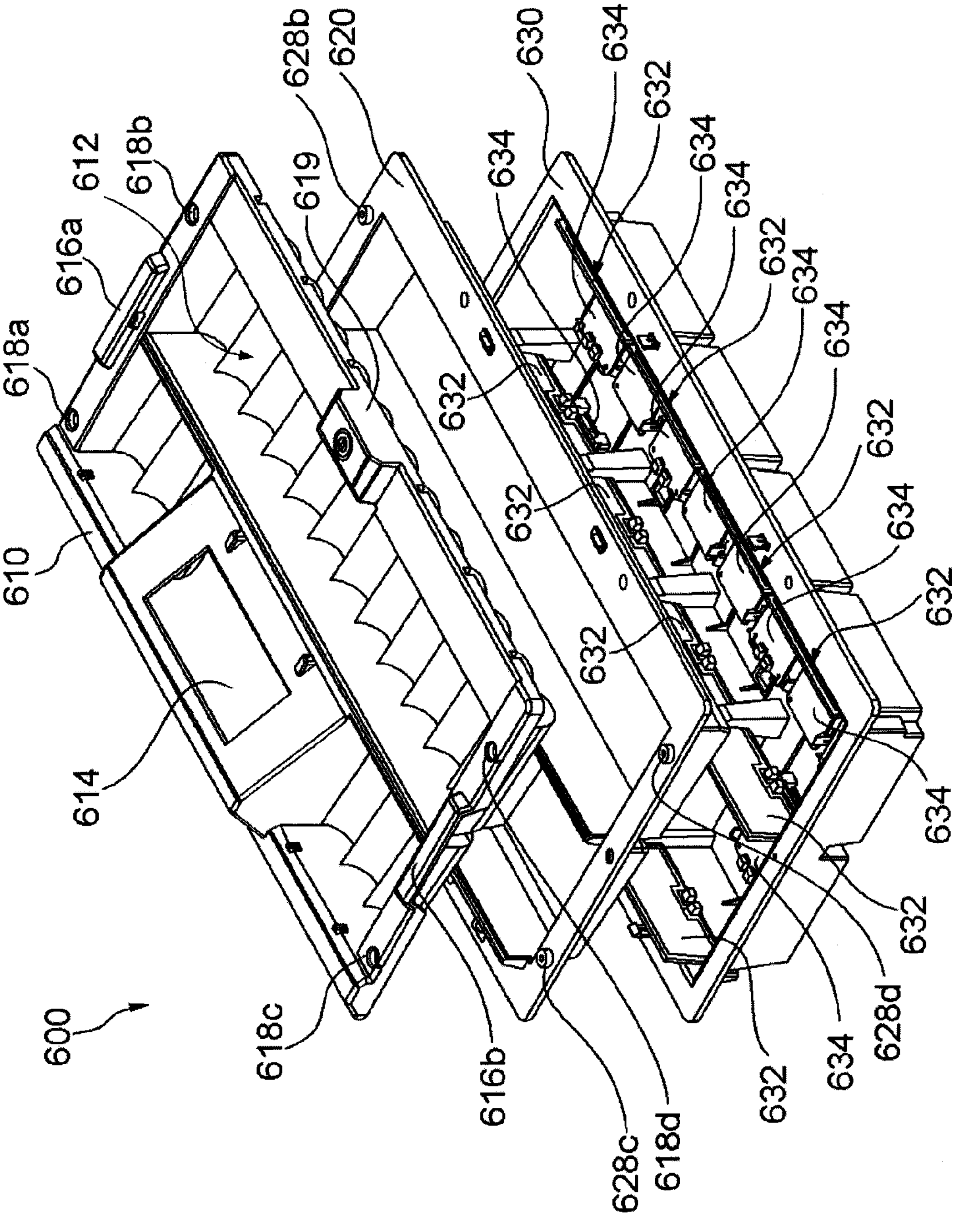
FIG. 21 is an exploded perspective view which shows a chip tray 610, a board covers 620, and a base 630 constituting the chip tray structure 600 in a disassembled state.

The dealer display 150, as shown in FIGS. 19 to 21, is provided on a chip tray structure 600. By providing the dealer display 150 on the chip tray structure 600, the dealer can visually recognize the game table 100, players and dealer display 150 readily without greatly changing his/her eye level.

The dealer display 150 is connected to the main control device 210. Various information processed by the main control device 210 is indicated on the dealer display 150. The information indicated on the dealer display 150 is for the dealer, which is for indicating the state the progress of the game, giving a subsequent direction to the dealer, providing confirmation of the dealer, for supporting the dealer.

For example, the amount and number of the gaming chip 500 placed by the player are indicated for each player, and information such as the number of the gaming chip 500 collected from the player and the payout given to the player is indicated.

The dealer display 150 indicates the direction information transmitted from the main control device 210, functions to send directional contents to the dealer. The directional contents may be sent to the dealer by pictures and other means. The dealer display 150 is, for example, a liquid crystal display device. The directional contents are handled as directional information for collecting the gaming chip 500 from the player who lost the game, awarding the gaming chip 500 to the player who won the game, draw, stand all other events in the progress of the game of cards such as playing card.

Moreover, in addition to the dealer display 150, a headset (income) or like components which can send directional contents to the dealer may be connected in communication with the main control device 210. By so configuring, directional contents can be sent to the dealer and other means by sound.

<Touch Panel Device 152>

The touch panel device 152 is a device for the dealer to select processes and input information responsive to various indicated information on the dealer display 150. Various information selected or input by the dealer is provided to the main control device 210 to be processed. The touch panel device 152 is provided on the dealer display 150 in a manner of superposing. The dealer can operate the touch panel device 152 responsive to various information indicated on the dealer display 150. Such a configuration enables the dealer to operate while maintaining the state that he/she faces the game table 100 and the player.

<First Sub Control Device 220>

The first sub control device 220 controls peripheral units such as and IC card reader/writer 226 and a shoe for identifying cards 120. The display 222, touch panel device 224, IC card reader/writer 226, and shoe for identifying cards 120 are connected to the first sub control device 220.

Information regarding peripheral units such as the IC card reader/writer 226 and shoe for identifying cards 120 is indicated on the display 222. The dealer can visually confirm various indicated information to determine if the game proceeds appropriately. The touch panel device 224 responsive to various information indicated on the display 222 is a device for the dealer to select and input processes information. Various information selected or input by the dealer is provided to the first sub control device 220 to be processed. The display 222 is a display mainly for a manager standing behind the dealer for visual confirmation. For example, when the dealer and the player cooperates to commit a fraud, the fraud can be found more easily by having manager visually confirm the contents indicated on the display 222.

<IC Card Reader/Writer 226>

The IC card reader/writer 226 is a device for reading and writing the ID card owned by the dealer. A rack constituting the control device 200 shown in FIG. 2 is provided with seven card slots. One of these card slots is the slot for the IC card reader/writer 226.

The ID card owned by the dealer stores a dealer ID for identifying and specifying the dealer. When the dealer proceeds a game on the game table 100, the dealer ID is read by IC card reader/writer 226, and the information that the dealer proceeds on the game table 100 is registered. The registered information is stored on a hard disk device (not shown) of the first sub control device 220 or another device, or stored on a table log server 420 and a PTS server 430. By so configuring, not only the player but also the dealer can be controlled, frauds committed by the cooperation of the dealer and the player can be prevented.

<Shoe for Identifying Cards 120>

The shoe for identifying cards 120 is a case for accommodating cards such as playing cards used in the game. A slim opening is provided on the shoe for identifying cards 120. The dealer takes out cards one by one from the opening to proceed the game.

A scanner (line sensor) (not shown) is provided in proximity to the opening. When a card is taken out from the shoe for identifying cards 120, the image of the card is read by the scanner. The image data of the card read by the scanner is provided to the first sub control device 220, to be subjected to a process such as image processing. By this process, the contents of the card marks and symbols indicating the number and suite of the card can be acquired, which are stored on a device such as a RAM and a hard disk device (not shown) of the first sub control device 220. By so configuring, when the game is initiated, the contents of the card dealt by the dealer to the player can be stored and controlled.

<Second Sub Control Device 230>

The second sub control device 230 stores information of past games carried out on the game table 100 and manages the history of games. A display 232 is connected to the second sub control device 230. Information relating to the history of past games is indicated on the display 232. The display 232 is disposed to face mainly the player. By having the player to visually confirm the history of past games played on the game table 100, it becomes easier for the player to determine whether to play a game on the game table 100.

<Third Sub Control Device 240>

The card recognition camera 110 is connected to the third sub control device 240 via the LAN 270. The third sub control device 240 controls the photographic data transferred from the card recognition camera 110 for such as an image recognition process.

<Card Identification Camera 110>

The card recognition camera 110 is provided above the game table via an arm 112. The card recognition camera 110 is disposed facing down to photograph the upper face 102 of the game table 100. The card recognition camera 110 mainly photographs cards disposed on the upper face 102 of the game table 100. Moreover, the card recognition camera 110 may photograph not only cards but also the players and the dealer playing games on the game table 100. By photographing the players and the dealer, the behaviors of the players and the dealer can be also monitored.

The card recognition camera 110 is connected to the LAN 270 (refer to FIG. 4). The photographic data photographed by the card recognition camera 110 via the LAN 270 is provided to the third sub control device 240 (refer to FIG. 4) in the control device 200. The third sub control device 240 controls the photographic data transferred from the card recognition camera 110 for such as an image recognition process, whereby obtained details such as the marks of cards indicating the values and suites of cards disposed on the upper face 102 of the game table 100. In such a manner, the details of the card indicating the results of the game can be obtained from the camera, stored and controlled.

Moreover, the card recognition camera 110 also photographs the betting areas. The movement of the gaming chip 500 placed in a betting area can be acquired, so that frauds on the gaming chips 500 can be found from the photographic data.

<<Server Group 400>>

The server group 400 comprises a gaming chip server 410, a table log server 420, and a PTS server 430. The gaming chip server 410, table log server 420, and PTS server 430 are connected in communication with each other via the LAN 270. Moreover, the gaming chip server 410, table log server 420 and PTS server 430 are also connected in communication with the control device 200 (main control device 210, first sub control device 220, second sub control device 230, third sub control device 240, player tracking device 250 and player tracking device 260) via the LAN 270.

The server group 400 is placed in a room where only employees can enter in a gaming establishment such as a casino. The server group 400 may be placed in a place which cannot be accessed by players, and may be placed in communication in a building different from the gaming establishment.

<Gaming Chip Server 410>

The gaming chip server 410 manages information of all the gaming chips 500 handled in the gaming establishment.

<Table Log Server 420>

The table log server 420 manages information of the history of games played on each of a plurality of the game tables 100 placed in the gaming establishment. By examining the information of this history, it can be tracked if there was any fraud, and on which game table 100, when and with what players and dealer the problem has occurred can be found.

<PTS Server 430>

The PTS server 430 is a server for managing players, which stores information relating to the player such as the chip ID of the gaming chip 500 possessed and the type of the game and the date of visit to the establishment of the player activity. The PTS server 430 mainly stores various information collected via a PTS250 and a PTS260 described later.

<Player Tracking Systems 250 and 260>

The player tracking systems 250 and 260 (hereinafter referred to as PTS250 and PTS260) are so-called player tracking systems, which are devices for managing players by recording the behaviors of the players playing games in the gaming establishment.

The IC card reader/writer 252 and bill validator 130 are connected to the PTS250.

The IC card reader/writer 252 has a constitution similar to the IC card reader/writer 226 mentioned above. The IC card reader/writer 252 is a device for reading and writing on the ID card owned by a player. As described above, seven card slots are provided on the rack accommodating the control device 200 shown in FIG. 2. Six card slots of them are slots for the IC card reader/writer 252. The IC card reader/writer 252 is provided depending on the number of the players playing the game on the game table 100.

An ID card owned by a player stores a player ID for identifying and specifying the player. The IC card reader/writer 252 is a device for registration by the operation of the dealer. When the player plays a game on the game table 100, the player gives his/her ID card to the dealer. The dealer has the IC card reader/writer 252 corresponding to the location of the player to read the ID card given from the player. The player ID is read by the IC card reader/writer 252, and the information that the player plays a game on the game table 100 is registered. The registered information via the PTS250 is stored on a hard disk device (not shown) of the first sub control device 220 or another device, or stored on a table log server 420 and a PTS server 430. By so configuring, the players who played a game by using the IC card reader/writer 252 on the game table 100 can be controlled.

<Bill Validator 130>

The bill validator 130 is a bill recognizing device which identifies bills. The bill validator 130 has a scanner. The bill validator 130 produces image data of bills by the scanner. When the dealer receives a bill from the player, the bill validator 130 is caused to read the received bill. The bill validator 130 determines the authenticity of the read bill, and when it is an authentic bill, reads the amount of the bill, and indicates the amount read on the dealer display 150. The dealer exchanges the bill to the gaming chips 500 corresponding to the amount data indicated on the dealer display 150.

<Player Display 140>

The player display 140 is connected to the PTS260.

The player display 140 can be visually recognized by the player. The number of the player displays 140 provided is equal to that of the players who can play a game on a single game table 100, for example, six, and the player displays 140 are provided to face the six players, respectively. The player display 140 is connected to the player tracking device 260. Information such as the state of the bet of the player, winning or losing outcome of the game and the payout is provided from the player tracking device 260 to the player display 140.

Information such as the state of the bet of the player, the winning or losing outcome of the game and the payout is indicated on each of the player displays 140. The player who plays a game on the game table 100 by visually recognizing the player display 140 corresponding to him/herself can confirm the progress of the game relating to the player.

<<Chip Reading Antenna Group 300>>

Figure 6:
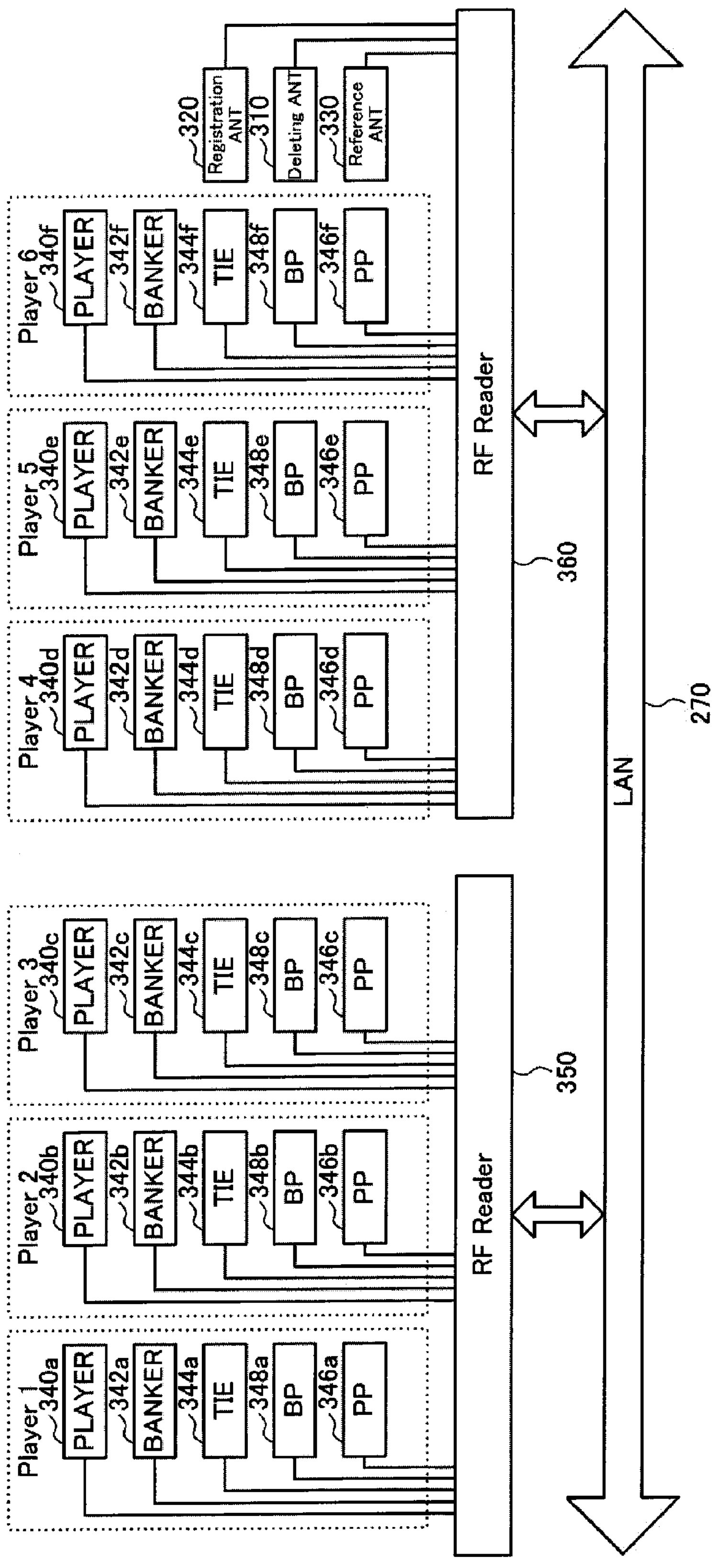
FIG. 6 is a block diagram which shows the correspondence of chip reading antenna group 300, player, and first RF reader 350 and second RF reader 360.

As described above, the chip reading antenna group 300 has a deleting antenna 310, a registration antenna 320, a reference antenna 330, an antenna for PLAYER bet 340, an antenna for BANKER bet 342, an antenna for TIE bet 344, an antenna for PLAYER PAIR bet 346, and an antenna for BANKER PAIR bet 348 (refer to FIG. 6). Each of these antennas is provided below the upper face 102 of the game table 100.

The deleting antenna 310, registration antenna 320 and reference antenna 330 are used by the dealer, and are provided near the dealer one by one. For example, the deleting antenna 310 is disposed on the left side of the dealer, the registration antenna 320 is disposed on the right side of the dealer, and the reference antenna 330 is disposed in front of the dealer.

The antenna for PLAYER bet 340, antenna for BANKER bet 342, antenna for TIE bet 344, antenna for PLAYER PAIR bet 346, and antenna for BANKER PAIR bet 348 are used when the player places a bet. These six types of antennas are provided correspondingly to each of a plurality of players who can play a game on a single game table 100, for example, for each of the six players. That is, separately for the plurality of the players, the six types of antennas: antenna for PLAYER bet 340, antenna for BANKER bet 342, antenna for TIE bet 344, antenna for PLAYER PAIR bet 346, and antenna for BANKER PAIR bet 348 are provided.

The game table 100 is a table for so-called Baccarat. As the areas for the player to place a bet, six betting areas: a PLAYER betting area, a BANKER betting area, a TIE betting area, a PLAYER PAIR betting area, and a BANKER pair betting area are formed on the game table 100.

<Deleting Antenna 310>

As shown in FIGS. 2 and 3, the deleting antenna 310 is provided in a lower part chip deleting area of the game table 100. The deleting antenna 310 is connected to the second RF reader 360. When the dealer places the gaming chip 500 in the chip deleting area, the second RF reader 360 reads the chip ID of the placed gaming chip 500 by the deleting antenna 310. The second RF reader 360 transmits information that the chip is to be invalidated to the gaming chip server 410 together with the read chip ID. The gaming chip server 410 updates the chip control information corresponding to the chip ID to invalidate the gaming chips 500.

Furthermore, the association information of the player ID associated with the chip ID at this time is also cleared to update the chip control information. By doing so, the gaming chip 500 placed in the chip deleting area is invalidated so that the gaming chip 500 cannot be used in the game until it is validated. It is preferable that the association information between the chip ID and the player ID is not completely deleted, and is left on the gaming chip server 410 as past history information. When any problematic behavior such as a fraud is found later, the player who caused the problem can be specified more easily.

For example, when the dealer collects the gaming chip 500 from the player, the dealer invalidates the gaming chip 500 by the deleting antenna 310. By so configuring, even when the invalidated gaming chip 500 is fraudulently obtained, it cannot be immediately used in the game, and occurrence of any fraud can be found more easily when the game is started and at other occasions.

The player ID mentioned above is the information stored on ID cards in advance issued in gaming establishments such as casinos. By giving the ID card to the dealer prior to the initiation of the game on the game table 100, the player ID is registered on the gaming chip server 410, main control device 210, and other devices. The dealer by reading the ID card given from the player by the IC card reader/writer 252 can register the player (player ID). Moreover, when cash is exchanged with the gaming chip 500 at the cashier or the like, the player ID is registered on the gaming chip server 410, the main control device 210 or the like. The chip ID and player ID are stored in the gaming chip server 410 and associated with each other.

<Registration Antenna 320>

As shown in FIG. 2 and FIG. 3, the registration antenna 320 is provided under the chip registration area of the game table100. The registration antenna 320 is connected to the second RF reader 360. When the dealer places the gaming chip 500 in the chip registration area, the second RF reader 360 reads the chip ID of the placed gaming chip500 via the registration antenna 320. The second RF reader 360 transmits the information that the gaming chip 500 is to be validated to the gaming chip server 410 together with the read chip ID. The gaming chip server 410 updates the chip control information corresponding to the chip ID to validate the gaming chip 500. By doing so, the placed gaming chip 500 is validated in the chip registration area, so that it can be used until it is invalidated next.

For example, when the dealer gives the gaming chip 500 to the player as a payout, or gives the gaming chip 500 in exchange for cash, the gaming chip 500 is validated by the registration antenna 320. By so configuring, the player can safely use the gaming chip 500 given from the dealer in the game.

<Reference Antenna 330>

As shown in FIGS. 2 and 3, the reference antenna 330 is provided under a chip reference area of the game table100. The reference antenna 330 is connected to the second RF reader 360. When the dealer places the gaming chip 500 in the chip reference area, the second RF reader 360 reads the chip ID of the placed gaming chip 500 via the reference antenna 330. The second RF reader 360 transmits the read chip ID to the gaming chip server 410. The gaming chip server 410 transmits the chip control information corresponding to the received chip ID to the main control device 210. The main control device 210 indicates the chip control information on the dealer display 150.

For example, when the dealer collects a plurality of the gaming chips 500 from the player and invalidates the gaming chips 500 by the deleting antenna 310, the dealer can confirm whether all the gaming chips 500 are invalidated and the chip control information is precisely updated by using the reference antenna 330. Similarly, when the dealer validates the gaming chip 500 by the registration antenna 320 and gives them to the player, the dealer can confirm whether all the gaming chips 500 are validated and the chip control information is precisely updated using the reference antenna 330.

In such a manner, by using the reference antenna 330, the dealer can quickly and readily confirm whether the chip control information is updated to the latest one.

<Antenna for PLAYER Bet 340>

As shown in FIG. 6, the antenna for PLAYER bet 340 consists of six antennas: antenna for PLAYER bet 340*a*, antenna for PLAYER bet 340*b*, antenna for PLAYER bet 340*c*, antenna for PLAYER bet 340*d*, antenna for PLAYER bet 340*e*, and antenna for PLAYER bet 340*f*. These six antennas for PLAYER bet 340*a* to 340*f* are provided correspondingly to the six players under the PLAYER betting area of the game table 100. When the game of Baccarat is started, each of the players places a desired number of the gaming chips 500 of a desired type in the PLAYER betting area when he/she places a bet on "PLAYER".

As shown in FIG. 3, the six antennas for PLAYER bet 340*a* to 340*f* are provided on the game table 100 so that the distances between adjacent antennas are almost the same. By providing the antennas in such a manner, antenna for PLAYER bet 340*a* and 340*d*, antenna for PLAYER bet 340*b* and 340*e*, antenna for PLAYER bet 340*c* and 340*f* are disposed away from each other at almost the same distances.

Hereinafter, when the six antennas for PLAYER bet 340*a* to 340*f* need not be distinguished from each other, they are referred to simply as the antennas for PLAYER bet 340.

As shown in FIG. 6, three antennas for PLAYER bet 340*a* to 340*c* are connected to the first RF reader 350. Three antennas for PLAYER bet 340*d* to 340*f* are connected to the second RF reader 360. When the player places the gaming chip 500 in the PLAYER betting area, the first RF reader 350 and the second RF reader 360 corresponding to the PLAYER betting area read the chip ID, denomination information and the number of the gaming chip 500 placed in the PLAYER betting area. The first RF reader 350 and the second RF reader 360 transmit the number of the gaming chips of the respective amounts to the main control device 210 together with the read chip ID. The main control device 210 stores the chip ID and number of the gaming chips 500 of respective amounts in association with the player ID and transmits the information to the gaming chip server 410.

<Antenna for BANKER Bet 342>

As shown in FIG. 6, the antenna for BANKER bet 342 consists of six antennas: antenna for BANKER bet 342*a*, antenna for BANKER bet 342*b*, antenna for BANKER bet 342*c*, antenna for BANKER bet 342*d*, antenna for BANKER bet 342*e*, and antenna for BANKER bet 342*f*. These six antennas for BANKER bet 342*a* to 342*f* are provided under the banker betting area of the game table100 correspondingly to the six players. When the game of Baccarat is started, when each of the players, when he/she wishes to place on "BANKER", places a desired number of the gaming chips 500 of a desired type on the banker betting area.

As shown in FIG. 3, the six antennas for BANKER bet 342*a* to 342*f* are provided on the gaming table 100 so that the distances between adjacent antennas are almost the same. By providing the antennas in such a manner, the antennas for BANKER bet 342*a* and 342*d*, antennas for BANKER bet 342*b* and 342*e*, and antennas for BANKER bet 342*c* and 342*f* are spaced away from each other at almost the same distances.

Hereinafter, when the six antennas for BANKER bet 342*a* to 342*f* need not be distinguished from each other, they are referred simply as the antennas for BANKER bet 342.

As shown in FIG. 6, three antennas for BANKER bet 342*a* to 342*c* are connected to the first RF reader 350. Three antennas for BANKER bet 342*d* to 342*f* is connected to the second RF reader 360. When the player places the gaming chip 500 in the banker betting area, the first RF reader 350 and the second RF reader 360 corresponding to the banker betting area read the chip ID, denomination information and the number of the gaming chip 500 placed in the banker betting area. The first RF reader 350 and the second RF reader 360 transmit the number of the gaming chips 500 of respective amounts to the main control device 210 together with the read chip ID. The main control device 210 stores the chip ID and number of the gaming chips 500 of respective amounts in association with the player ID and transmits the information to the gaming chip server 410.

<Antenna for TIE Bet 344>

As shown in FIG. 6, the antenna for TIE bet 344 consists of six antennas: antenna for TIE bet 344*a*, antenna for TIE bet 344*b*, antenna for TIE bet 344*c*, antenna for TIE bet 344*d*, antenna for TIE bet 344*e*, and antenna for TIE bet 344*f*. These six antennas for TIE bet 344*a* to 344*f* are provided under the TIE betting area of the game table 100 correspondingly to the six players. When each of the players wish to place a bet on "TIE", he/she places a desired number of the gaming chips 500 of a desired type in the TIE betting area at the beginning of the game of Baccarat.

As shown in FIG. 3, six antennas for TIE bet 344*a* to 344*f* are provided on the gaming table 100 so that the distances between adjacent antennas are almost the same. By providing the antennas in such a manner, the antennas for TIE bet 344*a* and 340*d*, the antenna for TIE bet 344*b* and 344*e*, and the antennas for TIE bet 344*c* and 344*f* are spaced away from each other at almost the same distances.

Hereinafter, when the six antennas for TIE bet 344*a* to 344*f* need not be distinguished from each other, they are referred to simply as the antennas for TIE bet 344.

As shown in FIG. 6, the three antennas for TIE bet 344*a* to 344*c* are connected to the first RF reader 350. The three antennas for TIE bet 344*d* to 344*f* are connected to the second RF reader 360. When the player places the gaming chip 500 in the TIE betting area, the first RF reader 350 and the second RF reader 360 corresponding to the TIE betting area read the chip ID, denomination information and number of the gaming chips 500 placed in the TIE betting area. The first RF reader 350 and the second RF reader 360 transmit the number of the gaming chips 500 of respective amounts to the main control device 210 together with the read chip ID. The main control device 210 stores the chip ID and number of the gaming chips 500 of respective amounts in association with the player ID and transmits the information to the gaming chip server 410.

<Antenna for PLAYER PAIR Bet 346>

As shown in FIG. 6, the antenna for PLAYER PAIR bet 346 consists of six antennas: antenna for PLAYER PAIR bet 346*a*, antenna for PLAYER PAIR bet 346*b*, antenna for PLAYER PAIR bet 346*c*, antenna for PLAYER PAIR bet 346*d*, antenna for PLAYER PAIR bet 346*e*, and antenna for PLAYER PAIR bet 346*f*. These six antennas for PLAYER PAIR bet 346*a* to 346*f* are provided under the PLAYER PAIR betting area of the game table 100 correspondingly to the six players. When each of the players wish to place a bet on "PLAYER PAIR", he/she places a desired number of the gaming chips 500 of a desired type in the PLAYER PAIR betting area at the beginning of the game of Baccarat.

As shown in FIG. 3, the six antennas for PLAYER PAIR bet 346*a* to 346*f* are provided on the gaming table 100 so that the distances between adjacent antennas are almost the same. By providing the antennas in such a manner, the antennas for PLAYER PAIR bet 346*a* and 346*d*, the antennas for PLAYER PAIR bet 346*b* and 346*e*, and the antennas for PLAYER PAIR bet 346*c* and 346*f* are spaced away from each other at almost the same distances.

Hereinafter, when the six antennas for PLAYER PAIR bet 346*a* to 346*f* need not be distinguished from each other, they are referred to simply as the antennas for PLAYER PAIR bet 346.

As shown in FIG. 6, the three antennas for PLAYER PAIR bet 346*a* to 346*c* are connected to the first RF reader 350. The three antennas for PLAYER PAIR bet 346*d* to 346*f* are connected to the second RF reader 360. When the player places the gaming chip 500 in the PLAYER PAIR betting area, the first RF reader 350 and the second RF reader 360 corresponding to the PLAYER PAIR betting area reads the chip ID, denomination information and number of the gaming chips 500 placed in the PLAYER PAIR betting area. The first RF reader 350 and the second RF reader 360 transmit the number of the gaming chips 500 of respective amounts to the main control device 210 together with the read chip ID. The main control device 210 stores the chip ID and number of the gaming chips 500 of respective amounts in association with the player ID and transmits the information to the gaming chip server 410.

<Antenna for BANKER PAIR Bet 348>

As shown in FIG. 6, the antennas for BANKER PAIR bet 348 consists of the six antennas: antenna for BANKER PAIR bet 348*a*, antenna for BANKER PAIR bet 348*b*, antenna for BANKER PAIR bet 348*c*, antenna for BANKER PAIR bet 348*d*, antenna for BANKER PAIR bet 348*e*, and antenna for BANKER PAIR bet 348*f*. These six antennas for BANKER PAIR bet 348*a* to 348*f* are provided under the BANKER PAIR betting area of the game table 100 correspondingly to the six players. When each of the players wishes to place a bet on "BANKER PAIR", he/she places a desired number of the gaming chips 500 of a desired type in the BANKER PAIR betting area at the beginning of the game of Baccarat.

As shown in FIG. 3, the six antennas for BANKER PAIR bet 348*a* to 348*f* are provided on the gaming table 100 so that the distances between adjacent antennas are almost the same. By providing the antennas in such a manner, the antennas for BANKER PAIR bet 348*a* and 348*d*, the antennas for BANKER PAIR bet 348*b* and 348*e*, and the antennas for BANKER PAIR bet 348*c* and 348*f* are spaced away from each other at almost the same distances.

Hereinafter, when the six antennas for BANKER PAIR bet 348*a* to 348*f* need not be distinguished from each other, they are referred to simply as the antennas for BANKER PAIR bet 348.

The three antennas for BANKER PAIR bet 348*a* to 348*c* are connected to the first RF reader 350. The three antennas for BANKER PAIR bet 348*d* to 348*f* are connected to the second RF reader 360. When the player places the gaming chips 500 in the BANKER pair betting area, the first RF reader 350 and the second RF reader 360 corresponding to the BANKER pair betting area read the chip ID, denomination information and number of the gaming chips 500 placed in the BANKER pair betting area. The first RF reader 350 and the second RF reader 360 transmit the number of the gaming chips 500 of respective amounts to the main control device 210 together with the read chip ID. The main control device 210 stores the chip ID and number of the gaming chips 500 of respective amounts in association with the player ID and transmits the information to the gaming chip server 410.

<Correspondence of Chip Reading Antenna Group 300, Player, First RF Reader 350 and Second RF Reader 360>

FIG. 6 is a block diagram which shows the correspondence of the chip reading antenna group 300, player, first RF reader 350 and second RF reader 360.

As shown in FIG. 3, the single game table 100 is constituted to allow up to six players (first to sixth players) to play a Baccarat game facing the dealer. "Player 1" in FIG. 6 shows an antenna group corresponding to the first of the six players, "player 2" shows an antenna group corresponding to the second player, "player 3" shows an antenna group corresponding to the third player, "player 4" shows an antenna group corresponding to the fourth player, "player 5" shows an antenna group corresponding to the fifth player, and "player 6" shows an antenna group corresponding to the sixth player.

As shown in FIG. 6, the antenna group of "player 1" consists of an antenna for PLAYER bet 340*a*, an antenna for BANKER bet 342*a*, and antenna for TIE bet 344*a*, an antenna for PLAYER PAIR bet 346*a*, and an antenna for BANKER PAIR bet 348*a*.

The antenna group of "player 2" consists of an antenna for PLAYER bet 340*b*, and antenna for BANKER bet 342*b*, and antenna for TIE bet 344*b*, an antenna for PLAYER PAIR bet 346*b*, and an antenna for BANKER PAIR bet 348*b*.

The antenna group of "player 3" consists of an antenna for PLAYER bet 340*c*, an antenna for BANKER bet 342*c*, an antenna for TIE bet 344*c*, an antenna for PLAYER PAIR bet 346*c*, and an antenna for BANKER PAIR bet 348*c*.

The antenna group of "player 4" consists of an antenna for PLAYER bet 340*d*, an antenna for BANKER bet 342*d*, an antenna for TIE bet 344*d*, an antenna for PLAYER PAIR bet 346*d*, and an antenna for BANKER PAIR bet 348*d*.

The antenna group of "player 5" consists of an antenna for PLAYER bet 340*e*, an antenna for BANKER bet 342*e*, an antenna for TIE bet 344*e*, an antenna for PLAYER PAIR bet 346*e*, and an antenna for BANKER PAIR bet 348*e*.

The antenna group of "player 6" consists of an antenna for PLAYER bet 340*f*, an antenna for BANKER bet 342*f*, an antenna for TIE bet 344*f*, an antenna for PLAYER PAIR bet 346*f*, and an antenna for BANKER PAIR bet 348*f*.

The antenna groups "player 1" to "player 3" are connected to the first RF reader 350. The antenna groups "player 4" to "player 6" are connected to the second RF reader 360. Furthermore, the deleting antenna 310, registration antenna 320 and reference antenna 330 are also connected to the second RF reader 360. In such a manner, fifteen antennas are connected to the first RF reader 350, while eighteen antennas are connected to the second RF reader 360. As will be described later, the first RF reader 350 and the second RF reader 360 selectively switch connected antennas to perform reading operation.

The first RF reader 350 and the second RF reader 360 are connected to the LAN 270. Chip-stored information such as the chip ID read by various antennas mentioned above is transmitted to the LAN 270 via the first RF reader 350 and the second RF reader 360. The main control device 210 and the gaming chip server 410 receive chip-stored information such as the chip ID via the LAN 270, and can therefore manage the gaming chips 500.

<First RF Reader 350, Second RF Reader 360>

Figure 7:
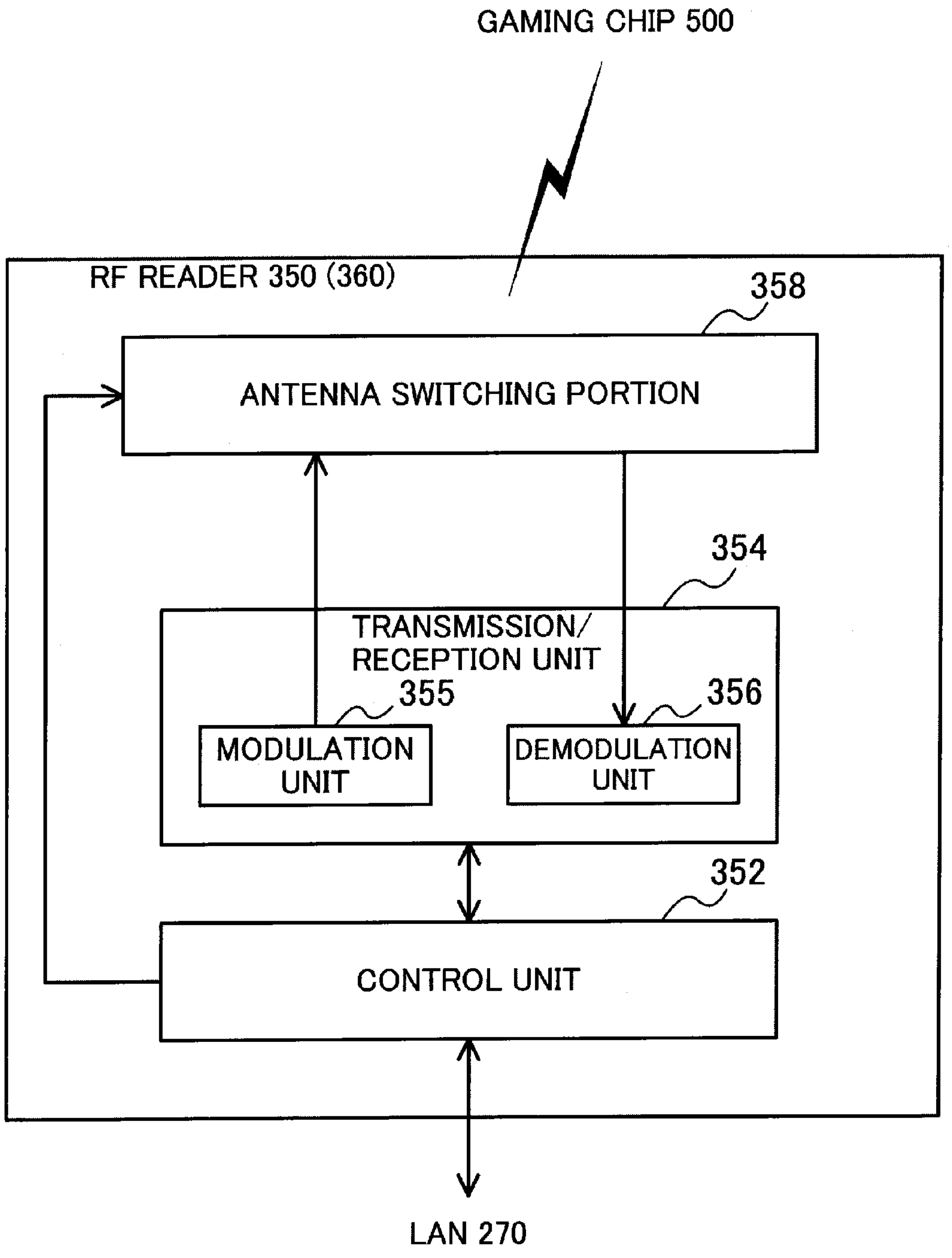
FIG. 7 is a block diagram which shows the constitution of the first RF reader 350 and second RF reader 360.

FIG. 7 is a block diagram which shows the constitution of the first RF reader 350 and second RF reader 360. It should be noted that the first RF reader 350 and the second RF reader 360 have the same constitution. In the description of FIG. 7, the first RF reader 350 will be described as a typical example.

The first RF reader 350 and the second RF reader 360 are devices which read the chip-stored information stored on the IC chip 510 (refer to FIG. 8) provided within the gaming chip 500 via a wireless communication.

The first RF reader 350 and the second RF reader 360 have a control unit 352 and a transmission/reception unit 354. The transmission/reception unit 354 is connected to the control unit 352. The control unit 352 receives instructions transmitted from the main control device 210 via the LAN 270. The control unit 352 drives the transmission/reception unit 354 responsive to a received instruction. The transmission/reception unit 354 is driven to read chip-stored information transmitted from the IC chip 510. The control unit 352 transmits the read chip-stored information to the main control device 210 via the LAN 270. The control unit 352 is, for example, constituted by a microcomputer having a CPU, ROM, and RAM (not shown).

The transmission/reception unit 354 has a modulation unit 355 and a demodulation unit 356. The modulation unit 355 generates a modulated wave which is a carrier wave modulated by a predetermined modulating method by a base signal depending on information such as a predetermined command, request and instruction received from the control unit 352. The demodulation unit 356 demodulates a load-modulated magnetic field based on a base signal depending on chip-stored information stored on the IC chip 510, withdraws the base signal depending on the chip-stored information, and gives the base signal to the control unit 352. The transmission/reception unit 354 is, for example, an RF module having a modulating circuit and a demodulating circuit.

The first RF reader 350 and the second RF reader 360 have an antenna switching portion 358. Fifteen antennas are selectively connected to the first RF reader 350, while eighteen antennas are selectively connected to the second RF reader 360. The antenna switching portion 358 is connected to the control unit 352. The control unit 352 transmits a selection control signal which indicates the antenna to be selected to the antenna switching portion 358. The antenna switching portion 358 selects the antenna indicated by the received selection control signal. The chip-stored information of the IC chip 510 is read by the antenna selected by the antenna switching portion 358, and is provided to the demodulation unit 356 of the transmission/reception unit 354 via the antenna switching portion 358.

The operation the antenna switching portion 358 of the first RF reader 350 and second RF reader 360 will be described below in detail.

To the first RF reader 350 are selectively connected five antennas constituting the antenna group of "player 1", five antennas constituting the antenna group of "player 2", five antennas constituting the antenna group of "player 3", i.e., fifteen antennas in total. As described above, the first RF reader 350 has the control unit 352 and the antenna switching portion 358. The control unit 352 of the first RF reader 350 transmits a selection control signal indicating one of the antennas to be selected by the antenna switching portion 358 to the antenna switching portion 358. The antenna switching portion 358 selects one of the antennas indicated by the received selection control signal, and the first RF reader 350 reads the chip-stored information of the IC chip 510 using the selected one of the antennas.

Similarly, to the second RF reader 360 are selectively connected five antennas constituting the antenna group of "player 4", five antennas constituting the antenna group of "player 5", five antennas constituting the antenna group of "player 6", i.e., fifteen antennas in total. As described above, the second RF reader 360 has the control unit 352 and the antenna switching portion 358. The control unit 352 of the second RF reader 360 transmits a selection control signal indicating one of the antennas to be selected by the antenna switching portion 358 to the antenna switching portion 358. The antenna switching portion 358 selects one of the antennas indicated by the received selection control signal, and the second RF reader 360 reads the chip-stored information of the IC chip 510 using the selected one of the antennas.

To the second RF reader 360 are selectively connected, in addition to the fifteen antennas constituting the antenna groups of “player 4” to “player 6”, three dealer antennas: deleting antenna 310, registration antenna 320 and reference antenna 330. The control unit 352 of the second RF reader 360 also transmits a selection control signal selecting these three dealer antennas to the antenna switching portion 358. When the control unit 352 of the second RF reader 360 transmits a selection control signal for selecting at least one antenna of these three dealer antennas to the antenna switching portion 358, the control unit 352 of the second RF reader 360 controls so that any of the fifteen antennas constituting the antenna groups of “player 4” to “player 6” is not selected.

Moreover, the control unit 352 of the second RF reader 360 is connected to the first RF reader 350 via the LAN 270. When the control unit 352 of the second RF reader 360 transmits the selection control signal to the antenna switching portion 358, an antenna inhibit instruction is transmitted to the first RF reader 350. The antenna inhibit instruction is an instruction to control the first RF reader 350 not to select any of the fifteen antennas constituting the antenna groups of “player 4” to “player 6”.

By so configuring, when the control unit 352 of the second RF reader 360 selects at least one antenna from the three dealer antennas: deleting antenna 310, registration antenna 320, and reference antenna 330, any of the antennas constituting the antenna groups of “player 1” to “player 6” is not selected. By so configuring, the total of thirty antennas of “player 1” to “player 6” are prevented from erroneously reading the gaming chips 500 placed in the chip deleting area, chip registration area, and chip reference area of the game table 100, and the reliability of the operation of the dealer using the deleting antenna 310, registration antenna 320, and reference antenna 330 can be increased. In particular, when the dealer is in the process of moving the gaming chips 500 to the chip deleting area, chip registration area, and chip reference area, the antennas constituting “player 1” to “player 6” are kept from reading the gaming chips 500.

<Gaming Chip 500>

The gaming chip 500 is a game medium exchanged between dealers and players instead of cash in a gaming establishment such as a casino. The gaming chip 500 is generally a medium which is produced by molding a resin or like materials into a disk shape or like shapes. The gaming chip 500 has an IC chip 510 embedded therein.

The IC chip 510 stores chip-stored information which is readable by a read signal transmitted from the first RF reader 350 and second RF reader 360. In general, the IC chip 510 retains the chip-stored information in a readable and writable manner. The IC chip 510 is configured to, if necessary, read the stored chip-stored information and update the chip-stored information. The chip-stored information contains the chip ID (for example, ID serial number) for identifying the gaming chip 500.

Figure 8:
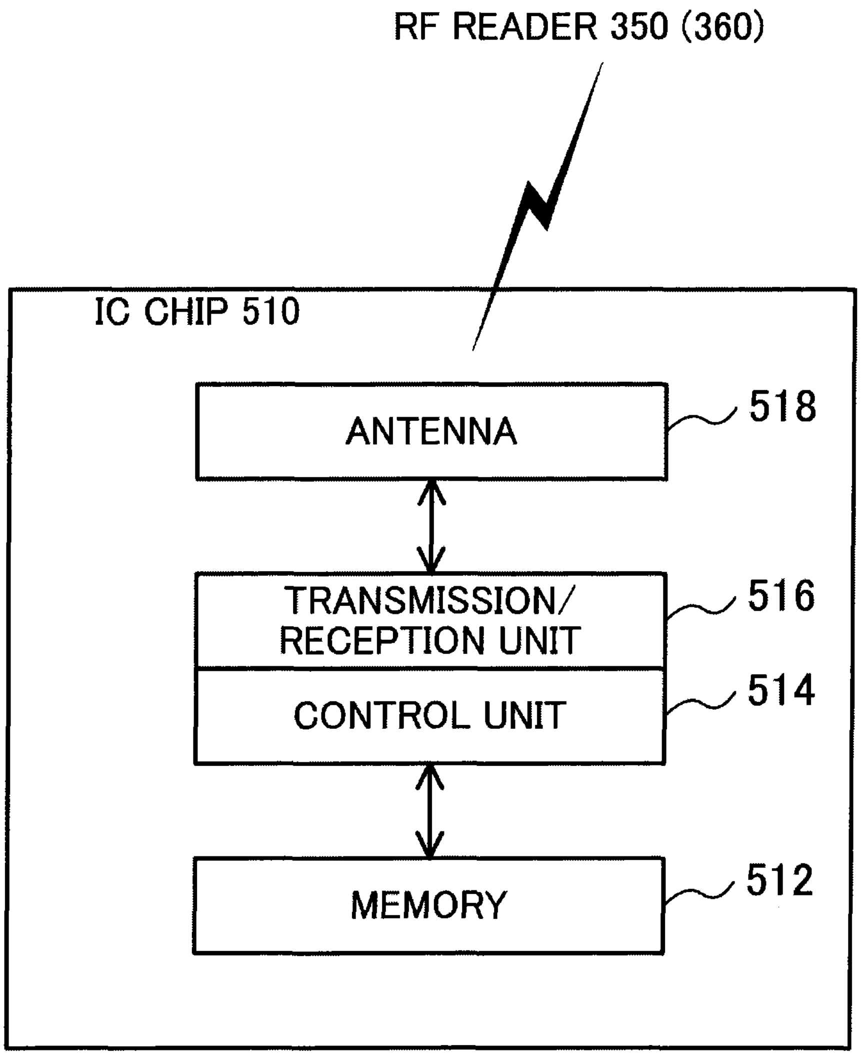
FIG. 8 is a function block diagram which shows the constitution of an IC chip 510.

FIG. 8 is a functional block diagram which shows the constitution of the IC chip 510. The IC chip 510 has a memory 512, a control unit 514, a transmission/reception unit 516, and an antenna 518.

The memory 512 is a memory device which stores chip-stored information such as the chip ID. The control unit 514 interprets commands, requests, instructions and the like transmitted from the first RF reader 350 and second RF reader 360, and executes operations corresponding to these. The transmission/reception unit 516 has a modulation unit (not shown) and a demodulation unit (not shown). The transmission/reception unit 516 performs modulation/demodulation of signals for transmitting and receiving various information such as chip-stored information by the first RF reader 350, second RF reader 360, and a wireless.

The antenna 518 receives a modulated wave from various antennas connected to the first RF reader 350 and second RF reader 360. The transmission/reception unit 516 is supplied electricity by the received modulated wave. The antenna 518 receives a modulation signal from the transmission/reception unit 516, and emits this in the air. The modulation signal emitted in the air is received by the chip reading antenna group 300 mentioned above, and is provided to the first RF reader 350 and second RF reader 360. By so configuring, the chip-stored information stored in the IC chip 510 is read by the first RF reader 350 and second RF reader 360.

Figure 18:
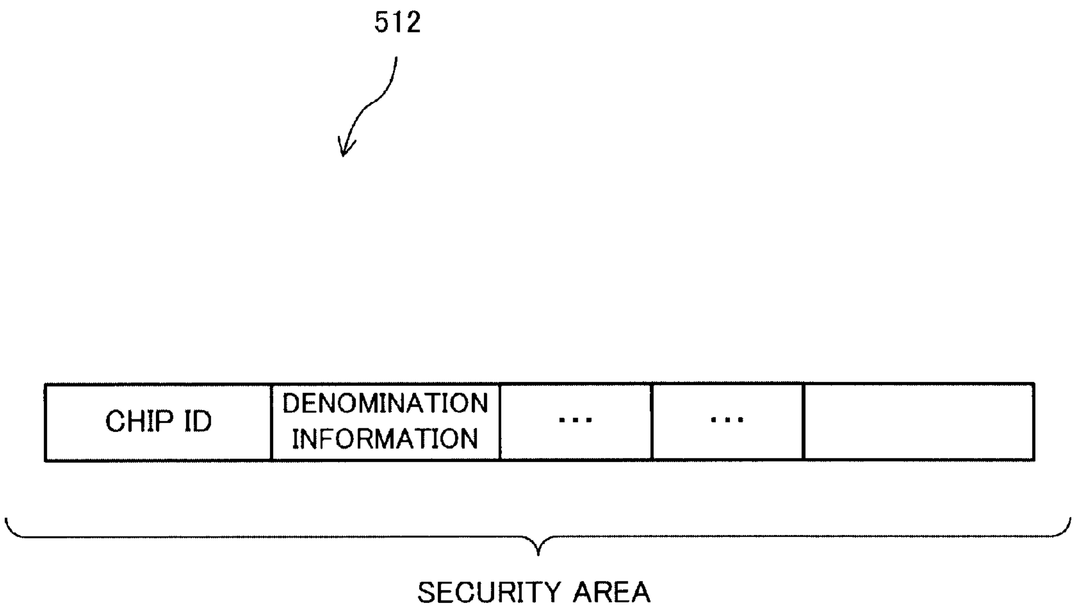
FIG. 18 is a schematic diagram which shows a security area provided on a gaming chip.

In a predetermined storage area of the memory 512 mentioned above, chip-stored information such as the chip ID is stored. The chip-stored information stored in a predetermined storage area of the memory 512 is read by the antenna 518. Moreover, a security area (FIG. 18) having a predetermined storage capacity may be provided on the memory 512, and the chip-stored information may be stored in the security area. The security area is encrypted. A data transmission request signal is input to the control unit 514 via the antenna 518, the control unit 514 outputs the chip-stored information stored in the security area, via the antenna 518. The chip-stored information is various information which characterizes the gaming chip, such as the administrator of the gaming chip, the chip ID and amount information. The first RF reader 350 and the second RF reader 360 collate the chip-stored information obtained from the gaming chip 500 with the chip control information stored in the chip database in advance. In order to process whether or not the data is appropriate in such a manner, as the IC chip 510 of the gaming chip 500, I. CODE-SLI (manufactured by Phillips Semiconductors, ISO 15693 compatible, user memory capacity: 112 bytes) wireless IC chip is employed. For example, the memory 512 of the gaming chip 500 having a predetermined amount or larger may be provided with a security area to protect the chip-stored information.

A large amount gaming chip 500 where no security area exists can be readily determined to be fraudulent gaming chip 500 which involve fraudulent behaviors such as modification or counterfeit. Moreover, even if the large amount gaming chip 500 should be fraudulently obtained and analyzed, the security area is encrypted and protected, and therefore analysis of the security area is made difficult, preventing fraudulent behaviors such as modification and counterfeit.

<Operation of First RF Reader 350, Second RF Reader 360>

As shown in FIG. 6, the fifteen antennas are connected to the first RF reader 350, while the eighteen antennas are connected to the second RF reader 360.

That is, to the first RF reader 350 are connected fifteen antennas: antennas for PLAYER bet **340*a* to 340*c*, antennas for BANKER bet 342*a* to 342*c*, antennas for TIE bet 344*a* to 344*c*, antennas for PLAYER PAIR bet 346*a* to 346*c* and antennas for BANKER PAIR bet 348*a* to 348*c*. Moreover, to the second RF reader 360 are connected eighteen antennas: antennas for PLAYER bet 340*d* to 340*f*, antennas for BANKER bet 342*d* to 342*f*, antennas for TIE bet 344*d* to 344*f*, antennas for PLAYER PAIR bet 346*d* to 346*f*, antennas for BANKER PAIR bet 348***d* to 348*f*, deleting antennas 310, registration antenna 320 and reference antenna 330.

The reading operation of the first RF reader 350 and second RF reader 360 are different from the operation at the start of the game, that is, the operation when the player bets gaming chips, or the operation at the end of the game, that is, the operation when the dealer gives gaming chips corresponding to the player's payout to the player (at payout).

First, the reading operation of the first RF reader 350 and second RF reader 360 when the player bets gaming chips is as follows.

<Operation at the Start of the Game>

The first RF reader 350 and the second RF reader 360 sequentially read antennas one by one at time series. For example, the first RF reader 350 reads the antennas for "player 1": antenna for PLAYER bet 340*a*, antenna for BANKER bet 342*a*, antenna for TIE bet 344*a*, antenna for PLAYER PAIR bet 346*a*, and antenna for BANKER PAIR bet 348*a*, basically in the order stated. Second, the first RF reader 350 reads the antennas for "player 2": antenna for PLAYER bet 340*b*, antenna for BANKER bet 342*b*, antenna for TIE bet 344*b*, antenna for PLAYER PAIR bet 346*b*, and antenna for BANKER PAIR bet 348*b* in the order stated. Finally, the first RF reader 350 reads the antennas for "player 3": antenna for PLAYER bet 340*c*, antenna for BANKER bet 342*c*, antenna for TIE bet 344*c*, antenna for PLAYER PAIR bet 346*c*, and antenna for BANKER PAIR bet 348*c* in the order stated.

Similarly, the second RF reader 360 reads the antennas for "player 4": antenna for PLAYER bet 340*d*, antenna for BANKER bet 342*d*, antenna for TIE bet 344*d*, antenna for PLAYER PAIR bet 346*d*, and antenna for BANKER PAIR bet 348*d*, basically in the order stated. Next, the second RF reader 360 reads the antennas for "player 5": antenna for PLAYER bet 340*e*, antenna for BANKER bet 342*e*, antenna for TIE bet 344*e*, antenna for PLAYER PAIR bet 346*e*, and antenna for BANKER PAIR bet 348*e* in the order stated. Finally, the second RF reader 360 reads the antennas for "player 6": antenna for PLAYER bet 340*f*, antenna for BANKER bet 342*f*, antenna for TIE bet 344*f*, antenna for PLAYER PAIR bet 346*f*, and antenna for BANKER PAIR bet 348*f* in the order stated.

The first RF reader 350 and the second RF reader 360 simultaneously perform reading operation sequentially. Therefore, for example, when the read times of the antennas coincide, the reading operation of the first RF reader 350 and the reading operation of the second RF reader 360 are synchronized. More specifically, when the first RF reader 350 is reading the antenna for PLAYER bet 340*a*, the second RF reader 360 is reading the antenna for PLAYER bet 340*d*. Moreover, when the first RF reader 350 is reading the antenna for TIE bet 344*c*, the second RF reader 360 is reading the antenna for TIE bet 344*f*. In such a manner, when the read times of the antennas coincide, the first RF reader 350 and second RF reader 360 are synchronized while they can sequentially read the antennas.

As described above, the six antennas for PLAYER bet 340*a* to 340*f*, six antennas for BANKER bet 342*a* to 342*f*, six antennas for TIE bet 344*a* to 344*f*, six antennas for PLAYER PAIR bet 346*a* to 346*f*, and six antennas for BANKER PAIR bet 348*a* to 348*f* are provided on the gaming table 100 so that the distances between adjacent antennas are almost the same. Thus, when the player bets gaming chips, where in the betting area the player places the gaming chips is unknown, and therefore it is configured that the first RF reader 350 and second RF reader 360 are synchronized while all of the in the betting area corresponding to the antennas are sequentially read.

By causing the first RF reader 350 and second RF reader 360 to operate in such a manner, the distance between the antennas read by the first RF reader 350 and the antennas read by the second RF reader 360 can be equal to or longer than a predetermined distance at all times, whereby interference is unlikely to occur even when reading operation is performed simultaneously by the first RF reader 350 and second RF reader 360, leading to precise reading of antennas.

<Operation at the End of Game (at Payout)>

As described above, the reading operation of the first RF reader 350 and second RF reader 360 is different from the operation at the start of the game and the operation at the end of the game are different. The reading operation of the first RF reader 350 and second RF reader 360 at the end of the game, that is, when the dealer gives gaming chips corresponding to the player's payout to the player (at payout) is as follows.

At the payout, the game is already over and the game results are finalized, and therefore the dealer has already determined the betting area in which with gaming chips worth the payout placed. Therefore, only the necessary betting area needs to be read depending on the game results. That is, only the antenna corresponding to the necessary betting area needs to be sequentially selected, and the gaming chips placed in the betting area needs to be read. Such a configuration similar to the start of the game, the antenna corresponding to each of all the betting areas does not have to be sequentially read, and therefore reading can be completed in a short period of time. Therefore, the entire process necessary at the payout and other occasions such as calculation of the amount of the gaming chips equivalent to the payout can be completed quickly.

The touch panel device 152 is operated by the dealer, whereby the chip ID's of the gaming chips 500 placed in various betting areas is read by the antennas provided corresponding to the betting area by the first RF reader 350 and second RF reader 360. The read chip ID is transmitted to the gaming chip server 410 via the LAN 270. By transmitting the chip ID to the gaming chip server 410, the chip control information of the gaming chip 500 can be inquired. By the inquired chip control information, whether or not the gaming chip 500 is appropriate can be determined. The chip control information is transmitted to the main control device 210, and the determination result whether or not the gaming chip 500 is appropriate is indicated on a dealer display 150.

The chip control information comprises various information regarding the gaming chip 500 such as validation and invalidation information, lock information, player information and face value information.

The validation and invalidation information is information indicating whether or not the gaming chip 500 has a negotiable value in the gaming establishment. When the gaming chip 500 is validated, it is in the state that it has a negotiable value in the gaming establishment. When the gaming chip 500 is invalidated, the gaming chip 500 is in the state that it has no negotiable value in the gaming establishment. The gaming chip 500 given from the dealer for playing a game and the gaming chip 500 given from the dealer as a payout have been subjected to a validation process by the dealer. Moreover, when the player loses the game and the gaming chip 500 is collected by the dealer, the chip for game play is invalidated. Furthermore, the gaming chip 500 is also invalidated when the gaming chip 500 is exchanged to cash at the cashier.

The chip control information containing the validation and invalidation information is stored on the gaming chip server 410. Therefore, when the validation and invalidation information is changed, the chip ID of the gaming chip 500 and the information that the validation and invalidation information is changed are transmitted from main control device 210 to the gaming chip server 410, and the gaming chip server 410 receives the information that the validation and invalidation information is changed, and updates the validation and invalidation information in association with the chip ID.

The lock information is information indicating whether the gaming chip 500 is locked. When the gaming chip 500 is locked, any change in the chip control information such as validation and invalidation information and player information is inhibited. That is, when the gaming chip 500 is locked, the gaming chip 500 cannot be changed to be validated or invalidated. Similarly, when the gaming chip 500 is locked, the player information cannot be changed.

When a game is played on the game table 100, the gaming chip 500 is locked. This will be more specifically described as follows: first, when the player simply possesses the gaming chip 500, the gaming chip 500 is validated and is unlocked. Furthermore, even at the time when the player places the gaming chip 500 in a desired betting area to begin the game, the gaming chip 500 is not locked. Thereafter, when betting by the player is over and the game starts, the gaming chip 500 is locked. When the game starts, the dealer operates the touch panel device 152 or other devices, the information that the game is started is input in the main control device 210. The gaming chip 500 is locked responsive to this input of the information that the game is started in the main control device 210. In such a manner, the gaming chip 500 is locked when the game starts, and therefore the validation and invalidation information cannot be updated while the game is being played, and the validated state of the gaming chip 500 is maintained.

Second, when the game is over, the dealer operates the touch panel device 152 and other devices to input the information that the game is over in the main control device 210. The gaming chip 500 is unlocked responsive to the input of the information that this game is over in the main control device 210.

In such a manner, when a game is played on the game table 100, the gaming chip 500 is locked. By so configuring, even if the gaming chip 500 is replaced during the game, the validation and invalidation information is maintained by the lock information, and therefore the gaming chip 500 cannot be used as it is. Moreover, when the locked gaming chip 500 is used, it can be readily found that a fraud had been commuted.

Moreover, the gaming chip 500 is also locked when it is invalidated. For example, when the gaming chip 500 is collected by the dealer after the game is over and is invalidated, it is locked at the same time, and its invalidated state can be maintained. By so configuring, the collected gaming chip 500 can be prevented from being fraudulently used. The invalidated gaming chip 500 and the locked gaming chip 500 cannot be used for a game or cashed.

The lock information is also stored in the gaming chip server 410. Therefore, when the lock information is changed, the chip ID of the gaming chip 500 and the information that the lock information is changed is transmitted to the gaming chip server 410 from the main control device 210. The gaming chip server 410 receives the information that the lock information is changed, and updates in association with the chip ID the lock information.

The player information is information for indicating the player who owns the gaming chip 500 at that time. The player information is information containing the player ID. As described above, the player ID is stored on the ID card owned by the player. The player ID can be obtained by reading the ID card by an IC card reader/writer 252. By so configuring, the gaming chip 500 and the player can be linked, and the player corresponding to the gaming chip 500 can be controlled.

The face value information is information of a face value indicating the negotiable value of the gaming chip 500. The face value information is information which is defined to be constant on each of the gaming chips 500, and the face value information is not updated on the gaming chip server 410. The face value information is read from the gaming chip server 410 for reference and for other purposes.

In the example described above, the case where the chip control information is stored on the gaming chip server 410 was shown, but the chip control information may be also stored on the gaming chip 500 in addition to the chip-stored information. In this case, a reader/writer which is capable of reading and writing may be used instead of the first RF reader 350 and second RF reader 360. By so configuring, the chip control information stored on the gaming chip server 410 and the chip control information stored on the gaming chip 500 can be compared, and if any fraud has been committed can be determined more easily.

<Payout of the Gaming Chip 500 (Validation of the Gaming Chip 500)>

Payout of the gaming chip 500 is initially performed on the antenna for PLAYER bet 340*a*, antenna for BANKER bet 342*a*, antenna for TIE bet 344*a*, antenna for PLAYER PAIR bet 346*a*, and antenna for BANKER PAIR bet 348*a* of "player 1", in the order stated. Next, payout of the gaming chip 500 is performed on the antennas of "player 2" in the same order, "player 3", "player 4", "player 5", and "player 6", in the order stated.

As specific operation, first, the dealer retrieves (the gaming chip 500 in invalidated state) the gaming chip 500 equivalent to the payout from the chip tray 610. Second, the dealer places the gaming chip 500 in the betting area of the bet which won the game. The placed gaming chip 500 is read, and if the payout amount of the read gaming chip 500 and the payout amount calculated by the main control device 210 are the same, the chip is validated and unlocked.

<<Outline of the Game>>

Figure 5:
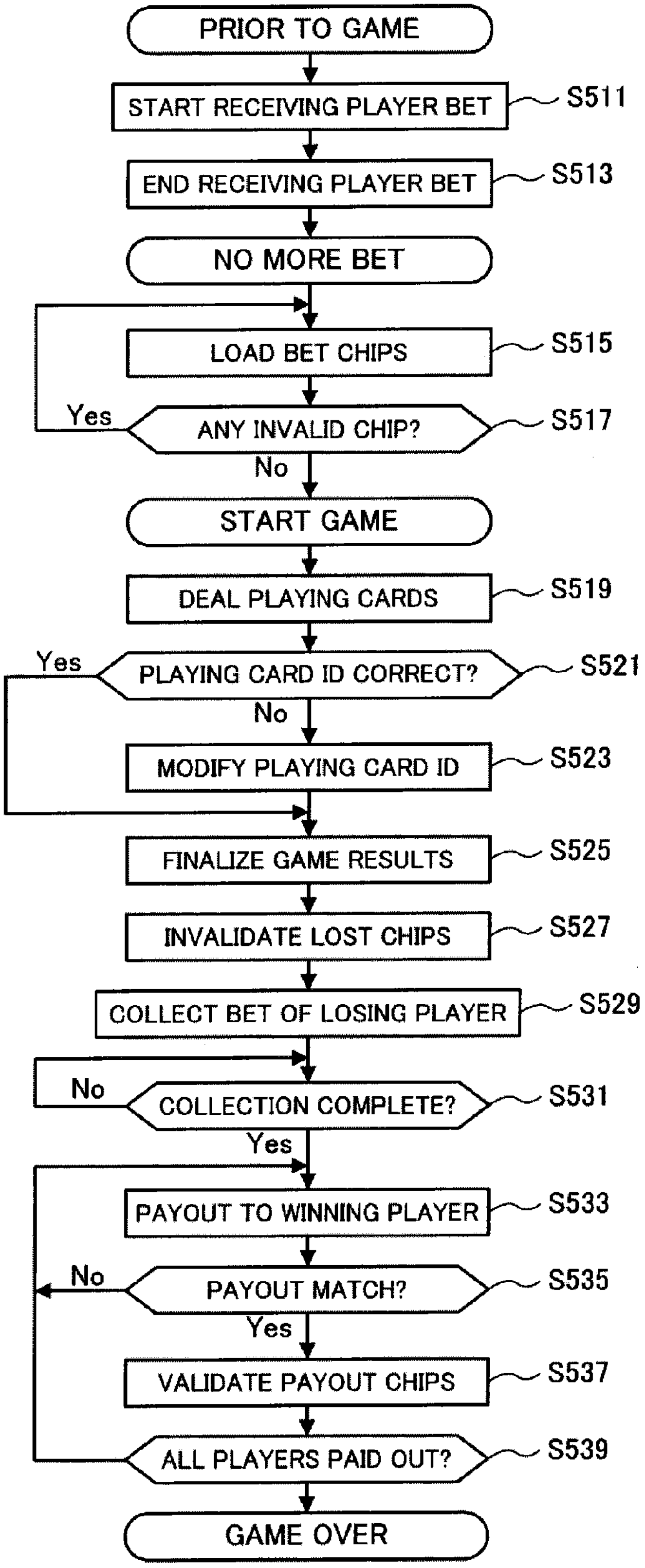
FIG. 5 is a flowchart which shows the outline of a game performed in the game table 100.

FIG. 5 is a flowchart which shows the outline of a game performed on the game table 100. This flowchart indicates the progress of the game, and therefore includes both the operation of the dealer and the player and the operation of the control device 200. More specifically, steps S511, S513, S519, S523, S529 and S533 shown below are processes indicating the operation of the dealer and the player.

First, receipt of a bet by the player is started ("Start receiving player BET" in step S511). This receipt of bet includes exchange of the gaming chip 500 from cash (IC card) and operations such as changing of the gaming chip 500. When the player places the gaming chip 500 of a desired negotiable value in the desired betting area, the acceptance of the bet is finished ("End receiving player BET" in step S513). Addition and changing of any bet are inhibited thereafter ("no more BET" in FIG. 5).

The dealer notifies the player that the acceptance of bets is ended, and starts reading the gaming chip 500 placed in the betting area ("Load BET chips" in step S515). It is determined whether or not all the betting areas have been read ("any invalid chip?" in step S517). When all the betting areas have not been read, the gaming chip 500 placed in the remaining betting areas are read (step S515).

When all the betting areas have been read, the game is started ("START GAME" in FIG. 5). First, playing cards (cards) are disposed at predetermined locations by the dealer ("deal playing cards" in step S519). The game table 100 is a table for Baccarat, on which playing card are disposed in a "PLAYER" area and a "BANKER" area.

As described above, when the playing cards are disposed, cards are removed one by one from the opening of the shoe for identifying cards 120. At that time, the images of the cards are read by the scanner, and the details of the cards such as the numbers and the marks and symbols indicating suites of the removed cards are stored in the first sub control device 220.

Moreover, the disposed playing cards are photographed by a card recognition camera 110, and the details of the disposed cards such as the numbers and the mark of cards indicating their suites are stored in the third sub control device 240.

The main control device 210 compares the details of the cards such as the number and the marks and symbols indicating the suites stored in the first sub control device 220 with the details of the cards such as the number and the marks and symbols indicating the suites stored in the third sub control device 240 ("Playing card ID correct?" in step S521). The results of comparison are indicated on the dealer display 150. The dealer visually confirms the results of comparison to check if they match. When the identifications do not match, the details of the cards are changed to appropriate ones by the operation of the dealer ("Modify playing card ID" in step S523).

When the identifications match, or the details of the card are changed to appropriate ones, the results of the game are finalized ("Finalize game results" in step S525). Depending on the results of the game, the gaming chips 500 of the player who lost the game are invalidated ("Invalidate lost chips" in step S527). This process is for transmitting the chip ID's of the gaming chips 500 of the losing player and the information to be invalidated to the gaming chip server 410, and updating the chip control information stored in the gaming chip server 410.

Second, the gaming chips 500 of the player who lost the game are collected ("collect BET of losing player" in step S529. It is determined whether or not the gaming chips 500 of all the players who lost the game have been collected ("Collection complete?" in step S531).

Subsequently, the gaming chips 500 are given to the player who won the game as a payout ("Payout to winning player" in step S533), and it is determined whether or not the negotiable value of the gaming chip 500 given to the player who won the game matches the payout ("payout match?" in step S535). This determination is for causing the reference antenna 330 to read the gaming chips 500 to be given to the player, and causing the main control device 210 to determine whether the gaming chips 500 matches the payout. When the payout matches the gaming chips 500, the gaming chips 500 read by the reference antenna 330 are the gaming chips 500 to be given to the player who won the game. Therefore, those gaming chips 500 are validated by the registration antenna 320 ("Validate payout chips" in step S537), and the gaming chips 500 are given to the player who won the game as a payout.

The process of validating the gaming chip 500 is for transmitting the chip ID of the gaming chip 500 and the information to be validated to the gaming chip server 410, and updating the chip control information stored in the gaming chip server 410.

It is determined whether or not payout for all the players who won the game is completed ("all players paid out?" in step S539). When payout for all the players is not completed, a payout process is continued by the dealer (step S533), when payout for all the players is finished, the game is ended ("Game over" in FIG. 5).

<<Collision Process>>

Figure 10:
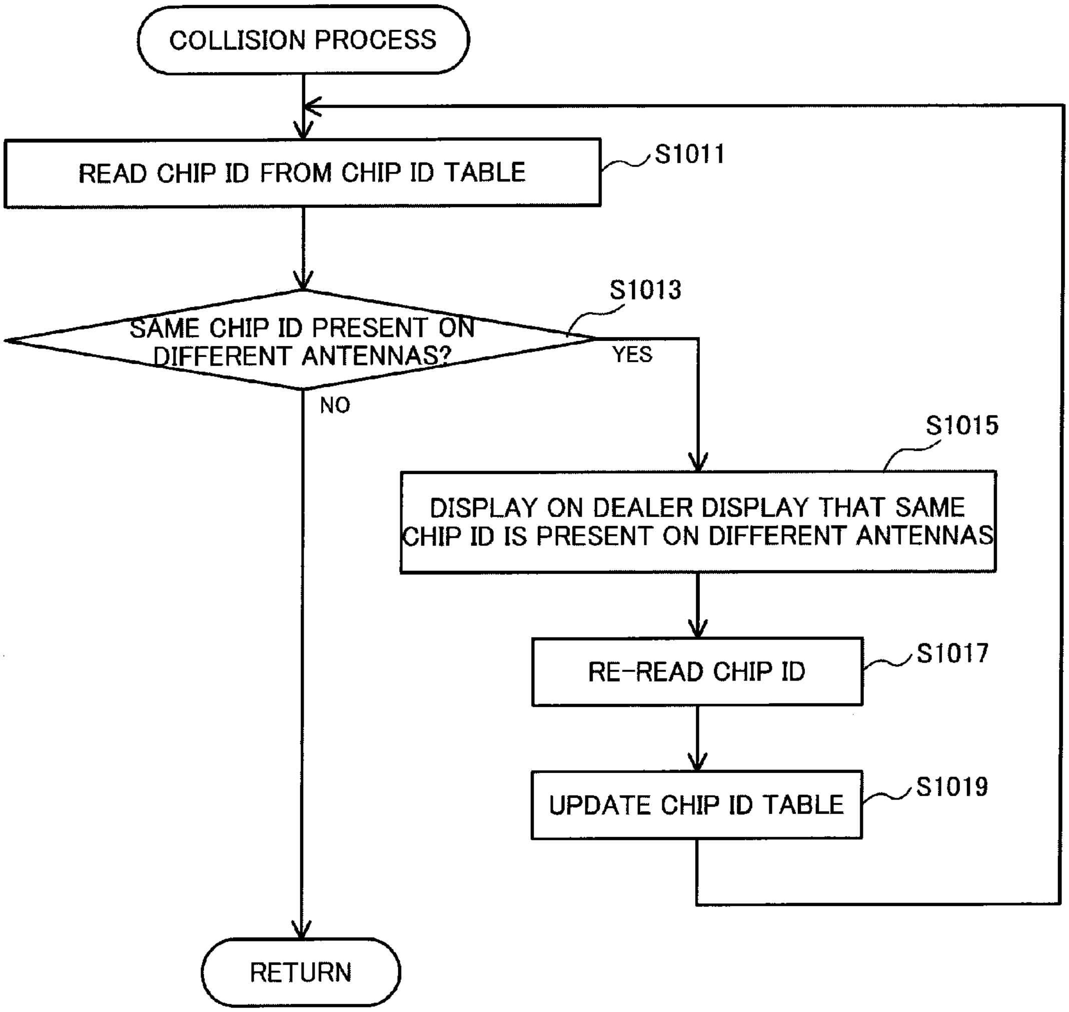
FIG. 10 is a flowchart which shows a subroutine of a collision process.

FIG. 10 is a flowchart which shows a subroutine of a collision process.

Initially, the CPU of the main control device 210 reads all the chip ID's stored in the chip ID table from table the chip ID (step S1011).

FIG. 9 is a drawing which shows an example of the chip ID table. The results of reading of the antennas for PLAYER bet 340*a* to 340*c*, antennas for BANKER bet 342*a* to 342*c*, antennas for TIE bet 344*a* to 344*c*, antennas for PLAYER PAIR bet 346*a* to 346*c* and antennas for BANKER PAIR bet 348*a* to 348*c*, i.e., fifteen antennas in total, by the first RF reader 350, and the results of reading of antennas for PLAYER bet 340*d* to 340*f*, antennas for BANKER bet 342*d* to 342*f*, antennas for TIE bet 344*d* to 344*f*, antennas for PLAYER PAIR bet 346*d* to 346*f*, antennas for BANKER PAIR bet 348*d* to 348*f*, i.e., the total of fifteen antennas, by the second RF reader 360, are stored as the chip ID table.

The chip ID's of the gaming chips 500 read by these thirty antennas are all stored on the chip ID table. When a plurality of the gaming chips 500 are detected by a single antenna, that is, a plurality of the gaming chips 500 are placed and bet in a single betting area, the chip ID's of all the detected gaming chips 500 are stored in the area corresponding to the chip ID table.

The chip ID table is stored in a predetermined area of the RAM of the main control device 210. The results read by the first RF reader 350 and second RF reader 360 are transmitted to the main control device 210 via the LAN 270. Moreover, not only the chip ID but also the chip-stored information stored on the gaming chips 500 may be stored on the chip ID table. The gaming chip 500 can be controlled by such various information.

It should be noted that the chip ID table for the following fifteen antennas may be stored on the RAM (not shown) of the first RF reader 350: antennas for PLAYER bet 340*a* to 340*c*, antennas for BANKER bet 342*a* to 342*c*, antennas for TIE bet 344*a* to 344*c*, antennas for PLAYER PAIR bet 346*a* to 346*c* and antennas for BANKER PAIR bet 348*a* to 348*c*, and the chip ID table for the following fifteen antennas may be stored on the RAM (not shown) of the second RF reader 360: antennas for PLAYER bet 340*d* to 340*f*, antennas for BANKER bet 342*d* to 342*f*, antennas for TIE bet 344*d* to 344*f*, antennas for PLAYER PAIR bet 346*d* to 346*f* and antennas for BANKER PAIR bet 348*d* to 348*f*. The chip-stored information such as the chip ID can be controlled separately by the first RF reader 350 and second RF reader 360.

In the description of the flowchart in FIG. 10, the antennas constituting the chip reading antenna group 300 are simply referred to as the antennas.

Subsequently, the CPU of the main control device 210 determines whether the same chip ID is registered on different antennas (step S1013). Each of the antennas is provided on the back side of the game table 100 correspondingly to different betting areas. Therefore, different chip ID's are basically registered on different antennas, and the same chip ID is not registered on different antennas. However, the gaming chip 500 may be placed between two betting areas in some cases. In such a case, the same chip ID is likely to be registered on the two antennas corresponding to these two betting areas. The determination process in step S1013 is for determining such a state.

When the CPU of the main control device 210 determines that the same chip ID is not registered on different antennas (NO), it ends this subroutine immediately.

When the CPU of the main control device 210 determines that the same chip ID is registered (YES) on different antennas, it displays a message indicating that the same chip ID is registered on different antennas on the dealer display 150 (step S1015). When the dealer visually confirms the indicated message, gives the information to the player who placed the applicable gaming chip 500, and asks the player to move the gaming chip 500.

Subsequently, the CPU of the main control device 210 again reads the chip ID via the antennas (step S1017), updates the chip ID table with the read chip ID (step S1019), and returns the process to step S1011 mentioned above.

Thereafter, if the same chip ID is not registered on different antennas, the gaming chip 500 is placed and bet in an appropriate betting area, and this subroutine is thus ended.

<<Antenna Dynamic Selection Process>>

Figure 11:
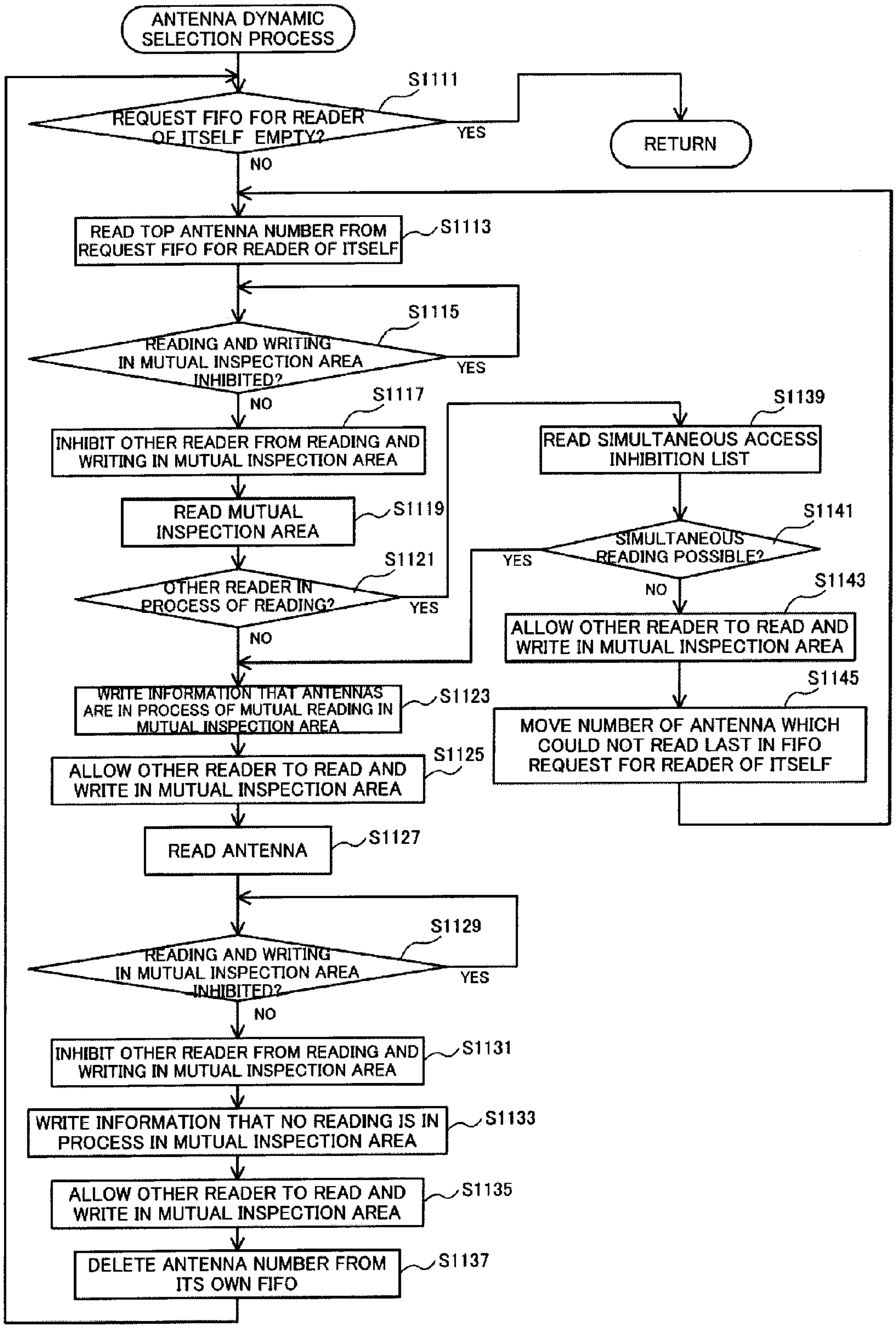
FIG. 11 is a flowchart which shows a subroutine of an antenna dynamic selection process.

FIG. 11 is a flowchart which shows a subroutine of an antenna dynamic selection process. As described above, the antennas used by the player to make a bet among the chip reading antenna groups 300 are the antenna for PLAYER bet 340, antenna for BANKER bet 342, antenna for TIE bet 344, antenna for PLAYER PAIR bet 346, and antenna for BANKER PAIR bet 348.

To the first RF reader 350 are connected antennas for PLAYER bet 340*a* to 340*c*, antennas for BANKER bet 342*a* to 342*c*, antennas for TIE bet 344*a* to 344*c*, antennas for PLAYER PAIR bet 346*a* to 346*c* and antennas for BANKER PAIR bet 348*a* to 348*c*, i.e., fifteen antennas in total. To the second RF reader 360 are connected, as the antennas used by the player to make a bet, antennas for PLAYER bet 340*d* to 340*f*, antennas for BANKER bet 342*d* to 342*f*, antennas for TIE bet 344*d* to 344*f*, antennas for PLAYER PAIR bet 346*d* to 346*f* and antennas for BANKER PAIR bet 348*d* to 348*f*, i.e., fifteen antennas in total.

The first RF reader 350 and the second RF reader 360 sequentially read the antennas at time series one at a time. When the read times of the antennas coincide, the reading operation can be performed by synchronizing the first RF reader 350 and second RF reader 360. However, the number of the gaming chips 500 wagered by the player are often unevenly distributed to a plurality of betting areas. Therefore, when the read time of a certain betting area is longer than that of others, it is presumably difficult to perform the reading operation by synchronizing the first RF reader 350 and second RF reader 360.

The antenna dynamic selection process shown in this FIG. 11 is for dynamically and suitably changing the antenna selected for the reading operation to process the reading operations of the antennas entirely, rapidly and smoothly.

The flowchart shown in FIG. 11 is executed in both the first RF reader 350 and second RF reader 360. The first RF reader 350 and second RF reader 360 are connected via the LAN 270, and can transmit information indicating the states of themselves to each other. The program of the flowchart shown in FIG. 11 can operate in parallel with an upper application program. The reading operations of the antennas are specified from the upper application program, and the flowchart shown in FIG. 11 is executed, whereby the read results are sent to the upper application program. The upper application program is preferably executed in the main control device 210. Various information such as designation of reading operation and read results are communicated between the first RF reader 350 and second RF reader 360 and the main control device 210, via the LAN 270. Moreover, the upper application program may be executed by the first RF reader 350 and second RF reader 360.

In the following description of FIG. 11, an RF reader is simply referred to as the reader. Moreover, the reader itself and the other reader can be either the first RF reader 350 or second RF reader 360. Except that the deleting antenna 310, registration antenna 320, and reference antenna 330 are connected to the second RF reader 360, the constitutions and functions of the first RF reader 350 and second RF reader 360 are completely the same. For example, when the reader itself is the first RF reader 350, the other reader is the second RF reader 360, while when the reader itself is the second RF reader 360, the other reader is the first RF reader 350. The flowchart shown in FIG. 11 is simultaneously executed on both the first RF reader 350 and second RF reader 360.

Initially, the CPU of the reader determines whether or not a request FIFO for of the reader itself is empty (step S1111). The request FIFO is set in a storage area of a predetermined range of the RAM (not shown) of the first RF reader 350 and second RF reader 360. When the CPU of the reader determines that the request FIFO for the reader itself is empty (YES), this subroutine is immediately ended.

In contrast, the CPU of the reader determines that the request FIFO for the reader itself is not empty (NO), it reads the antenna number stored in the first storage area from the request FIFO for the reader itself (step S1113). Herein, the antenna number is the number for identifying each of the thirty antennas consisting of the antennas for PLAYER bet 340, antennas for BANKER bet 342, antennas for TIE bet 344, antennas for PLAYER PAIR bet 346, and antennas for BANKER PAIR bet 348.

Subsequently, the CPU of the reader determines whether or not writing in the mutual inspection area is inhibited (step S1115). The mutual inspection area is an area in which both the first RF reader 350 and second RF reader 360 can read and write information. This mutual inspection area is set in predetermined areas of the RAM of both the first RF reader 350 and second RF reader 360. Since both readers has information to be referred to by each other, it is configured that when the mutual inspection area is changed in the first RF reader 350, the mutual inspection area in second RF reader 360 is also changed immediately, via the LAN 270. Meanwhile, when the mutual inspection area in the second RF reader 360 is changed, the mutual inspection area in the first RF reader 350 is also changed, immediately, via the LAN 270. The mutual inspection area may be set in a predetermined area of the RAM of the main control device 210.

When the CPU of the reader determines that writing in the mutual inspection area is inhibited (YES), the process returns to step S1115.

In contrast, when the CPU of the reader determines that writing in the mutual inspection area is not inhibited (NO), it inhibits reading and writing in the mutual inspection area by the other reader (step S1117), and reads the information written in the mutual inspection area (step S1119). It is determined whether or not the information written in the mutual inspection area is the information indicating that the other reader is reading (step S1121).

The CPU of the reader, when the information written in the mutual inspection area is not the information indicating that the other reader is reading (NO), that is, when the other reader is not reading, writes the information indicating that the reader itself is in the operation of reading antennas in the mutual inspection area (step S1123). Next, the CPU of the reader allows the other reader to read and write in the mutual inspection area (step S1125).

Subsequently, the CPU of the reader executes the reading operation of the antenna indicated by the antenna number read in the process in step S1113 (step S1127).

Subsequently, the CPU of the reader determines whether or not reading and writing in the mutual inspection area is inhibited (step S1129). When the CPU of the reader, determines that reading and writing in the mutual inspection area is inhibited (YES), the process returns to step S1129.

On the other hand, when the CPU of the reader determines that reading and writing in the mutual inspection area are not inhibited (NO), it inhibits reading and writing in the mutual inspection area of the other reader (step S1131), writes information indicating that the reader itself is not in a reading operation in the mutual inspection area (step S1133), and allows the other reader to read and write in the mutual inspection area (step S1135).

Next, the CPU of the reader deletes the number of the antenna which has completed the reading operation from the request FIFO for the reader itself (step S1137), and returns the process to step S1111.

In the determination process in step S1121 mentioned above, when the information written in the mutual inspection area is the information indicating that the other reader is reading (YES), that is, when the other reader is in the process of reading, the CPU of the reader reads the simultaneous access inhibition list (step S1139).

The simultaneous access inhibition list is data indicating the combinations of the antennas which are inhibited from being simultaneously accessed by the first RF reader 350 and second RF reader 360. More specifically, when the combination of the antennas selected by the first RF reader 350 for reading operation and the antenna selected by the second RF reader 360 for reading operation is inappropriate, the combination of antennas is inhibited from being is selected simultaneously for reading operation by the simultaneous access inhibition list.

Such simultaneous reading operation is inhibited since simultaneous access causes interference, which prevents precise reading in both the first RF reader 350 and second RF reader 360. For example, whether or not a certain combination of antennas are inhibited from being simultaneously accessed is determined by whether the distance between them is a predetermined length or shorter. When antennas disposed at a predetermined distance or shorter are simultaneously accessed, interference is likely to occur. Furthermore, the combinations of the antennas which are inhibited from being simultaneously accessed are determined not only by the distance, but also by various features such as characteristics, directions and size of the antennas. By selecting the antennas with reference to this simultaneous access inhibition list, occurrence of interference between antennas can be prevented, and simultaneous and precise reading is allowed in both the first RF reader 350 and second RF reader 360.

The CPU of the reader, determines whether or not given two antennas can be simultaneously read from the simultaneous access inhibition list read in the process of step S1139 (step S1141). Likewise, the other reader also executes the subroutine shown in this FIG. 11, and the CPU of the other reader also reads the number of antennas to read by executing the process in FIG. 11.

Subsequently, the CPU of the reader allows the other reader to read and write in the mutual inspection area (step S1143).

Subsequently, the CPU of the reader moves the order of the antenna which cannot be read this time to the last in the request FIFO for the reader itself, updates the request FIFO (step S1145), and returns the process to step S1113.

By executing the subroutine shown in this FIG. 11, reading operations of antennas can be performed simultaneously in both the first RF reader 350 and second RF reader 360, and inappropriate selection of antennas, which may cause interference, can be prevented. By so configuring, reading can be performed simultaneously and precisely in both the first RF reader 350 and second RF reader 360.

Moreover, the order of the antenna which is inhibited to be read is changed to the last in the reading operation. This allows the antennas to be dynamically selected, and shortens the time required for the reading operation.

<Specific Example of Antenna Dynamic Selection Process>

Specific examples of the antenna dynamic selection process mentioned above will be described below. Hereinafter, for simplicity, it is assumed that three antennas a, b and c are connected to the first RF reader 350, and that three antennas A, B and C are connected to the second RF reader 360.

Moreover, as specific examples of the simultaneous access inhibition list, it is assumed that antenna A is unavailable for simultaneous access with respect to antenna a; antennas A and B are unavailable for simultaneous access with respect to antenna b; and antennas A, B and C are unavailable for simultaneous access with respect to antenna c. Such a simultaneous access inhibition list is used because if closely located antennas are simultaneously driven, the antennas interfere with each other so that reading of the chips is difficult.

The upper application program in the flowchart shown in FIG. 11 does not have connection information between antennas and the first RF reader 350 and second RF reader 360, and the upper application program sequentially and simply issues requests to read a, b, c, A, B and C. The upper application program executes other processes without waiting for the results from, second RF reader 360 the first RF reader 350. The results from the first RF reader 350 and the second RF reader 360 are given to the upper application program as needed from the antennas of which the reading process is over.

An antenna read request control program distributes requests to the first RF reader 350 and second RF reader 360, and stores a request antenna number to the respective request queues (FIFO). In the case of this example, request FIFO of the first RF reader 350=a, b, c, while the request FIFO of the second RF reader 360=A, B, C.

First, the first RF reader 350 retrieves antenna a from the request FIFO (step S1113). The first RF reader 350 examines the mutual inspection area with the second RF reader 360 (step S1115), confirms that the second RF reader 360 is not reading antennas (step S1121), and then writes the information "currently reading antenna a" in the mutual inspection area with the second RF reader 360 (step S1123). From the examination of the mutual inspection area to the writing step, reading and writing in the mutual inspection area by the second RF reader 360 are inhibited (step S1117 and step S1125).

Subsequently, the second RF reader 360 removes antenna A from the request FIFO (step S1113), inhibits reading and writing in the mutual inspection area (step S1117), and then attempts to examine the mutual inspection area (step S1121). However, reading and writing by the first RF reader 350 have been inhibited in advance (step S1117). Therefore, reading and writing inhibition control fails, and the process is put on standby (step S1115).

When the first RF reader 350 cancels the reading and writing inhibit state in the mutual inspection area (step S1125), the standby state of the second RF reader 360 is canceled; reading and writing in the mutual inspection area is inhibited (step S1117); and the mutual inspection area is then examined (step S1121).

Accordingly, the information that the first RF reader 350 is "currently reading antenna a" is obtained. The second RF reader 360 collates the information with the simultaneous access inhibition list (step S1139), so that it cannot read antenna A.

Subsequently, the second RF reader 360 puts antenna A back in the request FIFO (step S1145), and retrieves the next request (step S1113).

At this point, the request FIFO of the first RF reader 350 are b and c, while the request FIFO of the second RF reader 360 is B, C and A.

As for antenna B, which is the next request of the second RF reader 360, the second RF reader 360, which learned that antenna a is being read by the first RF reader 350, writes the information "currently reading antenna B" in the mutual inspection area (step S1123).

The first RF reader 350 reads the gaming chip 500 by antenna a (step S1127), while the second RF reader 360 reads the gaming chip 500 by antenna B (step S1127).

Subsequently, the first RF reader 350 and second RF reader 360 which have finished reading execute a similar process, and write in the mutual inspection area the information "no antenna being read" (step S1133).

As long as any request is present in the request FIFO, the process mentioned above is repeated. When the numbers of the gaming chips 500 placed on each of the antennas are uniform and there is no variation in the read time, the reading operations of the antennas proceeds in the order of (a, B), (b, C), (c,-), (A,-). The antennas in the brackets are simultaneously accessed. The items on the left in the brackets indicate antennas read by the first RF reader 350, while the item on the right in the brackets indicate antennas read by the second RF reader 360.

In the case where there is no dynamic scheduling as shown in FIG. 11, the second RF reader 360 cannot read antenna A while the first RF reader 350 is reading antenna a, and therefore the second RF reader 360 waits for the first RF reader 350 to finish reading antenna a. Furthermore, when the second RF reader 360 starts to read antenna A, the first RF reader 350 cannot read antenna b requested next, and therefore the first RF reader 350 waits for the second RF reader 360 to finish reading antenna A. Consequently, the same length of time as required to sequentially read the six antennas a, b, c, A, B and C by a single RF reader is required.

Furthermore, as described above, to the second RF reader 360 are connected, in addition to the fifteen antennas for the player, the three antennas for the dealer: deleting antennas 310, registration antenna 320 and reference antenna 330, which are read as necessary. The simultaneous access inhibition list is also defined for these deleting antenna 310, registration antenna 320 and reference antenna 330. When a request to read an antenna for player is issued, these antennas for the dealer are sometimes in the process of being read, and the antennas for the dealer are also the target of scheduling in such a case.

<<Chip Database Access Process>>

Figure 12:
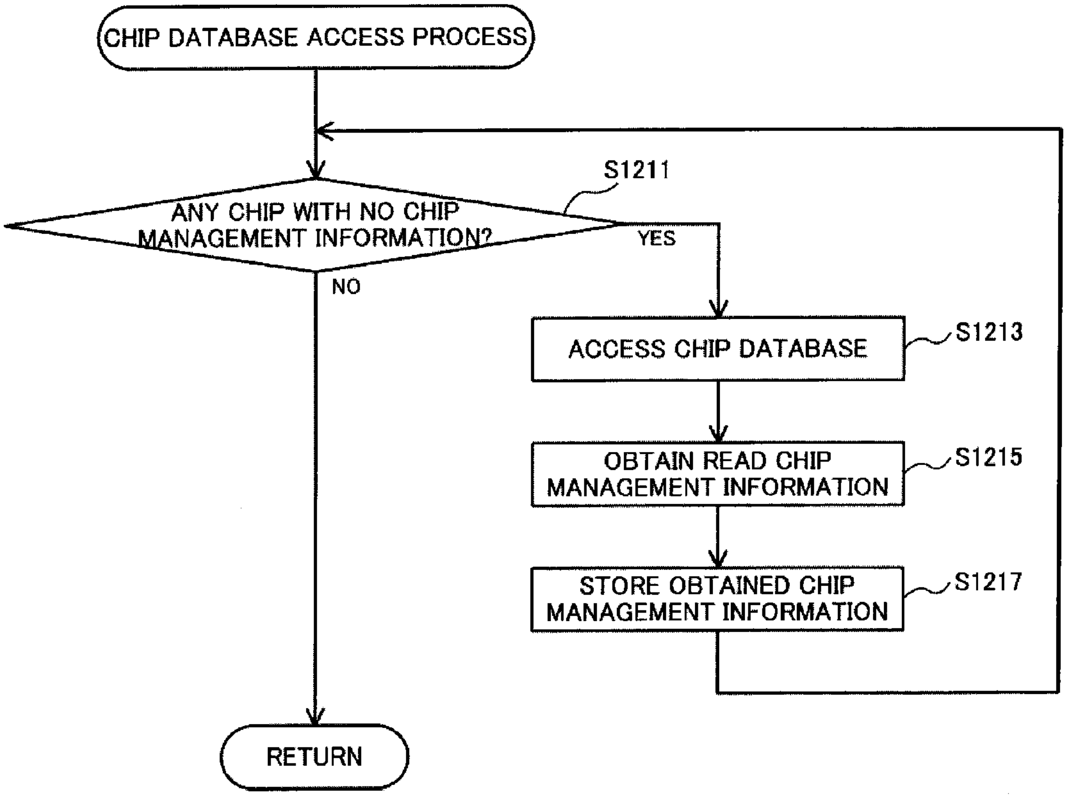
FIG. 12 is a subroutine which shows the process of accessing a chip database.

FIG. 12 is a subroutine which shows the process of accessing a chip database. This is a process for accessing the chip database after the gaming chip 500 is read, and obtaining the chip control information of the read gaming chip 500. The subroutine shown in this FIG. 12 is executed mainly by the first RF reader 350 or the second RF reader 360. The subroutine shown in this FIG. 12 may be executed by a control device such as the main control device 210 other than the second RF reader 360 and the first RF reader 350. In either case, it may be any control device as long as it can access the gaming chip server 410 via the LAN 270.

The subroutine shown in this FIG. 12 is executed simultaneously with the subroutine of the antenna dynamic selection process shown in FIG. 11 mentioned above, for example, by parallel processing. The antenna dynamic selection by the process shown in FIG. 11 by the thirty antennas constituting the antenna groups of "player 1" to "player 6", the chip-stored information of the gaming chip 500 placed in various betting areas of the game table 100 are sequentially read. More specifically, the reading operation is executed by the CPU of the reader by the process of step S1127 in FIG. 11, and the chip-stored information of the gaming chip 500, for example, the chip ID, is sequentially read. In step S1127, the process of storing the read chip ID in the RAM (not shown) of the first RF reader 350 or second RF reader 360 is also executed (not shown). In such a manner, the chip ID of the gaming chip 500 placed on the game table 100 can be obtained and stored.

Initially, the CPU of the first RF reader 350 or second RF reader 360 determines whether or not there is any chip which has not obtained chip control information among the gaming chips 500 indicated by the chip ID stored in the RAM of the first RF reader 350 or second RF reader 360 (step S1211). When the CPU of the first RF reader 350 or second RF reader 360 determines that there is no chip which has not obtained chip control information (NO), that is, when it is determined that chip control information has been obtained for every chip, the CPU immediately ends this subroutine.

Meanwhile, when the CPU of the first RF reader 350 or second RF reader 360 determines that there is a chip which has not obtained chip control information (YES), that is, when it is determined that chip control information has not been obtained for every chip, the CPU transmits the chip ID to the gaming chip server 410, and accesses the chip database stored in the gaming chip server 410 (step S1213). By the process of this step S1213, the gaming chip server 410 reads the chip control information corresponding to the transmitted chip ID from the chip database, and transmits the information to the first RF reader 350 or the second RF reader 360 whichever has transmitted the chip ID.

Subsequently, the CPU of the first RF reader 350 or second RF reader 360 receives and obtains the chip control information transmitted from the gaming chip server 410 (step S1215).

Subsequently, the CPU of the first RF reader 350 or second RF reader 360 stores the chip control information obtained from the chip database in RAM (not shown) or like devices (step S1217), and returns the process to step S1211.

As described above, the chip database is stored in the gaming chip server 410. The chip database mainly consists of chip control information. The chip control information, as mentioned above, comprises information such as validation and invalidation information, lock information, player information and face value information.

As described above, the process of accessing the chip database shown in FIG. 12 is executed simultaneously with the subroutine of the antenna dynamic selection process shown in FIG. 11. Therefore, while the chip ID of the gaming chip 500 placed on the game table 100 is obtained sequentially by the antenna dynamic selection process, the chip database is accessed by using the obtained chip ID by the process of accessing the chip database shown in FIG. 12 to obtain the chip control information of the gaming chip 500 sequentially. In such a manner, the process of obtaining the chip ID and the process of sequentially obtaining the chip control information are separately executed, whereby the chip control information of the gaming chip 500 of the obtained chip ID by using the time during which is executes the process of obtaining the chip ID can be obtained. Therefore, obtaining of the chip control information of all the gaming chips 500 placed on the game table 100 can be immediately completed after their chip ID's have been obtained. By so configuring, the overall process relating to the gaming chip 500 can be shortened by using the read time of the gaming chip 500.

In the example described above, the case where the process of accessing the chip database shown in FIG. 12 is executed simultaneously with the subroutine of the antenna dynamic selection process shown in FIG. 11 is shown. However, it may be so configured that the chip control information of the gaming chip 500 is obtained every time the chip ID of the gaming chip 500 is obtained. In such a manner, the overall process relating to the gaming chip 500 can be shortened by using the read time of the gaming chip 500.

In general, read time of the gaming chip 500 is longer than the time than to the time access the chip database. Therefore, it may be also so configured that the process of accessing the chip database shown in FIG. 12 is started when the number of the chip ID's obtained by the antenna dynamic selection process shown in FIG. 11 reaches a predetermined number or higher. The overall process relating to the gaming chip 500 can be also shortened by using the read time of the gaming chip 500 in such a manner.

<<Playing Card Identification Process>>

FIG. 13 is a flowchart which shows a subroutine of the process for identifying playing cards. This flowchart is executed by the main control device 210. Cards such as playing cards disposed on the game table 100 are identified by using the card recognition camera 110 and the scanner of the shoe for identifying cards 120.

Initially, the CPU of the main control device 210 determines whether or not the cards have passed the scanner of the shoe for identifying cards 120 via the first sub control device 220 (step S1311). When the CPU of the main control device 210 determines that the cards have passed the scanner of the shoe for identifying cards 120 (YES), the CPU causes the first sub control device 220 to execute the process of the following steps S1313 to S1319.

The CPU of the first sub control device 220 obtains the symbols on the surfaces of the cards by the scanner (step S1313). The CPU of the first sub control device 220 image-processes the image data of the obtained symbols (step S1315), and extracts the numerical values and marks indicating the suite drawn on the surfaces of the cards (step S1317). Subsequently, the CPU of the first sub control device 220 transmits the extracted numerical value and marks indicating the suite to the main control device 210 (step S1319).

When the CPU of the main control device 210 determines that the cards have not passed the scanner of the shoe for identifying cards 120 (NO), it determines whether or not the game on the game table 100 is over (step S1321). When the CPU of the main control device 210 determines that the game on the game table 100 is not over (NO), the process returns to step S1321.

When the CPU of the main control device 210 determines that the game on the game table 100 is over (YES), the upper face 102 of the game table100 is photographed by the card recognition camera 110 (step S1323). The CPU of the main control device 210 obtains the image data photographed by the card recognition camera 110 via the LAN 270 to subject the data to image processing (step S1325), extracts the image of the cards (step S1327), extracts the numerical values and marks indicating the suite drawn on the surfaces of the cards (step S1329), and stores the extracted numerical value and marks indicating the suite (step S1331).

The details of the processes of step S1325 to S1329 mentioned above are as follows. First, after the corners of the cards are recognized by the contrast generated by the color of the upper face 102 of the game table 100 where the cards are placed and the color of the cards, it is determined whether or not the length-to-width ratio of the areas of the images which are presumed to be cards is a predetermined ratio. Since the card recognition camera 110 is fixed, when the distances between the card recognition camera 110 and the respective cards are different, the size of the cards may be different in the photographs. However, since an object is determined whether or not it is a card by its length-to-width ratio, it can be determined that it is a card placed on the game table even when in the photograph the size and shape of the card are somewhat different. When they are determined to be cards, the numerical value and mark indicating the suite are extracted from the image of the corner portions of the area by pattern recognition.

In this embodiment, the game anticipated is Baccarat, and therefore the range in which the cards are placed is relatively small. However, the types of the cards can be identified by the camera by using a wide angle lens as the card recognition camera 110 even in such a game that cards are dealt to each player and the locations of the cards are dispersed in a wide range.

The CPU of the main control device 210 determines whether or not all the cards placed on the game table 100 have been processed (step S1333). When the CPU of the main control device 210 determines that all the cards placed on the game table 100 have not been processed (NO), the process returns to step S1329.

When the CPU of the main control device 210 determines that all the cards placed on the game table 100 have been processed (YES), the CPU determines whether or not the results obtained from the scanner of the shoe for identifying cards 120 match the results obtained from the card recognition camera 110 (step S1335). That is, it is determined whether or not the number and marks indicating the suite of the cards obtained from the scanner of the shoe for identifying cards 120 match the number and marks indicating the suite of the cards obtained from the card recognition camera 110.

When the CPU of the main control device 210 determines that the results obtained from the scanner of the shoe for identifying cards 120 match the results obtained from the card recognition camera 110 (YES), this subroutine is immediately ended. When they match, the process is ended since no particular problem has occurred.

Meanwhile, when the CPU of the main control device 210 determines that the results obtained from the scanner of the shoe for identifying cards 120 do not match the results obtained from the card recognition camera 110 (NO), a card modification screen is indicated on the dealer display 150 (step S1337). An alert may be indicated on the dealer display 150 before the card modification screen is indicated. The attention of the dealer can be thus drawn.

Figure 23:
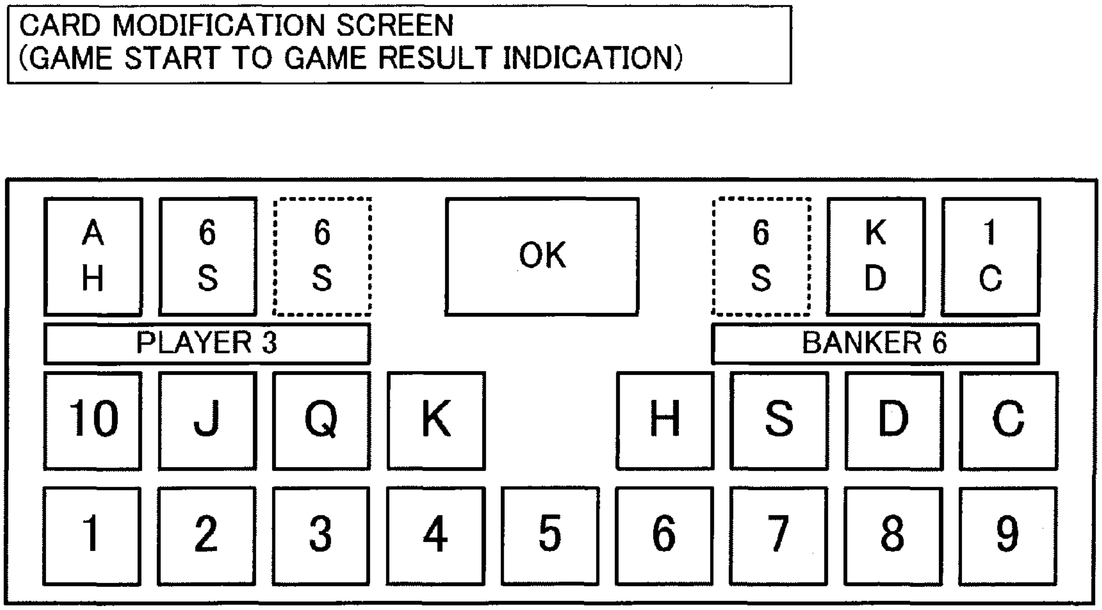
FIG. 23 is a drawing which shows an example of a card modification screen indicated on a dealer display 150.

The card modification screen is, for example, such a screen shown in FIG. 23. The cards placed in the "PLAYER" area on the card modification screen indicating the images and the images indicating the cards placed in the "BANKER" area are indicated. The images indicating the cards for which it is determined that the results obtained from the scanner do not match the results obtained from the card recognition camera 110 are indicated on the dealer display 150 in an outstanding manner, for example, flashing manner or an inverted manner.

Moreover, letter images indicating "keys" for the dealer to operate on the card modification screen are also indicated. For example, "1" to "10" for inputting the number of 1 to 13 of playing cards, and images of "J", "Q" and "K", and the images of "H", "S", "D" and "C" indicating the suites of the playing cards are indicated. The dealer can input these numbers and suites by operating the touch panel device 152 superposed on the dealer display 150.

After the process of step S1337, the CPU of the main control device 210 determines whether or not the details of the cards have been modified by the operation of the dealer (step S1339). When the CPU of the main control device 210 determines that the details of the card have not been modified (NO), the process returns to step S1339.

When CPU of the main control device 210 determines that the details of the card have been modified (YES), the CPU stores the information indicating that the details of the card have been modified by the operation of the dealer in a RAM and a hard disk device of the main control device 210 (step S1341), and ends this subroutine. By storing the information indicating that the details of the card have been modified by the operation of the dealer, the manager or other person of the gaming establishment confirms the information, whereby the commitment of a fraud, if any, can be readily found even when the dealer and the player conspire to commit a fraud. It is preferable that the information indicating that the details of the card have been modified by the operation of the dealer is stored not only in the RAM and hard disk device of the main control device 210, but also in the table log server 420 and other devices. The information that the details of the cards have been modified can be saved as a history, which can be useful for analysis of the tendency of frauds and the like.

When the results obtained from the scanner of the shoe for identifying cards 120 do not match the results obtained from the card recognition camera 110, it is highly likely that cards have been replaced in the course of the game. It is therefore considered that a fraud has occurred, and the information is indicated on the dealer display 150 so that the dealer can cope with such an event.

The results obtained from the scanner of the shoe for identifying cards 120 are the data indicating the details of the cards at the beginning of the game. On the other hand, the results obtained from the card recognition camera 110 are the data indicating the details of the cards in the course of the game play and at the end of the game. In such a manner, by using, as the target of determination, the details of the cards not only when the game is started, but also when the game is in process and when the game is over, whether or not any fraud has been committed can be precisely determined and found all the way from the start to the end of the game.

<<Reference Antenna Process>>

As shown in FIG. 3, the reference antenna 330 is provided on the game table 100. The reference antenna 330 is an antenna for indicating the chip control information (validation, invalidation, lock information, number, etc.) on the dealer display 150 for controlling the gaming chips 500. As described above, the reference antenna 330 is connected to the second RF reader 360. Therefore, reading itself of the gaming chip 500 is carried out by the second RF reader 360. The read information is transmitted to the main control device 210 via the LAN 270, and processed in the main control device 210.

FIG. 14 is a flowchart which shows a subroutine of processing of a reference antenna 330.

Initially, the main control device 210 operates the reference antenna 330 by the second RF reader 360, and reads the chip-stored information from the gaming chip 500 (step S1411). The second RF reader 360 transmits the chip-stored information read from the gaming chip 500 to the main control device 210 via the LAN 270, and the main control device 210 indicates the read chip-stored information on the dealer display 150 (step S1413). The chip-stored information is the information characterizing the gaming chip 500 such as the chip ID and money data.

The main control device 210 determines whether fraudulent information is contained in the read chip-stored information (step S1415). When the main control device 210 determines that any fraudulent information is contained in the read chip-stored information (YES), it indicates the information on the dealer display 150 (step S1417), and ends this subroutine. In contrast, when the main control device 210 determines that no fraudulent information is contained in the read chip-stored information (NO), it ends this subroutine immediately.

When the gaming chip 500 is given to the player, the dealer need to validate all the gaming chips 500 given to the player. Validation of the gaming chip 500 is carried out in the registration antenna 320. By using the reference antenna 330, the chip dealer can confirm whether or not all the gaming chips have been validated by the registration antenna 320 before being given to the player.

Moreover, when the gaming chips 500 are collected from the player, the dealer needs to invalidate all the collected gaming chips 500. Invalidation of the gaming chip 500 is performed by the deleting antenna 310. By using the reference antenna 330, before the gaming chips 500 are accommodated on the chip tray 610, the chip dealer can confirm whether or not all the gaming chips have been invalidated by the deleting antenna 310.

Furthermore, the main control device 210 may be so configured that it accesses the gaming chip server 410, obtains the chip control information on the gaming chip 500 read by using the reference antenna 330, and determines whether or not any fraudulent behavior is committed from both the read chip-stored information and chip control information.

<<Change Payment Process>>

When the player provides a fraction of the gaming chips 500 to the dealer, the dealer receives the fraction of the gaming chips 500, and pays the player a round number amount of chips depending on the fraction of the gaming chips 500.

FIG. 15 is a flowchart which shows a subroutine of a change payment process.

Initially, the CPU of the main control device 210 determines whether or not to give a payout to the player responsive to the operation of the dealer (step S1511). The operation by the dealer includes, for example, operation of the touch panel device 152 and the like. It may be so configured that whether or not to give a payout to the player is determined not by the operation of the dealer, but by the main control device 210 from the progress of the game. When it is determined that a payout is not given to the player (NO), the CPU of the main control device 210 ends this subroutine immediately.

When it is determined that a payout is given to the player (YES), the CPU of the main control device 210 determines whether or not a payout given to the player has a fraction (step S1513). When CPU of the main control device 210 determines that the payout given to the player does not have a fraction (NO), it ends this subroutine immediately.

Meanwhile, when the CPU of the main control device 210 determines that the payout given to the player has a fraction (YES), it calculates the amount obtained by rounding up the fraction (step S1515). Subsequently, the CPU of the main control device 210 indicates both the original amount of the payout and the amount obtained by rounding up the fraction on the dealer display 150 (step S1517). Thus, by indicating both the original amount of the payout and the amount obtained by rounding up the fraction, the dealer can tell the player that the player can get a round number amount of payout by rounding up the fraction when he/she gives the payout to the player.

Subsequently, the CPU of the main control device 210 determines whether or not the gaming chips 500 equivalent to the fraction have been received from the player (step S1519). When the player hears from the dealer that he/she can receive a round number amount of the payout by rounding up the fraction, the player who wants the round number amount of the payout gives the dealer the gaming chips 500 equivalent to the fraction. In this case, the dealer inputs that he/she received the gaming chips 500 equivalent to the fraction by operating the touch panel device 152. The determination process in step S1519 mentioned above is for determining whether or not the input operation of the dealer has been made.

When the CPU of the main control device 210 determines that the gaming chips 500 equivalent to the fraction have not been received from the player in the determination process in step S1519 (NO), it ends this subroutine immediately. In contrast, when the CPU of the main control device 210 determines that the gaming chips 500 equivalent to the fraction have been received from the player (YES), it stores the information indicating that the gaming chips 500 equivalent to the fraction have been received from the player (step S1521). The CPU of the main control device 210 may be so configured to transmit the information indicating that the gaming chips 500 equivalent to the fraction have been received from the player to the gaming chip server 410 and manage the information. Since receipt of the gaming chips 500 equivalent to the fraction is originally not related to the results of the game, it should be clarified that it is not fraudulent giving and receipt of the gaming chips 500. For such reasons, it is preferable in terms of management of the gaming establishment that such a fact is left in the main control device 210 and the gaming chip server 410 as a history.

Subsequently, the CPU of the main control device 210 stores the information indicating that the gaming chips 500 of the amount obtained by rounding up the fraction have been given to the player as a payout (step S1523), and ends this subroutine. The information indicating that the gaming chips 500 of this amount obtained by rounding up the fraction have been given to the player as a payout is the information input by the operation of the touch panel device 152 by the dealer. In such a manner, the information that the gaming chips 500 of the amount obtained by rounding up the fraction is actually given to the player as a payout is also stored as a history, whereby it can be clarified that it is not fraudulent giving and receipt of the gaming chips 500.

When the player receives a payout having a fraction as it is, he/she has to carry the small amount of the gaming chips 500 equivalent to the fraction. However, since the player can receive the round number amount of the gaming chips 500, the player does not have to carry the gaming chips 500 equivalent to the fraction, whereby the number of the gaming chip 500 can be reduced. By so configuring, convenience for players when he/she moves within the gaming establishment can be offered.

<<Direction Process to the Dealer>>

It is preferable that the game can be proceeded appropriately and smoothly by directing the operations to be carried out by the dealer responsive to the progress of the game.

Figure 16:
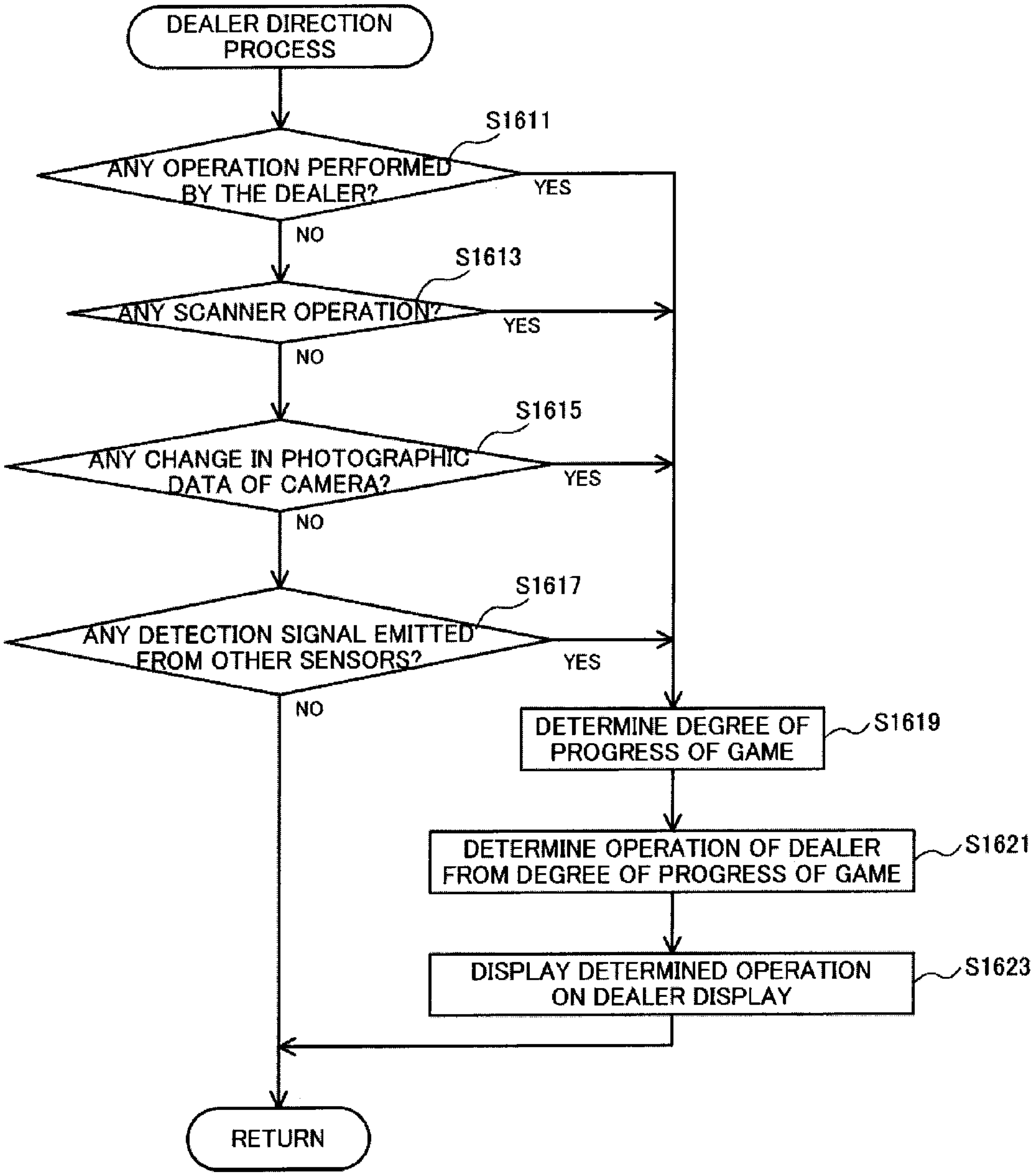
FIG. 16 is a flowchart which shows a subroutine of a process of directing a dealer.

FIG. 16 is a flowchart which shows a subroutine of a process of directing a dealer.

First, the CPU of the main control device 210 determines whether or not there has been any operation by the dealer on the touch panel device 152 and the like (step S1611).

Second, when the CPU of the main control device 210 determines that no operation has been carried out by the dealer on the touch panel device 152 and other components (NO), it determines whether or not the scanner of the shoe for identifying cards 120 has operated (step S1613).

Subsequently, when the CPU of the main control device 210 determines that the scanner of the shoe for identifying cards 120 has not operated (NO), it determines whether or not if there has been any change in the photographic data of the card recognition camera 110 (step S1615).

Subsequently, when the CPU of the main control device 210 determines that there has been no change in the photographic data of the card recognition camera 110 (NO), it determines whether or not any detection signal has been transmitted from various other sensors (step S1617).

Subsequently, when the CPU of the main control device 210 determines that no detection signal has been transmitted from various other sensors (NO), it ends this subroutine.

In the determination process at step S1611 mentioned above, when it is determined that any operation of the dealer has been carried out on the touch panel device 152 and other devices, when it is determined that the scanner of the shoe for identifying cards 120 has operated in the determination process at step S1613, when it is determined that there has been any change in the photographic data of the card recognition camera 110 in the determination process at step S1615, or when it is determined that any detection signal has been transmitted from various other sensors in the determination process at step S1617, the CPU of the main control device 210 determines the degree of progress of the game played on the game table 100 responsive to those pieces of information which could be obtained (step S1619).

The CPU of the main control device 210 determines the operation of the dealer from the degree of progress of the game determined (step S1621), and indicates the determined operation on the dealer display (step S1623), and ends this subroutine.

Since the operation of the dealer is determined from the degree of progress of the game played on the game table 100, the operation to be performed by the dealer can be notified to the dealer, and the game can be proceeded by the dealer appropriately and smoothly. By so configuring, human errors by the dealer can be prevented. Moreover, uniform service can be provided to players, regardless of the experience and skillfulness of the dealer.

<<Levitation Countermeasure Process>>

FIG. 17 is a flowchart which shows a subroutine of a levitation countermeasure process.

The CPU of the main control device 210 reads the chip ID's of all the gaming chips 500 placed in the betting area by the first RF reader 350 and second RF reader 360 (step S1711).

The CPU of the main control device 210 stores the read chip ID's in a first storage area of a RAM of the main control device 210 (step S1713).

Subsequently, the CPU of the main control device 210 determines whether or not a predetermined period of time has elapsed (step S1715). The CPU of the main control device 210 determines that a predetermined period of time has not elapsed (NO), it returns the process to step S1715.

In contrast, when the CPU of the main control device 210 determines that a predetermined period of time has elapsed (YES), it again reads the chip ID's of all the gaming chips 500 placed in the betting area by the first RF reader 350 and second RF reader 360 (step S1717), and the read chip ID's is stored in a second storage area of a RAM of the main control device 210 (step S1719).

Subsequently, the CPU of the main control device 210 determines whether or not all the chip ID's stored in the first storage area match all the chip ID's stored in the first storage area and (step S1721).

When the CPU of the main control device 210 determines that all the chip ID's stored in the first storage area match all the chip ID's stored in the first storage area and (YES), it determines whether or not the number of matches is equal to or higher than a first predetermined (step S1723).

When the CPU of the main control device 210 determines that the number of the matches is higher than the first predetermined number (YES), stores the chip ID stored in the first storage area on the chip ID table (step S1725). The chip ID's of all the gaming chips 500 placed in the betting area can be finalized by storing the chip ID's on the chip ID table in such a manner.

The CPU of the main control device 210 indicates the information that the chip ID's are finalized on the dealer display 150 (step S1727), and ends this subroutine.

In the determination process at step S1721 mentioned above, when the CPU of the main control device 210 determines that all the chip ID's stored in the first storage area do not match all the chip ID's stored in the second storage area (NO), it determines whether or not the number of mismatches is equal to or higher than a second predetermined number (step S1729).

When the CPU of the main control device 210 determines that the number of the matching times is higher than the first predetermined number in the determination process at step S1723 (NO), or when it determines that the number of mismatches is higher than the second predetermined number in the determination process at step S1729 (NO), copies the chip ID's stored in the second storage area to the chip ID's stored in the first storage area (step S1731), and returns the process to step S1715.

In the determination process at step S1729, when it is determined that the number of mismatch times is equal to or higher than a second predetermined number (YES), the information that the chip ID's cannot be finalized is indicated on the dealer display 150 (step S1733), and this subroutine is ended.

Unstableness of the details of the bet when the game is started can be avoided, and frauds can be found and prevented precisely.

<<Chip Tray Structure 600>>

FIGS. 19 to 21 are perspective views which show the chip tray structure 600. FIG. 19 is a perspective view which shows a state that a lid body 660 is placed in an upper part of a chip tray structure 600. FIG. 20 is a perspective view which shows the entire chip tray structure 600. FIG. 21 is an exploded perspective view which shows a chip tray 610, a board cover 620, and a base 630 constituting of the chip tray structure 600 in a disassembled state.

As shown in FIG. 21, the chip tray structure 600 has a three-layer structure consisting of the chip tray 610, board cover 620 and base 630. Furthermore, as shown in FIG. 19, the chip tray structure 600 has the lid body 660 for covering an upper part thereof. The lid body 660 can be locked to the chip tray 610, and the lid body 660 cannot be unlocked by other people than employees such as the dealer. By so configuring, frauds can be prevented.

The chip tray 610 is a tray for accommodating the gaming chips 500 given to players and the gaming chips 500 collected from the player. As shown in FIGS. 20 and 21, a plurality of grooves 612 for accommodating the gaming chips 500, for example, eighteen grooves 612, are formed from the front side to the back on the chip tray 610. The chip tray 610 is formed to cope with a predetermined number of players, for example, six players. That is, the chip tray 610 is sectioned into six blocks so that three grooves 612 of the eighteen grooves 612 correspond to a single player. A block of three adjacent grooves 612 is used for the gaming chips 500 given to a single player and the gaming chips 500 collected from a single player. Thirty gaming chips 500 can be accommodated in a single groove 612.

The chip tray 610 is formed of a component which allows light to pass through, for example, a transparent component. An optical coupler board 634 is provided on the base 630. A light emitting section (not shown) and a light receiving section (not shown) are provided on this optical coupler board 634. By communicating between the light emitting section and light receiving section, communication within the board is performed.

An opening 614 is formed to the back of the chip tray 610. As will be described later, the dealer display 150 is provided on the base 630. The display side of this dealer display 150 is located at the opening 614.

Protrusions 616*a* and 616*b* are formed on the left and right side portions of the chip tray 610. An employee such as the dealer can hold the chip tray 610 by hooking the finger on the protrusions 616*a* and 616*b*. In such a manner, the chip tray 610 can be attached to and detached from the board cover 620.

Through-holes 618*a*, 618*b*, 618*c*, and 618*d* are formed on each of the left and right side portions of the chip tray 610. Projections 628*a*, 628*b*, 628*c* and 628*d* are formed in portions corresponding to the board cover 620 described later. By so configuring that the projection 628*a* is inserted into the through-hole 618*a*, the projection 628*b* is inserted into the through-hole 618*b*, the projection 628*c* is inserted into the through-hole 618*c*, and the projection 628*d* is inserted into the through-hole 618*d*, the chip tray 610 can be detachably latched to the board cover 620 and base 630 so that it is set a fixed location with respect to the board cover 620 and base 630. By latching the chip tray 610 at the fixed location, the chip tray 610 can be located so that the groove 612 corresponding to an antenna 632 described later is always at a fixed location with respect to the antenna 632.

A lock portion 619 is provided on the chip tray 610. When the lid body 660 is provided in an upper part of the chip tray 610, the chip tray 610 can be locked by the lock portion 619. A key hole is provided in the lock portion 619, and by inserting a key into the key hole and rotating the key, an engaging body (not shown) from the lock portion 619 is caused to extend from the front side to the back. The extending engaging body engages the upper face of the lid body 660. The engagement of the engaging body with the lid body 660 allows the chip tray 610 to be locked by the lid body 660.

The lock portion 619 is for locking the chip tray 610 by the lid body 660, and is capable of maintaining the state that an upper part of the chip tray 610 is covered with lid body 660, and allowing the chip tray 610 to be attached to and detached from the board cover 620. In such a manner, even when the gaming chips 500 are accommodated on the chip tray 610, frauds involving the gaming chips 500 can be prevented by covering the chip tray with the lid body 660. The chip tray 610 accommodating the gaming chips 500 can be moved safely in the establishment.

Moreover, when the chip tray 610 is covered by the lid body 660 in it upper portion, the through-holes 618*a*, 618*b*, 618*c* and 618*d* are also covered by the lid body 660. In such a manner, the through-holes 618*a*, 618*b*, 618*c* and 618*d* can be protected by the lid body 660, and the state that the chip tray is latched to the board cover 620 and base 630 can be maintained.

The lid body 660 is formed of a component such as a component which allows light to pass through, for example, a transparent plastic. By forming the lid body 660 from a component which allows light to pass through light, even in the state that the chip tray 610 is covered and locked by the lid body 660, the state of the gaming chips 500 accommodated on the chip tray 610 can be readily confirmed visually, whereby frauds can be prevented and quickly found.

The board cover 620 is capable of accommodating a lower part of the chip tray 610, and is formed in a manner of covering the base 630. The chip tray 610 can be provided on the base 630 via the board cover 620.

The board cover 620 is formed of a component which allows no light to pass through, for example, an opaque plastic. The board cover 620 may be also formed of a component which allows light to pass through, for example, a transparent plastic. By so configuring, the state of the base 630 can be visually confirmed more easily.

The chip tray 610 can be provided detachably to the board cover 620. By detachably providing the chip tray 610, two operational forms can be adopted: the chip tray 610 the operational form such that the chip tray 610 is used fixed on the game table 100, and the operational form such that the chip tray 610 is used and moved within the establishment. Moreover, by providing the chip tray 610 detachably on board cover 620, wirings provided on the base 630 need not be removed even when the chip tray 610 is removed from the board cover 620, and the operations relating to the chip tray 610 can be performed more easily.

The board cover 620 is provided on the base 630 by fixing members such as screws. By so configuring, the base 630 can be sealed by the board cover 620. As will be described later, various electronic parts such as, six sets of antennas 632 and six sets of optical coupler boards 634 are provided on the base 630. Since the board cover 620 is sealed by the base 630, performing fraudulent operations on electronic parts provided on the base 630 are made more difficult. Moreover, in order to facilitate replacing these electronic parts, it is preferable that the board cover 620 is detachably provided to the base 630.

A plurality of antennas 632 is provided on the base 630. A pair of antennas is constituted by two antennas 632. The pair of antennas is disposed on the base 630 in a manner of opposing across a block (three grooves 612). More specifically, both of the two antennas 632 constituting the pair of antennas are disposed to be parallel to the round surfaces of the gaming chips 500 accommodated in the groove 612. By so configuring, both of the two antennas 632 can be caused to always face the surfaces of the gaming chips 500. In such a manner, the pair of antennas can be caused to correspond to one block (three grooves 612). The gaming chips 500 accommodated in one block (three grooves 612) corresponding to the pair of antennas can be read by the pair of antennas. The antenna 632 can read the gaming chips 500 with built-in RFID chips. The gaming chips 500 placed on the chip tray 610 can be read when the dealer is changed and in other occasions to record and confirm integrity.

A plurality of optical coupler boards 634 are also provided on the base 630. Each of the optical coupler boards 634 is connected to the corresponding antenna 632. The chip-stored information such as the chip ID's read by the antenna 632 is provided to a base control circuit (not shown) provided on the base 630 via the optical coupler board 634. The base control circuit is connected to the LAN 270. The chip-stored information is transmitted to the main control device 210 and other devices via the LAN 270. By using the optical coupler board 634, generation of electromagnetic waves can be suppressed, and the good state of radio waves of the antenna 632 can be ensured, whereby the chip-stored information such as the chip ID's can be precisely output to the main control device 210 and other devices.

Furthermore, the dealer display 150 is also provided on the base 630. Since the dealer display 150 is tilted in a manner of facing the dealer, the eye level of the dealer to the dealer display 150 and the eye level of the dealer to the player can be approached, whereby the operability for the dealer can be improved. The touch panel device 152 is provided in a manner of superposing the dealer display 150. The dealer can operate the touch panel device 152 responsive to various information indicated on the dealer display 150.

Wirings connected to the antenna 632 and optical coupler board 634 extend from the back side of the base 630. These wirings are connected to the main control device 210 via the LAN 270. An output signal transmitted from the antenna 632 is provided to the main control device 210 via the optical coupler board 634, base control circuit, and LAN 270. The main control device 210 can obtain the chip-stored information such as the chip ID's of the gaming chips 500 accommodated in the groove 612 and, the information whether or not the gaming chips 500 are accommodated in one block.

Moreover, as described above, a base control device (not shown) is also provided on the base 630. The dealer display 150 is also connected to the base control device, in addition to the antenna 632 and other components. The chip-stored information such as the chip ID's of the gaming chips 500 accommodated in the groove 612 and the information whether or not the gaming chips 500 are accommodated in one block can be indicated on the dealer display 150.

By using such a chip tray 610, the chip tray 610 can be provided detachably to the board cover 620. The chip tray 610 singly can cope with the two operational forms: the operational form such that the chip tray 610 is used fixed on the game table 100 and the operational form such that the chip tray 610 is moved within the establishment. In such a manner, different chip trays need not be prepared for each operational form, whereby maintenance costs and management costs can be kept low in the gaming establishment. Moreover, human errors such as wrong use of chip trays for different operational forms can be prevented.

Moreover, by providing the antenna 632 on the base 630, the gaming chips 500 placed on the chip tray 610 can be read via the antenna 632, whereby wirings for connecting to the chip tray 610 are done away with. By so configuring, with no concern about the wirings to the chip tray 610, the chip tray 610 can be provided detachably to the board cover 620, and even when the chip tray 610 is removed from the board cover 620, wirings need not be removed and operation can be performed more easily.

What is claimed is:

1. A gaming table device comprising:

a game table on which a game medium storing medium identification information is disposed, a plurality of antennas for reading the medium identification information of the game medium disposed on the game table through a wireless communication, the plurality of antennas being disposed in locations spaced away from each other, and a reading device which, when a first antenna of the plurality of antennas is selected, selects a second antenna which is at a predetermined distance from the first antenna of the plurality of antennas, wherein the reading device has a first reading control device, and a second reading control device which is different from the first reading control device, the plurality of antennas having a first antenna group having at least two antennas, and a second antenna group which is different from the first antenna group and has at least two antennas, each of the first antenna and the second antenna having an antenna, the first reading control device having a first control unit which transmits a first selection signal indicating the first antenna, and a first selection device which receives the first selection signal and selects the first antenna indicated by the first selection signal from the first antenna group, the second reading control device having, a second control unit which transmits a second selection signal indicating the second antenna, and a second selection device which receives the second selection signal and selects the second antenna indicated by the second selection signal from the second antenna group, the first reading control device reading the medium identification information by the first antenna selected by the first selection device through a wireless communication, and the second reading control device reading the medium identification information by the second antenna selected by the second selection device through a wireless communication.

2. The gaming table device according to claim 1, wherein the device further has a memory device storing selection inhibiting information for defining a combination of antennas which are not simultaneously selected by the reading device among the plurality of antennas, and the reading device refers to the selection inhibiting information, and determinism at least two antennas to be simultaneously selected.

3. The gaming table device according to claim 1, wherein the device further has a memory device storing selection inhibiting information which indicates the combination of antennas inhibited to be selected simultaneously of the plurality of antennas, when the combination of a first selection candidate antenna determined as a selection candidate by the first reading control device of the antennas in the first antenna group and a second selection candidate antenna determined as a selection candidate by the second reading control device of the antennas in the second antenna group is not a combination inhibited by the selection inhibiting information, the first reading control device selects the first selection candidate antenna as the first antenna, and the second reading control device selects the second selection candidate antenna as the second antenna.

4. The gaming table device according to claim 2, wherein the reading device refers to the selection inhibiting information, and determines whether or not one antenna can be selected in accordance with a predetermined antenna selection order, when the one antenna can be selected, selects the one antenna, when the one antenna cannot be selected, determines whether or not another antenna next to the one antenna can be selected in accordance with the predetermined antenna selection order, and, changes the order of selection of the one antenna.

5. The gaming table device according to claim 1, wherein the device further has a game control device which executes a predetermined error process when it is determined that one of medium identification information by at least two antennas of the plurality of antennas is read.

6. The gaming table device according to claim 1, wherein the device further has a game control device which, when one antenna reads medium identification information, accesses a management information database storing medium control information for controlling a game medium, and reads the medium control information from the management information database.

7. A gaming table device comprising:

a game table on which a game medium storing medium identification information is disposed, a plurality of antennas for reading the medium identification information of the game medium disposed on the game table through a wireless communication, the plurality of antennas being disposed in locations spaced away from each other, and a reading device which, when a first antenna of the plurality of antennas is selected, selects a second antenna which is at a predetermined distance from the first antenna of the plurality of antennas, wherein the device further has a game medium accommodating body which accommodates the game medium, and is disposed at a predetermined location of the game table, and the game medium accommodating body has:

an accommodating base which serves as a basis of the game medium accommodating base, an accommodating cover body covering the accommodating base, a game medium disposition body which accommodates the game medium and allows the same to be inserted into and removed from in a predetermined mode, and is detachably mounted on to the accommodating cover body.

8. A method of reading medium identification information of a game medium by a gaming table device, the gaming table device including a game table on which a game medium storing medium identification information is disposed and a plurality of antennas for reading the medium identification information of the game medium disposed on the game table through a wireless communication, the plurality of antennas being disposed in locations spaced away from each other, the method comprising:

selecting a first antenna of the plurality of antennas; and selecting a second antenna which is at a predetermined distance from the first antenna of the plurality of antennas when selecting the first antenna, wherein the plurality of antennas includes a first antenna group having at least two antennas, and a second antenna group which is different from the first antenna group and has at least two antennas, and each of the first antenna and the second antenna has an antenna, wherein selecting the first antenna includes receiving a first selection signal indicating the first antenna, selecting the first antenna indicated by the first selection signal from the first antenna group, and reading the medium identification information by the first antenna selected by the first selection device through a wireless communication, and wherein selecting the second antenna includes receiving a second selection signal indicating the second antenna, selecting the second antenna indicated by the second selection signal from the second antenna group, and reading the medium identification information by the second antenna selected by the second selection device through a wireless communication.

9. The method according to claim 8, further comprising:

storing selection inhibiting information for defining a combination of antennas which are not simultaneously selected by the reading device among the plurality of antennas; and referring to the selection inhibiting information to determine at least two antennas to be simultaneously selected.

10. The method according to claim 9, further comprising: referring to the selection inhibiting information to determine whether or not one antenna can be selected in accordance with a predetermined antenna selection order;

when the one antenna can be selected, selecting the one antenna; and when the one antenna cannot be selected, determining whether or not another antenna next to the one antenna can be selected in accordance with the predetermined antenna selection order, and changing the order of selection of the one antenna.

11. The method according to claim 8, further comprising: storing selection inhibiting information which indicates the combination of antennas inhibited to be selected simultaneously of the plurality of antennas; and when the combination of a first selection candidate antenna determined as a selection candidate in the first antenna group and a second selection candidate antenna determined as a selection candidate in the second antenna group is not a combination inhibited by the selection inhibiting information, selecting the first selection candidate antenna as the first antenna, and the second selection candidate antenna as the second antenna.

12. The method according to claim 8, further comprising executing a predetermined error process when it is determined that one of medium identification information by at least two antennas of the plurality of antennas is read.

13. The method according to claim 8, further comprising, when one antenna reads medium identification information, accessing a management information database storing medium control information for controlling a game medium, and reading the medium control information from the management information database.

14. The method according to claim 8, wherein the gaming table device further has a game medium accommodating body which accommodates the game medium, and is disposed at a predetermined location of the game table, and the game medium accommodating body has an accommodating base which serves as a basis of the game medium accommodating base, an accommodating cover body covering the accommodating base, and a game medium disposition body which accommodates the game medium and allows the same to be inserted into and removed from in a predetermined mode, and is detachably mounted on to the accommodating cover body.

* * * * *